(12) United States Patent
Krosschell et al.

(10) Patent No.: US 12,337,824 B2
(45) Date of Patent: Jun. 24, 2025

(54) VEHICLE HAVING ADJUSTABLE SUSPENSION

(71) Applicant: Polaris Industries Inc., Medina, MN (US)

(72) Inventors: Brian D. Krosschell, North Branch, MN (US); Jonathon P. Graus, Stacy, MN (US); Elaine M. Scott, San Francisco, CA (US); Joseph Paul Nuxoll, San Jose, CA (US); Keijiro Ikebe, Cupertino, CA (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/392,063

(22) Filed: Dec. 21, 2023

(65) Prior Publication Data

US 2024/0123972 A1     Apr. 18, 2024

Related U.S. Application Data

(60) Continuation of application No. 17/355,650, filed on Jun. 23, 2021, now Pat. No. 11,878,678, which is a
(Continued)

(51) Int. Cl.
*B60W 30/04*     (2006.01)
*B60G 17/016*     (2006.01)
(Continued)

(52) U.S. Cl.
CPC ......... *B60W 30/04* (2013.01); *B60G 17/0162* (2013.01); *B60G 17/0164* (2013.01); *B60G 17/0165* (2013.01); *B60G 17/01908* (2013.01); *B60G 17/0195* (2013.01); *B60W 10/04* (2013.01); *B60W 10/06* (2013.01); *B60W 10/10* (2013.01); *B60W 10/184* (2013.01); *B60W 10/196* (2013.01); *B60W 10/22* (2013.01);
(Continued)

(58) Field of Classification Search
None
See application file for complete search history.

(56) References Cited

U.S. PATENT DOCUMENTS 3,013,442 A    12/1961   Fox et al.
3,400,945 A    9/1968    Sampietro
(Continued)

FOREIGN PATENT DOCUMENTS

AU    2012323853 A1    5/2014
AU    2015328248 A1    5/2017
(Continued)

OTHER PUBLICATIONS

Trebi-Ollennu et al., Adaptive Fuzzy Throttle Control of an All Terrain Vehicle, 2001, Abstract.
(Continued)

*Primary Examiner* — Tamara L Weber
(74) *Attorney, Agent, or Firm* — SCHWEGMAN LUNDBERG & WOESSNER, P.A.

(57) ABSTRACT

A damping control system for a vehicle having a suspension located between a plurality of ground engaging members and a vehicle frame includes at least one adjustable shock absorber having an adjustable damping profile.

19 Claims, 32 Drawing Sheets

Related U.S. Application Data division of application No. 15/816,368, filed on Nov. 17, 2017, now Pat. No. 11,110,913.

(60) Provisional application No. 62/524,192, filed on Jun. 23, 2017, provisional application No. 62/424,285, filed on Nov. 18, 2016.

(51) Int. Cl.

| | | |
|---|---|---|
| *B60G 17/0165* | (2006.01) | |
| *B60G 17/019* | (2006.01) | |
| *B60G 17/0195* | (2006.01) | |
| *B60W 10/04* | (2006.01) | |
| *B60W 10/06* | (2006.01) | |
| *B60W 10/10* | (2012.01) | |
| *B60W 10/184* | (2012.01) | |
| *B60W 10/196* | (2012.01) | |
| *B60W 10/22* | (2006.01) | |
| *B60W 30/02* | (2012.01) | |
| *B60W 30/045* | (2012.01) | |
| *B60K 35/60* | (2024.01) | |
| *B60W 50/14* | (2020.01) | |

(52) U.S. Cl.
CPC .......... *B60W 30/02* (2013.01); *B60W 30/045* (2013.01); *B60G 2300/07* (2013.01); *B60G 2300/124* (2013.01); *B60G 2300/322* (2013.01); *B60G 2400/0512* (2013.01); *B60G 2400/0513* (2013.01); *B60G 2400/0523* (2013.01); *B60G 2400/10* (2013.01); *B60G 2400/204* (2013.01); *B60G 2400/30* (2013.01); *B60G 2400/82* (2013.01); *B60G 2400/821* (2013.01); *B60G 2400/84* (2013.01); *B60G 2400/842* (2013.01); *B60G 2401/16* (2013.01); *B60G 2401/28* (2013.01); *B60G 2401/904* (2013.01); *B60G 2500/10* (2013.01); *B60G 2600/02* (2013.01); *B60G 2600/04* (2013.01); *B60G 2600/70* (2013.01); *B60G 2800/014* (2013.01); *B60G 2800/016* (2013.01); *B60G 2800/24* (2013.01); *B60G 2800/91* (2013.01); *B60G 2800/97* (2013.01); *B60K 35/60* (2024.01); *B60W 2030/041* (2013.01); *B60W 2050/146* (2013.01); *B60W 2300/362* (2013.01); *B60W 2420/905* (2013.01); *B60W 2520/10* (2013.01); *B60W 2520/14* (2013.01); *B60W 2530/00* (2013.01); *B60W 2540/18* (2013.01); *B60W 2552/35* (2020.02); *B60W 2555/20* (2020.02); *B60W 2710/223* (2013.01); *B60W 2710/226* (2013.01); *B60W 2720/14* (2013.01); *B60W 2720/16* (2013.01); *B60Y 2200/124* (2013.01)

(56) References Cited

U.S. PATENT DOCUMENTS

| | | |
|---|---|---|
| 3,623,565 A | 11/1971 | Ward et al. |
| 3,737,001 A | 6/1973 | Rasenberger |
| 3,760,246 A | 9/1973 | Wright et al. |
| 3,861,229 A | 1/1975 | Domaas |
| 3,933,213 A | 1/1976 | Trowbridge |
| 3,952,829 A | 4/1976 | Gray |
| 3,982,446 A | 9/1976 | Van Dyken |
| 4,075,841 A | 2/1978 | Hamma et al. |
| 4,112,885 A | 9/1978 | Iwata et al. |
| 4,116,006 A | 9/1978 | Wallis |
| 4,319,658 A | 3/1982 | Collonia et al. |
| 4,327,948 A | 5/1982 | Beck et al. |
| 4,340,126 A | 7/1982 | Larson |
| 4,453,516 A | 6/1984 | Filsinger |
| 4,462,480 A | 7/1984 | Yasui et al. |
| 4,508,078 A | 4/1985 | Takeuchi et al. |
| 4,580,537 A | 4/1986 | Uchiyama |
| 4,600,215 A | 7/1986 | Kuroki et al. |
| 4,620,602 A | 11/1986 | Capriotti |
| 4,658,662 A | 4/1987 | Rundle |
| 4,671,235 A | 6/1987 | Hosaka |
| 4,681,292 A | 7/1987 | Thomas |
| 4,688,533 A | 8/1987 | Otobe |
| 4,691,676 A | 9/1987 | Kikuchi |
| 4,691,677 A | 9/1987 | Hotate et al. |
| 4,722,548 A | 2/1988 | Hamilton et al. |
| 4,741,554 A | 5/1988 | Okamoto |
| 4,749,210 A | 6/1988 | Sugasawa |
| 4,759,329 A | 7/1988 | Nobuo et al. |
| 4,765,296 A | 8/1988 | Ishikawa et al. |
| 4,779,895 A | 10/1988 | Rubel |
| 4,781,162 A | 11/1988 | Ishikawa et al. |
| 4,785,782 A | 11/1988 | Tanaka et al. |
| 4,787,353 A | 11/1988 | Ishikawa et al. |
| 4,805,923 A | 2/1989 | Soltis |
| 4,809,179 A | 2/1989 | Klingler et al. |
| 4,809,659 A | 3/1989 | Tamaki et al. |
| 4,817,466 A | 4/1989 | Kawamura et al. |
| 4,819,174 A | 4/1989 | Furuno et al. |
| 4,826,205 A | 5/1989 | Kouda et al. |
| 4,827,416 A | 5/1989 | Kawagoe et al. |
| 4,831,533 A | 5/1989 | Skoldheden |
| 4,838,780 A | 6/1989 | Yamagata et al. |
| 4,856,477 A | 8/1989 | Hanaoka et al. |
| 4,860,708 A | 8/1989 | Yamaguchi et al. |
| 4,862,854 A | 9/1989 | Oda et al. |
| 4,867,474 A | 9/1989 | Smith |
| 4,881,428 A | 11/1989 | Ishikawa et al. |
| 4,893,501 A | 1/1990 | Sogawa |
| 4,895,343 A | 1/1990 | Sato |
| 4,898,137 A | 2/1990 | Fujita et al. |
| 4,898,138 A | 2/1990 | Nishimura et al. |
| 4,901,695 A | 2/1990 | Kabasin et al. |
| 4,903,983 A | 2/1990 | Fukushima et al. |
| 4,905,783 A | 3/1990 | Bober |
| 4,913,006 A | 4/1990 | Tsuyama et al. |
| 4,919,097 A | 4/1990 | Mitui et al. |
| 4,926,636 A | 5/1990 | Tadokoro et al. |
| 4,927,170 A | 5/1990 | Wada |
| 4,930,082 A | 5/1990 | Harara et al. |
| 4,934,667 A | 6/1990 | Pees et al. |
| 4,949,262 A | 8/1990 | Buma et al. |
| 4,949,989 A | 8/1990 | Kakizaki et al. |
| 4,961,146 A | 10/1990 | Kajiwara |
| 4,966,247 A | 10/1990 | Masuda |
| 4,969,695 A | 11/1990 | Maehata et al. |
| 5,000,278 A | 3/1991 | Morishita |
| 5,002,028 A | 3/1991 | Arai et al. |
| 5,002,148 A | 3/1991 | Miyake et al. |
| 5,015,009 A | 5/1991 | Ohyama et al. |
| 5,018,408 A | 5/1991 | Bota et al. |
| 5,024,460 A | 6/1991 | Hanson et al. |
| 5,029,328 A | 7/1991 | Kamimura et al. |
| 5,033,328 A | 7/1991 | Shimanaka |
| 5,036,939 A | 8/1991 | Johnson et al. |
| 5,037,128 A | 8/1991 | Okuyama et al. |
| 5,040,114 A | 8/1991 | Ishikawa et al. |
| 5,054,813 A | 10/1991 | Kakizaki |
| 5,060,744 A | 10/1991 | Katoh et al. |
| 5,062,657 A | 11/1991 | Majeed |
| 5,071,157 A | 12/1991 | Majeed |
| 5,071,158 A | 12/1991 | Yonekawa et al. |
| 5,076,385 A | 12/1991 | Terazawa et al. |
| 5,078,109 A | 1/1992 | Yoshida et al. |
| 5,080,392 A | 1/1992 | Bazergui |
| 5,083,811 A | 1/1992 | Sato et al. |
| 5,088,464 A | 2/1992 | Meaney |
| 5,092,298 A | 3/1992 | Suzuki et al. |
| 5,092,624 A | 3/1992 | Fukuyama et al. |
| 5,096,219 A | 3/1992 | Hanson et al. |
| 5,105,923 A | 4/1992 | Iizuka |
| 5,113,345 A | 5/1992 | Mine et al. |

(56) References Cited

U.S. PATENT DOCUMENTS

| | | |
|---|---|---|
| 5,113,821 A | 5/1992 | Fukui et al. |
| 5,114,177 A | 5/1992 | Fukunaga et al. |
| 5,129,475 A | 7/1992 | Kawano et al. |
| 5,144,559 A | 9/1992 | Kamimura et al. |
| 5,150,635 A | 9/1992 | Minowa et al. |
| 5,161,822 A | 11/1992 | Lund |
| 5,163,538 A | 11/1992 | Derr et al. |
| 5,170,343 A | 12/1992 | Matsuda |
| 5,174,263 A | 12/1992 | Meaney |
| 5,189,615 A | 2/1993 | Rubel et al. |
| 5,218,540 A | 6/1993 | Ishikawa et al. |
| 5,233,530 A | 8/1993 | Shimada et al. |
| 5,253,728 A | 10/1993 | Matsuno et al. |
| 5,265,693 A | 11/1993 | Rees et al. |
| 5,307,777 A | 5/1994 | Sasajima et al. |
| 5,314,362 A | 5/1994 | Nagahora |
| 5,315,295 A | 5/1994 | Fujii |
| 5,337,239 A | 8/1994 | Okuda |
| 5,342,023 A | 8/1994 | Kuriki et al. |
| 5,343,396 A | 8/1994 | Youngblood |
| 5,343,780 A | 9/1994 | McDaniel et al. |
| 5,350,187 A | 9/1994 | Shinozaki |
| 5,361,209 A | 11/1994 | Tsutsumi |
| 5,361,213 A | 11/1994 | Fujieda et al. |
| 5,362,094 A | 11/1994 | Jensen |
| 5,366,236 A | 11/1994 | Kuriki et al. |
| 5,375,872 A | 12/1994 | Ohtagaki et al. |
| 5,377,107 A | 12/1994 | Shimizu et al. |
| 5,383,680 A | 1/1995 | Bock et al. |
| 5,384,705 A | 1/1995 | Inagaki et al. |
| 5,390,121 A | 2/1995 | Wolfe |
| 5,391,127 A | 2/1995 | Nishimura |
| RE34,906 E | 4/1995 | Tamaki et al. |
| 5,406,920 A | 4/1995 | Murata et al. |
| 5,413,540 A | 5/1995 | Streib et al. |
| 5,443,558 A | 8/1995 | Ibaraki et al. |
| 5,444,621 A | 8/1995 | Matsunaga et al. |
| 5,446,663 A | 8/1995 | Sasaki et al. |
| 5,467,751 A | 11/1995 | Kumagai |
| 5,475,593 A | 12/1995 | Townend |
| 5,475,596 A | 12/1995 | Henry et al. |
| 5,483,448 A | 1/1996 | Liubakka et al. |
| 5,485,161 A | 1/1996 | Vaughn |
| 5,490,487 A | 2/1996 | Kato et al. |
| 5,510,985 A | 4/1996 | Yamaoka et al. |
| 5,514,049 A | 5/1996 | Kamio et al. |
| 5,515,273 A | 5/1996 | Sasaki et al. |
| 5,521,825 A | 5/1996 | Unuvar et al. |
| 5,524,724 A | 6/1996 | Nishigaki et al. |
| 5,550,739 A | 8/1996 | Hoffmann et al. |
| 5,555,499 A | 9/1996 | Yamashita et al. |
| 5,575,737 A | 11/1996 | Weiss |
| 5,586,032 A | 12/1996 | Kallenbach et al. |
| 5,611,309 A | 3/1997 | Kumagai et al. |
| 5,630,623 A | 5/1997 | Ganzel |
| 5,632,503 A | 5/1997 | Raad et al. |
| 5,645,033 A | 7/1997 | Person et al. |
| 5,678,847 A | 10/1997 | Izawa et al. |
| 5,713,428 A | 2/1998 | Linden et al. |
| 5,749,596 A | 5/1998 | Jensen et al. |
| 5,774,820 A | 6/1998 | Linden et al. |
| 5,832,398 A | 11/1998 | Sasaki et al. |
| 5,845,726 A | 12/1998 | Kikkawa et al. |
| 5,873,802 A | 2/1999 | Tabata et al. |
| 5,880,532 A | 3/1999 | Stopher |
| 5,890,870 A | 4/1999 | Berger et al. |
| 5,897,287 A | 4/1999 | Berger et al. |
| 5,921,889 A | 7/1999 | Nozaki et al. |
| 5,922,038 A | 7/1999 | Horiuchi et al. |
| 5,938,556 A | 8/1999 | Lowell |
| 5,957,992 A | 9/1999 | Kiyono |
| 5,992,558 A | 11/1999 | Noro et al. |
| 6,000,702 A | 12/1999 | Streiter |
| 6,002,975 A | 12/1999 | Schiffmann et al. |
| 6,016,795 A | 1/2000 | Ohki |
| 6,019,085 A | 2/2000 | Sato et al. |
| 6,032,752 A | 3/2000 | Karpik et al. |
| 6,038,500 A | 3/2000 | Weiss |
| 6,070,681 A | 6/2000 | Catanzarite et al. |
| 6,073,072 A | 6/2000 | Ishii et al. |
| 6,073,074 A | 6/2000 | Saito et al. |
| 6,076,027 A | 6/2000 | Raad et al. |
| 6,078,252 A | 6/2000 | Kulczycki et al. |
| 6,086,510 A | 7/2000 | Kadota |
| 6,094,614 A | 7/2000 | Hiwatashi |
| 6,112,866 A | 9/2000 | Boichot et al. |
| 6,120,399 A | 9/2000 | Okeson et al. |
| 6,122,568 A | 9/2000 | Madau et al. |
| 6,124,826 A | 9/2000 | Garthwaite et al. |
| 6,125,326 A | 9/2000 | Ohmura et al. |
| 6,125,782 A | 10/2000 | Takashima et al. |
| 6,134,499 A | 10/2000 | Goode et al. |
| 6,138,069 A | 10/2000 | Ellertson et al. |
| 6,148,252 A | 11/2000 | Iwasaki et al. |
| 6,154,703 A | 11/2000 | Nakai et al. |
| 6,155,545 A | 12/2000 | Noro et al. |
| 6,157,297 A | 12/2000 | Nakai |
| 6,157,890 A | 12/2000 | Nakai et al. |
| 6,161,908 A | 12/2000 | Takayama et al. |
| 6,167,341 A | 12/2000 | Gourmelen et al. |
| 6,170,923 B1 | 1/2001 | Iguchi et al. |
| 6,176,796 B1 | 1/2001 | Lislegard |
| 6,178,371 B1 | 1/2001 | Light et al. |
| 6,181,997 B1 | 1/2001 | Badenoch et al. |
| 6,192,305 B1 | 2/2001 | Schiffmann |
| 6,206,124 B1 | 3/2001 | Mallette et al. |
| 6,217,480 B1 | 4/2001 | Iwata et al. |
| 6,226,389 B1 | 5/2001 | Lemelson et al. |
| 6,240,365 B1 | 5/2001 | Bunn |
| 6,244,398 B1 | 6/2001 | Girvin et al. |
| 6,244,986 B1 | 6/2001 | Mori et al. |
| 6,249,728 B1 | 6/2001 | Streiter |
| 6,249,744 B1 | 6/2001 | Morita |
| 6,254,108 B1 | 7/2001 | Germain et al. |
| 6,260,650 B1 | 7/2001 | Gustavsson |
| 6,263,858 B1 | 7/2001 | Pursifull et al. |
| 6,275,763 B1 | 8/2001 | Lotito et al. |
| 6,276,333 B1 | 8/2001 | Kazama et al. |
| 6,288,534 B1 | 9/2001 | Starkweather et al. |
| 6,290,034 B1 | 9/2001 | Ichimaru |
| 6,318,337 B1 | 11/2001 | Pursifull |
| 6,318,490 B1 | 11/2001 | Laning |
| 6,343,248 B1 | 1/2002 | Rizzotto et al. |
| 6,351,704 B1 | 2/2002 | Koerner |
| 6,352,142 B1 | 3/2002 | Kim |
| 6,370,458 B1 | 4/2002 | Shal et al. |
| 6,370,472 B1 | 4/2002 | Fosseen |
| 6,371,884 B1 | 4/2002 | Channing |
| 6,379,114 B1 | 4/2002 | Schott et al. |
| 6,427,115 B1 | 7/2002 | Sekiyama |
| 6,456,908 B1 | 9/2002 | Kumar |
| 6,463,385 B1 | 10/2002 | Fry |
| 6,470,852 B1 | 10/2002 | Kanno |
| 6,476,714 B2 | 11/2002 | Mizuta |
| 6,483,201 B1 | 11/2002 | Klarer |
| 6,483,467 B2 | 11/2002 | Kushida et al. |
| 6,485,340 B1 | 11/2002 | Kolb et al. |
| 6,488,609 B1 | 12/2002 | Morimoto et al. |
| 6,502,025 B1 | 12/2002 | Kempen |
| 6,507,778 B2 | 1/2003 | Koh |
| 6,513,611 B2 | 2/2003 | Ito et al. |
| 6,526,342 B1 | 2/2003 | Burdock et al. |
| 6,551,153 B1 | 4/2003 | Hattori |
| 6,573,827 B1 | 6/2003 | McKenzie |
| 6,581,710 B2 | 6/2003 | Sprinkle et al. |
| 6,604,034 B1 | 8/2003 | Speck et al. |
| 6,644,318 B1 | 11/2003 | Adams et al. |
| 6,647,328 B2 | 11/2003 | Walker |
| 6,655,233 B2 | 12/2003 | Evans et al. |
| 6,657,539 B2 | 12/2003 | Yamamoto et al. |
| 6,675,577 B2 | 1/2004 | Evans |
| 6,684,140 B2 | 1/2004 | Lu |
| 6,685,174 B2 | 2/2004 | Behmenburg et al. |
| 6,699,085 B2 | 3/2004 | Hattori |

(56) References Cited

U.S. PATENT DOCUMENTS

| | | |
|---|---|---|
| 6,704,643 B1 | 3/2004 | Suhre et al. |
| 6,719,313 B2 | 4/2004 | Zadok |
| 6,738,705 B2 | 5/2004 | Kojima et al. |
| 6,738,708 B2 | 5/2004 | Suzuki et al. |
| 6,752,401 B2 | 6/2004 | Burdock |
| 6,757,606 B1 | 6/2004 | Gonring |
| 6,761,145 B2 | 7/2004 | Matsuda et al. |
| 6,772,061 B1 | 8/2004 | Berthiaume et al. |
| 6,795,764 B2 | 9/2004 | Schmitz et al. |
| 6,820,712 B2 | 11/2004 | Nakamura |
| 6,834,736 B2 | 12/2004 | Kramer et al. |
| 6,839,630 B2 | 1/2005 | Sakamoto |
| 6,845,314 B2 | 1/2005 | Fosseen |
| 6,845,829 B2 | 1/2005 | Hafendorfer |
| 6,848,420 B2 | 2/2005 | Ishiguro et al. |
| 6,848,956 B2 | 2/2005 | Ozawa |
| 6,851,495 B2 | 2/2005 | Sprinkle et al. |
| 6,851,679 B2 | 2/2005 | Downey et al. |
| 6,860,826 B1 | 3/2005 | Johnson |
| 6,874,467 B2 | 4/2005 | Hunt et al. |
| 6,876,924 B2 | 4/2005 | Morita et al. |
| 6,880,532 B1 | 4/2005 | Kerns et al. |
| 6,886,529 B2 | 5/2005 | Suzuki et al. |
| 6,887,182 B2 | 5/2005 | Nakatani et al. |
| 6,889,654 B2 | 5/2005 | Ito |
| 6,895,318 B1 | 5/2005 | Barton et al. |
| 6,895,518 B2 | 5/2005 | Wingen |
| 6,897,629 B2 | 5/2005 | Wilton et al. |
| 6,938,508 B1 | 9/2005 | Saagge |
| 6,941,209 B2 | 9/2005 | Liu |
| 6,942,050 B1 | 9/2005 | Honkala et al. |
| 6,945,541 B2 | 9/2005 | Brown |
| 6,964,259 B1 | 11/2005 | Raetzman |
| 6,964,260 B2 | 11/2005 | Samoto et al. |
| 6,976,689 B2 | 12/2005 | Hibbert |
| 6,990,401 B2 | 1/2006 | Neiss et al. |
| 7,005,976 B2 | 2/2006 | Hagenbuch |
| 7,011,174 B1 | 3/2006 | James |
| 7,032,895 B2 | 4/2006 | Folchert |
| 7,035,836 B2 | 4/2006 | Caponetto et al. |
| 7,036,485 B1 | 5/2006 | Koerner |
| 7,044,260 B2 | 5/2006 | Schaedler et al. |
| 7,055,454 B1 | 6/2006 | Whiting et al. |
| 7,055,497 B2 | 6/2006 | Maehara et al. |
| 7,055,545 B2 | 6/2006 | Mascari et al. |
| 7,058,490 B2 | 6/2006 | Kim |
| 7,058,506 B2 | 6/2006 | Kawase et al. |
| 7,066,142 B2 | 6/2006 | Hanasato |
| 7,070,012 B2 | 7/2006 | Fecteau |
| 7,076,351 B2 | 7/2006 | Hamilton et al. |
| 7,077,713 B2 | 7/2006 | Watabe et al. |
| 7,077,784 B2 | 7/2006 | Banta et al. |
| 7,086,379 B2 | 8/2006 | Blomenberg et al. |
| 7,092,808 B2 | 8/2006 | Lu et al. |
| 7,096,851 B2 | 8/2006 | Matsuda et al. |
| 7,097,166 B2 | 8/2006 | Folchert |
| 7,104,352 B2 | 9/2006 | Weinzierl |
| 7,123,189 B2 | 10/2006 | Lalik et al. |
| 7,124,865 B2 | 10/2006 | Turner et al. |
| 7,136,729 B2 | 11/2006 | Salman et al. |
| 7,140,619 B2 | 11/2006 | Hrovat et al. |
| 7,163,000 B2 | 1/2007 | Ishida et al. |
| 7,168,709 B2 | 1/2007 | Niwa et al. |
| 7,171,945 B2 | 2/2007 | Matsuda et al. |
| 7,171,947 B2 | 2/2007 | Fukushima et al. |
| 7,182,063 B2 | 2/2007 | Keefover et al. |
| 7,184,873 B1 | 2/2007 | Idsinga et al. |
| 7,185,630 B2 | 3/2007 | Takahashi et al. |
| 7,220,153 B2 | 5/2007 | Okuyama |
| 7,233,846 B2 | 6/2007 | Kawauchi et al. |
| 7,234,707 B2 | 6/2007 | Green et al. |
| 7,235,963 B2 | 6/2007 | Wayama |
| 7,249,986 B2 | 7/2007 | Otobe et al. |
| 7,259,357 B2 | 8/2007 | Walker |
| 7,260,319 B2 | 8/2007 | Watanabe et al. |
| 7,260,471 B2 | 8/2007 | Matsuda et al. |
| 7,270,335 B2 | 9/2007 | Hio et al. |
| 7,280,904 B2 | 10/2007 | Kaji |
| 7,286,919 B2 | 10/2007 | Nordgren et al. |
| 7,287,511 B2 | 10/2007 | Matsuda |
| 7,287,760 B1 | 10/2007 | Quick et al. |
| 7,305,295 B2 | 12/2007 | Bauerle et al. |
| 7,311,082 B2 | 12/2007 | Yokoi |
| 7,315,779 B1 | 1/2008 | Rioux et al. |
| 7,316,288 B1 | 1/2008 | Bennett et al. |
| 7,318,410 B2 | 1/2008 | Yokoi |
| 7,318,593 B2 | 1/2008 | Sterly et al. |
| 7,322,435 B2 | 1/2008 | Lillbacka et al. |
| 7,325,533 B2 | 2/2008 | Matsuda |
| 7,331,326 B2 | 2/2008 | Arai et al. |
| 7,354,321 B2 | 4/2008 | Takada et al. |
| 7,359,787 B2 | 4/2008 | Ono et al. |
| 7,367,247 B2 | 5/2008 | Horiuchi et al. |
| 7,367,316 B2 | 5/2008 | Russell et al. |
| 7,367,854 B2 | 5/2008 | Arvidsson |
| 7,380,538 B1 | 6/2008 | Gagnon et al. |
| 7,386,378 B2 | 6/2008 | Lauwerys et al. |
| 7,399,210 B2 | 7/2008 | Yoshimasa |
| 7,401,794 B2 | 7/2008 | Laurent et al. |
| 7,413,196 B2 | 8/2008 | Borowski |
| 7,416,458 B2 | 8/2008 | Suemori et al. |
| 7,421,954 B2 | 9/2008 | Bose |
| 7,422,495 B2 | 9/2008 | Kinoshita et al. |
| 7,427,072 B2 | 9/2008 | Brown |
| 7,431,013 B2 | 10/2008 | Hotta et al. |
| 7,433,774 B2 | 10/2008 | Sen et al. |
| 7,441,789 B2 | 10/2008 | Geiger et al. |
| 7,445,071 B2 | 11/2008 | Yamazaki et al. |
| 7,454,282 B2 | 11/2008 | Mizuguchi |
| 7,454,284 B2 | 11/2008 | Fosseen |
| 7,458,360 B2 | 12/2008 | Irihune et al. |
| 7,461,630 B2 | 12/2008 | Maruo et al. |
| 7,475,746 B2 | 1/2009 | Tsukada et al. |
| 7,478,689 B1 | 1/2009 | Sugden et al. |
| 7,483,775 B2 | 1/2009 | Karaba et al. |
| 7,486,199 B2 | 2/2009 | Tengler et al. |
| 7,505,836 B2 | 3/2009 | Okuyama et al. |
| 7,506,633 B2 | 3/2009 | Cowan |
| 7,510,060 B2 | 3/2009 | Izawa et al. |
| 7,523,737 B2 | 4/2009 | Deguchi et al. |
| 7,526,665 B2 | 4/2009 | Kim et al. |
| 7,529,609 B2 | 5/2009 | Braunberger et al. |
| 7,530,345 B1 | 5/2009 | Plante et al. |
| 7,533,750 B2 | 5/2009 | Simmons et al. |
| 7,533,890 B2 | 5/2009 | Chiao |
| 7,571,039 B2 | 8/2009 | Chen et al. |
| 7,571,073 B2 | 8/2009 | Gamberini et al. |
| 7,598,849 B2 | 10/2009 | Gallant et al. |
| 7,600,762 B2 | 10/2009 | Yasui et al. |
| 7,611,154 B2 | 11/2009 | Delaney |
| 7,630,807 B2 | 12/2009 | Yoshimura et al. |
| 7,641,208 B1 | 1/2010 | Barron et al. |
| 7,644,934 B2 | 1/2010 | Mizuta |
| 7,647,143 B2 | 1/2010 | Ito et al. |
| 7,684,911 B2 | 3/2010 | Seifert et al. |
| 7,707,012 B2 | 4/2010 | Stephens |
| 7,711,468 B1 | 5/2010 | Levy |
| 7,740,256 B2 | 6/2010 | Davis |
| 7,751,959 B2 | 7/2010 | Boon et al. |
| 7,771,313 B2 | 8/2010 | Cullen et al. |
| 7,778,741 B2 | 8/2010 | Rao et al. |
| 7,810,818 B2 | 10/2010 | Bushko |
| 7,815,205 B2 | 10/2010 | Barth et al. |
| 7,822,514 B1 | 10/2010 | Erickson |
| 7,823,106 B2 | 10/2010 | Baker et al. |
| 7,823,891 B2 | 11/2010 | Bushko et al. |
| 7,826,959 B2 | 11/2010 | Namari et al. |
| 7,862,061 B2 | 1/2011 | Jung |
| 7,885,750 B2 | 2/2011 | Lu |
| 7,899,594 B2 | 3/2011 | Messih et al. |
| 7,912,610 B2 | 3/2011 | Saito et al. |
| 7,926,822 B2 | 4/2011 | Ohletz et al. |
| 7,940,383 B2 | 5/2011 | Noguchi et al. |
| 7,942,427 B2 | 5/2011 | Lloyd |

(56) References Cited

U.S. PATENT DOCUMENTS

| | | |
|---|---|---|
| 7,950,486 B2 | 5/2011 | Van et al. |
| 7,959,163 B2 | 6/2011 | Beno et al. |
| 7,962,261 B2 | 6/2011 | Bushko et al. |
| 7,963,529 B2 | 6/2011 | Oteman et al. |
| 7,970,512 B2 | 6/2011 | Lu et al. |
| 7,975,794 B2 | 7/2011 | Simmons |
| 7,984,915 B2 | 7/2011 | Post et al. |
| 8,005,596 B2 | 8/2011 | Lu et al. |
| 8,027,775 B2 | 9/2011 | Takenaka et al. |
| 8,032,281 B2 | 10/2011 | Bujak et al. |
| 8,050,818 B2 | 11/2011 | Mizuta |
| 8,050,857 B2 | 11/2011 | Lu et al. |
| 8,056,392 B2 | 11/2011 | Ryan et al. |
| 8,065,054 B2 | 11/2011 | Tarasinski et al. |
| 8,075,002 B1 | 12/2011 | Pionke et al. |
| 8,086,371 B2 | 12/2011 | Furuichi et al. |
| 8,087,676 B2 | 1/2012 | Mcintyre |
| 8,095,268 B2 | 1/2012 | Parison et al. |
| 8,108,104 B2 | 1/2012 | Hrovat et al. |
| 8,113,521 B2 | 2/2012 | Lin et al. |
| 8,116,938 B2 | 2/2012 | Itagaki et al. |
| 8,121,757 B2 | 2/2012 | Song et al. |
| 8,170,749 B2 | 5/2012 | Mizuta |
| 8,190,327 B2 | 5/2012 | Poilbout |
| 8,195,361 B2 | 6/2012 | Kajino et al. |
| 8,204,666 B2 | 6/2012 | Takeuchi et al. |
| 8,209,087 B2 | 6/2012 | Haegglund et al. |
| 8,214,106 B2 | 7/2012 | Ghoneim et al. |
| 8,219,262 B2 | 7/2012 | Stiller |
| 8,229,642 B2 | 7/2012 | Post et al. |
| 8,260,496 B2 | 9/2012 | Gagliano |
| 8,271,175 B2 | 9/2012 | Takenaka et al. |
| 8,296,010 B2 | 10/2012 | Hirao et al. |
| 8,308,170 B2 | 11/2012 | Van et al. |
| 8,315,764 B2 | 11/2012 | Chen et al. |
| 8,315,769 B2 | 11/2012 | Braunberger et al. |
| 8,321,088 B2 | 11/2012 | Brown et al. |
| 8,322,497 B2 | 12/2012 | Marjoram et al. |
| 8,352,143 B2 | 1/2013 | Lu et al. |
| 8,355,840 B2 | 1/2013 | Ammon et al. |
| 8,359,149 B2 | 1/2013 | Shin |
| 8,374,748 B2 | 2/2013 | Jolly |
| 8,376,373 B2 | 2/2013 | Conradie |
| 8,382,130 B2 | 2/2013 | Nakamura |
| 8,396,627 B2 | 3/2013 | Jung et al. |
| 8,417,417 B2 | 4/2013 | Chen et al. |
| 8,424,832 B2 | 4/2013 | Robbins et al. |
| 8,428,839 B2 | 4/2013 | Braunberger et al. |
| 8,434,774 B2 | 5/2013 | Leclerc et al. |
| 8,437,935 B2 | 5/2013 | Braunberger et al. |
| 8,442,720 B2 | 5/2013 | Lu et al. |
| 8,444,161 B2 | 5/2013 | Leclerc et al. |
| 8,447,489 B2 | 5/2013 | Murata et al. |
| 8,457,841 B2 | 6/2013 | Knoll et al. |
| 8,473,157 B2 | 6/2013 | Savaresi et al. |
| 8,517,395 B2 | 8/2013 | Knox et al. |
| 8,532,896 B2 | 9/2013 | Braunberger et al. |
| 8,534,397 B2 | 9/2013 | Grajkowski et al. |
| 8,534,413 B2 | 9/2013 | Nelson et al. |
| 8,548,678 B2 | 10/2013 | Ummethala et al. |
| 8,550,221 B2 | 10/2013 | Paulides et al. |
| 8,571,776 B2 | 10/2013 | Braunberger et al. |
| 8,573,605 B2 | 11/2013 | Di Maria |
| 8,626,388 B2 | 1/2014 | Oikawa |
| 8,626,389 B2 | 1/2014 | Sidlosky |
| 8,641,052 B2 | 2/2014 | Kondo et al. |
| 8,645,024 B2 | 2/2014 | Daniels |
| 8,651,503 B2 | 2/2014 | Rhodig |
| 8,666,596 B2 | 3/2014 | Arenz |
| 8,672,106 B2 | 3/2014 | Laird et al. |
| 8,672,337 B2 | 3/2014 | Van et al. |
| 8,676,440 B2 | 3/2014 | Watson |
| 8,682,530 B2 | 3/2014 | Nakamura |
| 8,682,550 B2 | 3/2014 | Nelson et al. |
| 8,682,558 B2 | 3/2014 | Braunberger et al. |
| 8,684,887 B2 | 4/2014 | Krosschell |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,725,380 B2 | 5/2014 | Braunberger et al. |
| 8,731,774 B2 | 5/2014 | Yang |
| 8,770,594 B2 | 7/2014 | Tominaga et al. |
| 8,827,019 B2 | 9/2014 | Deckard et al. |
| 8,903,617 B2 | 12/2014 | Braunberger et al. |
| 8,954,251 B2 | 2/2015 | Braunberger et al. |
| 8,972,712 B2 | 3/2015 | Braunberger |
| 8,973,930 B2 | 3/2015 | Rhodig |
| 8,994,494 B2 | 3/2015 | Koenig et al. |
| 8,997,952 B2 | 4/2015 | Getz et al. |
| 9,010,768 B2 | 4/2015 | Kinsman et al. |
| 9,027,937 B2 | 5/2015 | Ryan et al. |
| 9,038,791 B2 | 5/2015 | Marking |
| 9,050,869 B1 | 6/2015 | Pelzer |
| 9,123,249 B2 | 9/2015 | Braunberger et al. |
| 9,150,070 B2 | 10/2015 | Luttinen et al. |
| 9,151,384 B2 | 10/2015 | Kohler et al. |
| 9,162,573 B2 | 10/2015 | Grajkowski et al. |
| 9,186,952 B2 | 11/2015 | Yleva |
| 9,205,717 B2 | 12/2015 | Brady et al. |
| 9,211,924 B2 | 12/2015 | Safranski et al. |
| 9,327,726 B2 | 5/2016 | Braunberger et al. |
| 9,327,789 B1 | 5/2016 | Vezina et al. |
| 9,365,251 B2 | 6/2016 | Safranski et al. |
| 9,371,002 B2 | 6/2016 | Braunberger |
| 9,381,810 B2 | 7/2016 | Nelson et al. |
| 9,381,902 B2 | 7/2016 | Braunberger et al. |
| 9,428,242 B2 | 8/2016 | Ginther et al. |
| 9,429,235 B2 | 8/2016 | Krosschell et al. |
| 9,527,362 B2 | 12/2016 | Scheuerell et al. |
| 9,643,538 B2 | 5/2017 | Braunberger et al. |
| 9,643,616 B2 | 5/2017 | Lu |
| 9,662,954 B2 | 5/2017 | Scheuerell et al. |
| 9,665,418 B2 | 5/2017 | Arnott et al. |
| 9,695,899 B2 | 7/2017 | Smith et al. |
| 9,771,084 B2 | 9/2017 | Norstad |
| 9,802,621 B2 | 10/2017 | Gillingham et al. |
| 9,809,195 B2 | 11/2017 | Giese et al. |
| 9,830,821 B2 | 11/2017 | Braunberger et al. |
| 9,834,184 B2 | 12/2017 | Braunberger |
| 9,834,215 B2 | 12/2017 | Braunberger et al. |
| 9,855,986 B2 | 1/2018 | Braunberger et al. |
| 9,868,385 B2 | 1/2018 | Braunberger |
| 9,878,693 B2 | 1/2018 | Braunberger |
| 9,920,810 B2 | 3/2018 | Smeljanskij et al. |
| 9,937,762 B2 | 4/2018 | Sunahiro |
| 9,945,298 B2 | 4/2018 | Braunberger et al. |
| 10,005,335 B2 | 6/2018 | Brady et al. |
| 10,046,694 B2 | 8/2018 | Braunberger et al. |
| 10,086,698 B2 | 10/2018 | Grajkowski et al. |
| 10,137,873 B2 | 11/2018 | Bowers et al. |
| 10,154,377 B2 | 12/2018 | Post et al. |
| 10,189,428 B1 | 1/2019 | Sellars et al. |
| 10,195,989 B2 | 2/2019 | Braunberger et al. |
| 10,202,159 B2 | 2/2019 | Braunberger et al. |
| 10,207,554 B2 | 2/2019 | Schroeder et al. |
| 10,220,765 B2 | 3/2019 | Braunberger |
| 10,227,041 B2 | 3/2019 | Braunberger et al. |
| 10,266,164 B2 | 4/2019 | Braunberger |
| 10,363,941 B2 | 7/2019 | Norstad |
| 10,384,682 B2 | 8/2019 | Braunberger et al. |
| 10,391,989 B2 | 8/2019 | Braunberger |
| 10,406,884 B2 | 9/2019 | Oakden-Graus et al. |
| 10,410,520 B2 | 9/2019 | Braunberger et al. |
| 10,436,125 B2 | 10/2019 | Braunberger et al. |
| 10,450,006 B2 | 10/2019 | Kinsman et al. |
| 10,479,408 B2 | 11/2019 | Upah et al. |
| 10,578,184 B2 | 3/2020 | Gilbert et al. |
| 10,704,640 B2 | 7/2020 | Galasso et al. |
| 10,723,408 B2 | 7/2020 | Pelot |
| 10,731,724 B2 | 8/2020 | Laird et al. |
| 10,774,896 B2 | 9/2020 | Hamers et al. |
| 10,933,710 B2 | 3/2021 | Tong |

(56) References Cited

U.S. PATENT DOCUMENTS

| | | |
|---|---|---|
| 10,975,780 B2 | 4/2021 | Wishin et al. |
| 10,981,429 B2 | 4/2021 | Tsiaras et al. |
| 11,001,120 B2 | 5/2021 | Cox |
| 11,110,913 B2 | 9/2021 | Krosschell et al. |
| 11,124,036 B2 | 9/2021 | Brady et al. |
| 11,142,033 B2 | 10/2021 | Yoshida et al. |
| 11,148,748 B2 | 10/2021 | Galasso |
| 11,152,555 B2 | 10/2021 | Hiller |
| 11,162,555 B2 | 11/2021 | Haugen |
| 11,192,414 B1 | 12/2021 | Berardi |
| 11,192,424 B2 | 12/2021 | Tabata et al. |
| 11,279,198 B2 | 3/2022 | Marking |
| 11,285,964 B2 | 3/2022 | Norstad et al. |
| 11,306,798 B2 | 4/2022 | Cox et al. |
| 11,351,834 B2 | 6/2022 | Cox |
| 11,364,762 B2 | 6/2022 | Hadi |
| 11,400,784 B2 | 8/2022 | Brady et al. |
| 11,400,785 B2 | 8/2022 | Brady et al. |
| 11,400,786 B2 | 8/2022 | Brady et al. |
| 11,400,787 B2 | 8/2022 | Brady et al. |
| 11,413,924 B2 | 8/2022 | Cox et al. |
| 11,448,283 B2 | 9/2022 | Strickland |
| 11,472,252 B2 | 10/2022 | Tong |
| 11,479,075 B2 | 10/2022 | Graus et al. |
| 11,975,584 B2 | 5/2024 | Graus et al. |
| 2001/0005803 A1 | 6/2001 | Cochofel et al. |
| 2001/0021887 A1 | 9/2001 | Obradovich et al. |
| 2001/0035166 A1 | 11/2001 | Kerns et al. |
| 2001/0052756 A1 | 12/2001 | Noro et al. |
| 2002/0082752 A1 | 6/2002 | Obradovich |
| 2002/0113185 A1 | 8/2002 | Ziegler |
| 2002/0113393 A1 | 8/2002 | Urbach |
| 2002/0115357 A1 | 8/2002 | Hiki et al. |
| 2002/0125675 A1 | 9/2002 | Clements et al. |
| 2002/0177949 A1 | 11/2002 | Katayama et al. |
| 2002/0193935 A1 | 12/2002 | Hashimoto et al. |
| 2003/0014174 A1 | 1/2003 | Giers |
| 2003/0036360 A1 | 2/2003 | Russell et al. |
| 2003/0036823 A1 | 2/2003 | Mahvi |
| 2003/0038411 A1 | 2/2003 | Sendrea |
| 2003/0046000 A1 | 3/2003 | Morita et al. |
| 2003/0047994 A1 | 3/2003 | Koh |
| 2003/0054831 A1 | 3/2003 | Bardmesser |
| 2003/0062025 A1 | 4/2003 | Samoto et al. |
| 2003/0125857 A1 | 7/2003 | Madau et al. |
| 2003/0187555 A1 | 10/2003 | Lutz et al. |
| 2003/0200016 A1 | 10/2003 | Spillane et al. |
| 2003/0205867 A1 | 11/2003 | Coelingh et al. |
| 2004/0010383 A1 | 1/2004 | Lu et al. |
| 2004/0015275 A1 | 1/2004 | Herzog et al. |
| 2004/0024515 A1 | 2/2004 | Troupe et al. |
| 2004/0026880 A1 | 2/2004 | Bundy |
| 2004/0034460 A1 | 2/2004 | Folkerts et al. |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2004/0216550 A1 | 11/2004 | Fallak et al. |
| 2004/0226538 A1 | 11/2004 | Cannone et al. |
| 2004/0245034 A1 | 12/2004 | Miyamoto et al. |
| 2005/0004736 A1 | 1/2005 | Belcher et al. |
| 2005/0023789 A1 | 2/2005 | Suzuki et al. |
| 2005/0027428 A1 | 2/2005 | Glora et al. |
| 2005/0045148 A1 | 3/2005 | Katsuragawa et al. |
| 2005/0077696 A1 | 4/2005 | Ogawa |
| 2005/0098964 A1 | 5/2005 | Brown |
| 2005/0131604 A1 | 6/2005 | Lu |
| 2005/0133006 A1 | 6/2005 | Frenz et al. |
| 2005/0149246 A1 | 7/2005 | McLeod |
| 2005/0155571 A1 | 7/2005 | Hanasato |
| 2005/0217953 A1 | 10/2005 | Bossard |
| 2005/0267663 A1 | 12/2005 | Naono et al. |
| 2005/0279244 A1 | 12/2005 | Bose |
| 2005/0280219 A1 | 12/2005 | Brown |
| 2005/0284446 A1 | 12/2005 | Okuyama |
| 2006/0014606 A1 | 1/2006 | Sporl et al. |
| 2006/0017240 A1 | 1/2006 | Laurent et al. |
| 2006/0018636 A1 | 1/2006 | Watanabe et al. |
| 2006/0052909 A1 | 3/2006 | Cherouny |
| 2006/0064223 A1 | 3/2006 | Voss |
| 2006/0065239 A1 | 3/2006 | Tsukada et al. |
| 2006/0112930 A1 | 6/2006 | Matsuda et al. |
| 2006/0162681 A1 | 7/2006 | Kawasaki |
| 2006/0191739 A1 | 8/2006 | Koga |
| 2006/0224294 A1 | 10/2006 | Kawazoe et al. |
| 2006/0226611 A1 | 10/2006 | Xiao et al. |
| 2006/0229811 A1 | 10/2006 | Herman et al. |
| 2006/0235602 A1 | 10/2006 | Ishida et al. |
| 2006/0243246 A1 | 11/2006 | Yokoi |
| 2006/0243247 A1 | 11/2006 | Yokoi |
| 2006/0247840 A1 | 11/2006 | Matsuda et al. |
| 2006/0270520 A1 | 11/2006 | Owens |
| 2006/0278197 A1 | 12/2006 | Takamatsu et al. |
| 2006/0284387 A1 | 12/2006 | Klees |
| 2007/0007742 A1 | 1/2007 | Allen et al. |
| 2007/0023566 A1 | 2/2007 | Howard |
| 2007/0028888 A1 | 2/2007 | Jasem |
| 2007/0039770 A1 | 2/2007 | Barrette et al. |
| 2007/0045028 A1 | 3/2007 | Yamamoto et al. |
| 2007/0050095 A1 | 3/2007 | Nelson et al. |
| 2007/0050125 A1 | 3/2007 | Matsuda et al. |
| 2007/0068490 A1 | 3/2007 | Matsuda |
| 2007/0073461 A1 | 3/2007 | Fielder |
| 2007/0096672 A1 | 5/2007 | Endo et al. |
| 2007/0118268 A1 | 5/2007 | Inoue et al. |
| 2007/0119419 A1 | 5/2007 | Matsuda |
| 2007/0120332 A1 | 5/2007 | Bushko et al. |
| 2007/0126628 A1 | 6/2007 | Lalik et al. |
| 2007/0142167 A1 | 6/2007 | Kanafani et al. |
| 2007/0151544 A1 | 7/2007 | Arai et al. |
| 2007/0158920 A1 | 7/2007 | Delaney |
| 2007/0168125 A1 | 7/2007 | Petrik |
| 2007/0169744 A1 | 7/2007 | Maruo et al. |
| 2007/0178779 A1 | 8/2007 | Takada et al. |
| 2007/0192001 A1 | 8/2007 | Tatsumi et al. |
| 2007/0213920 A1 | 9/2007 | Igarashi et al. |
| 2007/0227796 A1 | 10/2007 | Simmons et al. |
| 2007/0239331 A1 | 10/2007 | Kaplan |
| 2007/0240917 A1 | 10/2007 | Duceppe |
| 2007/0244619 A1 | 10/2007 | Peterson |
| 2007/0246010 A1 | 10/2007 | Okuyama et al. |
| 2007/0247291 A1 | 10/2007 | Masuda et al. |
| 2007/0255462 A1 | 11/2007 | Masuda et al. |
| 2007/0255466 A1 | 11/2007 | Chiao |
| 2007/0260372 A1 | 11/2007 | Langer |
| 2007/0271026 A1 | 11/2007 | Hijikata |
| 2007/0294008 A1 | 12/2007 | Yasui et al. |
| 2008/0004773 A1 | 1/2008 | Maeda |
| 2008/0015767 A1 | 1/2008 | Masuda et al. |
| 2008/0022969 A1 | 1/2008 | Frenz et al. |
| 2008/0059034 A1 | 3/2008 | Lu |
| 2008/0078355 A1 | 4/2008 | Maehara et al. |
| 2008/0091309 A1 | 4/2008 | Walker |
| 2008/0114521 A1 | 5/2008 | Doering |
| 2008/0115761 A1 | 5/2008 | Deguchi et al. |
| 2008/0119984 A1 | 5/2008 | Hrovat et al. |
| 2008/0172155 A1 | 7/2008 | Takamatsu et al. |
| 2008/0178838 A1 | 7/2008 | Ota |
| 2008/0178839 A1 | 7/2008 | Oshima et al. |
| 2008/0178840 A1 | 7/2008 | Oshima et al. |
| 2008/0183353 A1 | 7/2008 | Post et al. |
| 2008/0243334 A1 | 10/2008 | Bujak et al. |
| 2008/0243336 A1 | 10/2008 | Fitzgibbons |
| 2008/0269989 A1 | 10/2008 | Brenner et al. |
| 2008/0275606 A1 | 11/2008 | Tarasinski et al. |
| 2008/0287256 A1 | 11/2008 | Unno |
| 2008/0300768 A1 | 12/2008 | Hijikata |
| 2009/0008890 A1 | 1/2009 | Woodford |
| 2009/0020966 A1 | 1/2009 | Germain |
| 2009/0037051 A1 | 2/2009 | Shimizu et al. |
| 2009/0071437 A1 | 3/2009 | Samoto et al. |
| 2009/0076699 A1 | 3/2009 | Osaki et al. |
| 2009/0093928 A1 | 4/2009 | Getman et al. |
| 2009/0095252 A1 | 4/2009 | Yamada |

(56) References Cited

U.S. PATENT DOCUMENTS

| | | |
|---|---|---|
| 2009/0095254 A1 | 4/2009 | Yamada |
| 2009/0096598 A1 | 4/2009 | Tengler et al. |
| 2009/0108546 A1 | 4/2009 | Ohletz et al. |
| 2009/0132154 A1 | 5/2009 | Fuwa et al. |
| 2009/0171546 A1 | 7/2009 | Tozuka et al. |
| 2009/0173562 A1 | 7/2009 | Namari et al. |
| 2009/0229568 A1 | 9/2009 | Nakagawa |
| 2009/0234534 A1 | 9/2009 | Stempnik et al. |
| 2009/0240427 A1 | 9/2009 | Siereveld et al. |
| 2009/0243339 A1 | 10/2009 | Orr et al. |
| 2009/0254249 A1 | 10/2009 | Ghoneim et al. |
| 2009/0254259 A1 | 10/2009 | The |
| 2009/0261542 A1 | 10/2009 | McIntyre |
| 2009/0287392 A1 | 11/2009 | Thomas |
| 2009/0301830 A1 | 12/2009 | Kinsman et al. |
| 2009/0308682 A1 | 12/2009 | Ripley et al. |
| 2009/0312147 A1 | 12/2009 | Oshima et al. |
| 2009/0321167 A1 | 12/2009 | Simmons |
| 2010/0012399 A1 | 1/2010 | Hansen |
| 2010/0016120 A1 | 1/2010 | Dickinson et al. |
| 2010/0017059 A1 | 1/2010 | Lu et al. |
| 2010/0017070 A1 | 1/2010 | Doering et al. |
| 2010/0023236 A1 | 1/2010 | Morgan et al. |
| 2010/0057297 A1 | 3/2010 | Itagaki et al. |
| 2010/0059964 A1 | 3/2010 | Morris |
| 2010/0109277 A1 | 5/2010 | Furrer |
| 2010/0113214 A1 | 5/2010 | Krueger et al. |
| 2010/0121529 A1 | 5/2010 | Savaresi et al. |
| 2010/0131131 A1 | 5/2010 | Kamio et al. |
| 2010/0138142 A1 | 6/2010 | Pease |
| 2010/0140009 A1 | 6/2010 | Kamen et al. |
| 2010/0145579 A1 | 6/2010 | O'Brien |
| 2010/0145581 A1 | 6/2010 | Hou |
| 2010/0145595 A1 | 6/2010 | Bellistri et al. |
| 2010/0152969 A1 | 6/2010 | Li et al. |
| 2010/0181416 A1 | 7/2010 | Sakamoto et al. |
| 2010/0191420 A1 | 7/2010 | Honma et al. |
| 2010/0203933 A1 | 8/2010 | Eyzaguirre et al. |
| 2010/0211261 A1 | 8/2010 | Sasaki et al. |
| 2010/0219004 A1 | 9/2010 | MacKenzie |
| 2010/0230876 A1 | 9/2010 | Inoue et al. |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0276906 A1 | 11/2010 | Galasso et al. |
| 2010/0282210 A1 | 11/2010 | Itagaki |
| 2010/0301571 A1 | 12/2010 | Van et al. |
| 2011/0022266 A1 | 1/2011 | Ippolito et al. |
| 2011/0025012 A1 | 2/2011 | Nakamura |
| 2011/0035089 A1 | 2/2011 | Hirao et al. |
| 2011/0035105 A1 | 2/2011 | Jolly |
| 2011/0036656 A1 | 2/2011 | Nicoson |
| 2011/0074123 A1 | 3/2011 | Fought et al. |
| 2011/0109060 A1 | 5/2011 | Earle et al. |
| 2011/0153158 A1 | 6/2011 | Acocella |
| 2011/0153174 A1 | 6/2011 | Roberge et al. |
| 2011/0166744 A1 | 7/2011 | Lu et al. |
| 2011/0186360 A1 | 8/2011 | Brehob et al. |
| 2011/0190972 A1 | 8/2011 | Timmons et al. |
| 2011/0215544 A1 | 9/2011 | Rhodig |
| 2011/0270509 A1 | 11/2011 | Whitney et al. |
| 2011/0297462 A1 | 12/2011 | Grajkowski et al. |
| 2011/0297463 A1 | 12/2011 | Grajkowski et al. |
| 2011/0301824 A1 | 12/2011 | Nelson et al. |
| 2011/0301825 A1 | 12/2011 | Grajkowski et al. |
| 2011/0307155 A1 | 12/2011 | Simard |
| 2012/0017871 A1 | 1/2012 | Matsuda |
| 2012/0018263 A1 | 1/2012 | Marking |
| 2012/0029770 A1 | 2/2012 | Hirao et al. |
| 2012/0053790 A1 | 3/2012 | Oikawa |
| 2012/0053791 A1 | 3/2012 | Harada |
| 2012/0055745 A1 | 3/2012 | Buettner et al. |
| 2012/0065860 A1 | 3/2012 | Isaji et al. |
| 2012/0078470 A1 | 3/2012 | Hirao et al. |
| 2012/0119454 A1 | 5/2012 | Di Maria |
| 2012/0136506 A1 | 5/2012 | Takeuchi et al. |
| 2012/0139328 A1 | 6/2012 | Brown et al. |
| 2012/0168268 A1 | 7/2012 | Bruno et al. |
| 2012/0191301 A1 | 7/2012 | Benyo et al. |
| 2012/0191302 A1 | 7/2012 | Sternecker et al. |
| 2012/0222908 A1 | 9/2012 | Mangum |
| 2012/0222927 A1 | 9/2012 | Marking |
| 2012/0247888 A1 | 10/2012 | Chikuma et al. |
| 2012/0253601 A1 | 10/2012 | Ichida et al. |
| 2012/0265402 A1 | 10/2012 | Post et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Baer et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0092468 A1 | 4/2013 | Nelson et al. |
| 2013/0096784 A1 | 4/2013 | Kohler et al. |
| 2013/0096785 A1 | 4/2013 | Kohler et al. |
| 2013/0096793 A1 | 4/2013 | Krosschell |
| 2013/0103259 A1 | 4/2013 | Eng et al. |
| 2013/0124045 A1 | 5/2013 | Suzuki et al. |
| 2013/0158799 A1 | 6/2013 | Kamimura |
| 2013/0161921 A1 | 6/2013 | Cheng et al. |
| 2013/0173119 A1 | 7/2013 | Izawa |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0253770 A1 | 9/2013 | Nishikawa et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0038755 A1 | 2/2014 | Ijichi et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0125027 A1 | 5/2014 | Rhodig |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0232082 A1 | 8/2014 | Oshita et al. |
| 2014/0239602 A1 | 8/2014 | Blankenship et al. |
| 2014/0316653 A1 | 10/2014 | Kikuchi et al. |
| 2014/0353933 A1 | 12/2014 | Hawksworth et al. |
| 2014/0358373 A1 | 12/2014 | Kikuchi et al. |
| 2015/0039199 A1 | 2/2015 | Kikuchi |
| 2015/0046034 A1 | 2/2015 | Kikuchi |
| 2015/0057885 A1 | 2/2015 | Brady et al. |
| 2015/0081170 A1 | 3/2015 | Kikuchi |
| 2015/0081171 A1 | 3/2015 | Ericksen et al. |
| 2015/0084290 A1 | 3/2015 | Norton et al. |
| 2015/0091269 A1 | 4/2015 | Yleva |
| 2015/0108732 A1 | 4/2015 | Luttinen et al. |
| 2015/0217778 A1 | 8/2015 | Fairgrieve et al. |
| 2015/0329141 A1 | 11/2015 | Preijert |
| 2016/0046170 A1* | 2/2016 | Lu ................... B60T 8/17551 701/1 |
| 2016/0059660 A1 | 3/2016 | Brady et al. |
| 2016/0082802 A1 | 3/2016 | Izak |
| 2016/0107498 A1 | 4/2016 | Yamazaki |
| 2016/0121689 A1 | 5/2016 | Park et al. |
| 2016/0121905 A1 | 5/2016 | Gillingham et al. |
| 2016/0121924 A1 | 5/2016 | Norstad |

(56) References Cited

U.S. PATENT DOCUMENTS

| | | |
|---|---|---|
| 2016/0153516 A1 | 6/2016 | Marking |
| 2016/0200164 A1 | 7/2016 | Tabata et al. |
| 2016/0214455 A1 | 7/2016 | Reul et al. |
| 2016/0236528 A1 | 8/2016 | Sunahiro |
| 2016/0280331 A1 | 9/2016 | Mangum |
| 2016/0347137 A1 | 12/2016 | Despres-Nadeau et al. |
| 2016/0347142 A1 | 12/2016 | Seong et al. |
| 2017/0008363 A1 | 1/2017 | Ericksen et al. |
| 2017/0043778 A1 | 2/2017 | Kelly |
| 2017/0087950 A1 | 3/2017 | Brady et al. |
| 2017/0129298 A1 | 5/2017 | Lu et al. |
| 2017/0129301 A1 | 5/2017 | Harvey |
| 2017/0129390 A1 | 5/2017 | Akaza et al. |
| 2017/0313152 A1 | 11/2017 | Kang |
| 2017/0321729 A1 | 11/2017 | Melcher |
| 2018/0001729 A1 | 1/2018 | Goffer et al. |
| 2018/0009443 A1 | 1/2018 | Norstad |
| 2018/0126817 A1 | 5/2018 | Russell et al. |
| 2018/0141543 A1 | 5/2018 | Krosschell et al. |
| 2018/0264902 A1 | 9/2018 | Schroeder et al. |
| 2018/0265062 A1 | 9/2018 | Bowers et al. |
| 2018/0297435 A1 | 10/2018 | Brady et al. |
| 2018/0339566 A1 | 11/2018 | Ericksen et al. |
| 2018/0354336 A1 | 12/2018 | Oakden-Graus et al. |
| 2018/0361853 A1 | 12/2018 | Grajkowski et al. |
| 2019/0100071 A1 | 4/2019 | Tsiaras et al. |
| 2019/0118604 A1 | 4/2019 | Suplin et al. |
| 2019/0118898 A1 | 4/2019 | Ericksen et al. |
| 2019/0217894 A1 | 7/2019 | Upah et al. |
| 2019/0389478 A1 | 12/2019 | Norstad |
| 2020/0016953 A1 | 1/2020 | Oakden-Graus et al. |
| 2020/0096075 A1 | 3/2020 | Lindblad |
| 2020/0156430 A1 | 5/2020 | Oakden-Graus et al. |
| 2020/0223279 A1 | 7/2020 | McKeefery |
| 2020/0238781 A1 | 7/2020 | Hadi |
| 2020/0269648 A1 | 8/2020 | Halper |
| 2020/0282786 A1 | 9/2020 | Lorenz et al. |
| 2021/0031579 A1 | 2/2021 | Booth et al. |
| 2021/0031713 A1 | 2/2021 | Kotrla et al. |
| 2021/0070124 A1 | 3/2021 | Brady et al. |
| 2021/0070125 A1 | 3/2021 | Brady et al. |
| 2021/0070126 A1 | 3/2021 | Brady et al. |
| 2021/0086578 A1 | 3/2021 | Brady et al. |
| 2021/0088100 A1 | 3/2021 | Woelfel |
| 2021/0102596 A1 | 4/2021 | Malmborg et al. |
| 2021/0108696 A1 | 4/2021 | Connor |
| 2021/0162830 A1 | 6/2021 | Graus et al. |
| 2021/0162833 A1 | 6/2021 | Graus et al. |
| 2021/0206263 A1 | 7/2021 | Grajkowski et al. |
| 2021/0229519 A1 | 7/2021 | Tsiaras et al. |
| 2021/0268860 A1 | 9/2021 | Randall |
| 2021/0300140 A1 | 9/2021 | Ericksen et al. |
| 2021/0300141 A1 | 9/2021 | De Grammont et al. |
| 2021/0316716 A1 | 10/2021 | Krosschell et al. |
| 2021/0362806 A1 | 11/2021 | Hedlund et al. |
| 2021/0379957 A1 | 12/2021 | Tabata et al. |
| 2021/0402837 A1 | 12/2021 | Azuma |
| 2022/0009304 A1 | 1/2022 | Leclerc |
| 2022/0016949 A1 | 1/2022 | Graus et al. |
| 2022/0032708 A1 | 2/2022 | Tabata et al. |
| 2022/0041029 A1 | 2/2022 | Randall et al. |
| 2022/0056976 A1 | 2/2022 | Anderson |
| 2022/0080796 A1 | 3/2022 | Dong et al. |
| 2022/0088988 A1 | 3/2022 | Menden et al. |
| 2022/0134830 A1 | 5/2022 | Voelkel et al. |
| 2022/0227191 A1 | 7/2022 | Dong et al. |
| 2022/0266844 A1 | 8/2022 | Norstad et al. |
| 2022/0288990 A1 | 9/2022 | Smith |
| 2022/0324282 A1 | 10/2022 | Brady et al. |
| 2022/0332159 A1 | 10/2022 | Corsico |
| 2022/0388362 A1 | 12/2022 | Graus et al. |
| 2022/0397194 A1 | 12/2022 | Kohler et al. |
| 2023/0013665 A1 | 1/2023 | Gagnon et al. |
| 2023/0079941 A1 | 3/2023 | Graus et al. |
| 2024/0131892 A1 | 4/2024 | Graus et al. |
| 2024/0190448 A1 | 6/2024 | Norstad et al. |
| 2024/0262151 A1 | 8/2024 | Graus et al. |

FOREIGN PATENT DOCUMENTS

| | | |
|---|---|---|
| CA | 2260292 A1 | 7/2000 |
| CA | 2851626 A1 | 4/2013 |
| CA | 2963790 A1 | 4/2016 |
| CA | 2965309 A1 | 5/2016 |
| CA | 3018906 A1 | 4/2019 |
| CN | 1129646 A | 8/1996 |
| CN | 2255379 Y | 6/1997 |
| CN | 2544987 Y | 4/2003 |
| CN | 1660615 A | 8/2005 |
| CN | 1664337 A | 9/2005 |
| CN | 1746803 A | 3/2006 |
| CN | 1749048 A | 3/2006 |
| CN | 1810530 A | 8/2006 |
| CN | 101088829 A | 12/2007 |
| CN | 101417596 A | 4/2009 |
| CN | 101522444 A | 9/2009 |
| CN | 101549626 A | 10/2009 |
| CN | 101868363 A | 10/2010 |
| CN | 201723635 U | 1/2011 |
| CN | 102069813 A | 5/2011 |
| CN | 102168732 A | 8/2011 |
| CN | 201914049 U | 8/2011 |
| CN | 202040257 U | 11/2011 |
| CN | 102616104 A | 8/2012 |
| CN | 102627063 A | 8/2012 |
| CN | 102678808 A | 9/2012 |
| CN | 202449059 U | 9/2012 |
| CN | 102729760 A | 10/2012 |
| CN | 202468817 U | 10/2012 |
| CN | 102840265 A | 12/2012 |
| CN | 103079934 A | 5/2013 |
| CN | 103303088 A | 9/2013 |
| CN | 103318184 A | 9/2013 |
| CN | 103507588 A | 1/2014 |
| CN | 104755348 A | 7/2015 |
| CN | 104768782 A | 7/2015 |
| CN | 105564437 A | 5/2016 |
| CN | 106183688 A | 12/2016 |
| CN | 106218343 A | 12/2016 |
| CN | 106794736 A | 5/2017 |
| CN | 103857576 B | 8/2017 |
| CN | 107406094 A | 11/2017 |
| CN | 107521449 A | 12/2017 |
| CN | 107521499 A | 12/2017 |
| CN | 109203900 A | 1/2019 |
| CN | 110121438 A | 8/2019 |
| CN | 110691705 A | 1/2020 |
| DE | 3705520 A1 | 9/1988 |
| DE | 3811541 A1 | 10/1988 |
| DE | 4017255 A1 | 12/1990 |
| DE | 4323589 A1 | 1/1994 |
| DE | 4328551 A1 | 3/1994 |
| DE | 19508302 A1 | 9/1996 |
| DE | 19922745 A1 | 12/2000 |
| DE | 60029553 T2 | 7/2007 |
| DE | 102010020544 A1 | 1/2011 |
| DE | 102012101278 A1 | 8/2013 |
| EP | 0361726 A2 | 4/1990 |
| EP | 0398804 A1 | 11/1990 |
| EP | 0403803 A1 | 12/1990 |
| EP | 0544108 A1 | 6/1993 |
| EP | 0546295 A1 | 6/1993 |
| EP | 0405123 | 10/1993 |
| EP | 0473766 | 2/1994 |
| EP | 0691226 A1 | 1/1996 |
| EP | 0745965 A1 | 12/1996 |
| EP | 0829383 A2 | 3/1998 |
| EP | 0953470 A2 | 11/1999 |
| EP | 1005006 A2 | 5/2000 |
| EP | 1022169 A2 | 7/2000 |
| EP | 1172239 A2 | 1/2002 |
| EP | 1219475 A1 | 7/2002 |
| EP | 1238833 A1 | 9/2002 |

(56) References Cited

FOREIGN PATENT DOCUMENTS

| | | |
|---|---|---|
| EP | 1258706 A2 | 11/2002 |
| EP | 1355209 A1 | 10/2003 |
| EP | 1449688 A2 | 8/2004 |
| EP | 1481876 A1 | 12/2004 |
| EP | 1164897 | 2/2005 |
| EP | 2123933 A2 | 11/2009 |
| EP | 2216191 A1 | 8/2010 |
| EP | 2268496 A1 | 1/2011 |
| EP | 2397349 A1 | 12/2011 |
| EP | 2517904 A1 | 10/2012 |
| EP | 3150454 A1 | 4/2017 |
| EP | 3204248 A1 | 8/2017 |
| EP | 3461663 A1 | 4/2019 |
| FR | 2935642 | 3/2010 |
| GB | 2233939 A | 1/1991 |
| GB | 2234211 A | 1/1991 |
| GB | 2259063 A | 3/1993 |
| GB | 2262491 A | 6/1993 |
| GB | 2329728 A | 3/1999 |
| GB | 2377415 A | 1/2003 |
| GB | 2412448 A | 9/2005 |
| GB | 2441348 A | 3/2008 |
| GB | 2445291 A | 7/2008 |
| GB | 2552237 A | 1/2018 |
| IN | 20130233813 | 8/2014 |
| JP | 01-208212 | 8/1989 |
| JP | 02-155815 A | 6/1990 |
| JP | 03-137209 A | 6/1991 |
| JP | 04-368211 A | 12/1992 |
| JP | 05-178055 A | 7/1993 |
| JP | 06-156036 A | 6/1994 |
| JP | 07-117433 A | 5/1995 |
| JP | 07-186668 A | 7/1995 |
| JP | 08-332940 A | 12/1996 |
| JP | 09-203640 A | 8/1997 |
| JP | 2898949 B2 | 6/1999 |
| JP | 2956221 B2 | 10/1999 |
| JP | 11-321754 A | 11/1999 |
| JP | 3087539 B2 | 9/2000 |
| JP | 2001-018623 A | 1/2001 |
| JP | 3137209 B2 | 2/2001 |
| JP | 2001-121939 A | 5/2001 |
| JP | 2001-233228 A | 8/2001 |
| JP | 2001-278089 A | 10/2001 |
| JP | 2002-219921 A | 8/2002 |
| JP | 2003-328806 A | 11/2003 |
| JP | 2008-273246 A | 11/2008 |
| JP | 2009-035220 A | 2/2009 |
| JP | 2009-160964 A | 7/2009 |
| JP | 4584510 B2 | 11/2010 |
| JP | 2011-126405 A | 6/2011 |
| JP | 5149443 B2 | 2/2013 |
| JP | 2013-173490 A | 9/2013 |
| JP | 2013-189109 A | 9/2013 |
| KR | 10-2008-0090833 A | 10/2008 |
| TW | M299089 U | 10/2006 |
| WO | 92/10693 A1 | 6/1992 |
| WO | 96/05975 A1 | 2/1996 |
| WO | 97/27388 A1 | 7/1997 |
| WO | 99/59860 A1 | 11/1999 |
| WO | 00/53057 A1 | 9/2000 |
| WO | 02/20318 A1 | 3/2002 |
| WO | 2004/009433 A1 | 1/2004 |
| WO | 2004/098941 A1 | 11/2004 |
| WO | 2009/008816 A1 | 1/2009 |
| WO | 2009/133000 A1 | 11/2009 |
| WO | 2012/028923 A1 | 3/2012 |
| WO | 2015/004676 A1 | 1/2015 |
| WO | 2016/057555 A1 | 4/2016 |
| WO | 2016/069405 A2 | 5/2016 |
| WO | 2018/189712 A1 | 10/2018 |
| WO | 2020/089837 A1 | 5/2020 |

OTHER PUBLICATIONS

Unno et al.; Development of Electronically Controlled DVT Focusing on Rider's Intention of Acceleration and Deceleration; SAE International; Oct. 30, 2007.

Written Opinion issued by the International Searching Authority, dated Jun. 7, 2018, for related International Patent Application No. PCT/US2017/062303; 22 pages.

3Drive Compact Throttle Controller, Blitz Power USA, <http://pivotjp.com/product/thf_c/the.html>; earliest known archive via Internet Archive Wayback Machine Aug. 27, 2009; <http://web.archive.org/web/20090827154111/http://pivotjp.com/product/thf_c/the.html>; see appended screenshot retrieved from the Internet Nov. 30, 2015; 2 pages.

Ackermann et al., "Robust steering control for active rollover avoidance of vehicles with elevated center of gravity", Jul. 1998, pp. 1-6.

Article 34 Amendment, issued by the European Patent Office, dated Aug. 29, 2016, for related International patent application No. PCT/US2015/057132; 34 pages.

Bhattacharyya et al., "An Approach to Rollover Stability In Vehicles Using Suspension Relative Position Sensors and Lateral Acceleration Sensors", Dec. 2005, 100 pages.

Compare: Three Selectable Terrain Management Systems, Independent Land Rover News Blog, retrieved from https://web.archive.org/web/20120611082023/ . . . ; archive date Jun. 11, 2012; 4 pages.

EDFC Active Adjust Damping Force Instantly according to G-Force & Speed, TEIN, retrieved from https://web.archive.org/web/20160515190809/ . . . ; archive date May 15, 2016; 22 pages.

English translation of Examination Report issued by the State Intellectual Property Office of People's Republic of China, dated Jun. 1, 2015, for Chinese Patent Application No. 201180037804.3; 13 pages.

European Search Report issued by the European Patent Office, dated Feb. 10, 2017, for corresponding European U.S. Appl. No. 16/193,006; 7 pages.

Examination Report issued by the European Patent Office, dated Aug. 1, 2016, for European Patent Application No. 11724931.8; 5 pages.

Examination Report issued by the State Intellectual Property Office of People's Republic of China, dated Feb. 3, 2016, for Chinese Patent Application No. 201180037804.3; 14 pages.

Examination Report No. 1 issued by the Australian Government IP Australia, dated Apr. 15, 2014, for Australian Patent Application No. 2011261248; 5 pages.

Examination Report No. 1 issued by the Australian Government IP Australia, dated Aug. 10, 2018, for Australian Patent Application No. 2015328248; 2 pages.

Examination Report No. 1 issued by the Australian Government IP Australia, dated Jan. 12, 2017, for corresponding Australian patent application No. 2015271880; 6 pages.

Examination Report No. 2 issued by the Australian Government IP Australia, dated Jun. 29, 2017, for Australian Patent Application No. 2015271880; 8 pages.

Examination Report No. 2 issued by the Australian Government IP Australia, dated May 29, 2015, for Australian Patent Application No. 2011261248; 8 pages.

Examination Report No. 3 issued by the Australian Government IP Australia, dated Dec. 1, 2017, for Australian Patent Application No. 2015271880; 7 pages.

Extended European Search Report issued by the European Patent Office, dated Sep. 7, 2018, for European Patent Application No. 18183050.6; 7 pages.

First drive: Ferrari's easy-drive supercar, GoAuto.com.au, Feb. 16, 2010; 4 pages.

Gangadurai et al.; Development of control strategy for optimal control of a continuously variable transmission operating in combination with a throttle controlled engine; SAE International; Oct. 12, 2005.

Hac et al., "Improvements in vehicle handling through integrated control of chassis systems", Int. J. of Vehicle Autonomous Systems(IJVAS), vol. 1, No. 1, 2002, pp. 83-110.

(56) References Cited

OTHER PUBLICATIONS

Huang et al., "Nonlinear Active Suspension Control Design Applied to a Half-Car Model", Proceedings of the 2004 IEEE International Conference on Networking, Mar. 21-23, 2004, pp. 719-724.
Ingalls, Jake; Facebook post https://www.facebook.com/groups/877984048905836/permalink/110447996625624- 2; Sep. 11, 2016; 1 page.
International Preliminary Amendment issued by The International Bureau of WIPO, dated May 21, 2019, for International Patent Application No. PCT/US2017/062303; 22 pages.
International Preliminary Report on Patentability in PCT Application Serial No. PCT/US15/57132, issued Jan. 30, 2017 (6 pages).
International Preliminary Report on Patentability issued by the European Patent Office, dated Apr. 11, 2017, for International Patent Application No. PCT/US2015/054296; 7 pages.
International Preliminary Report on Patentability issued by the International Bureau of WIPO, dated Dec. 10, 2019, for International Patent Application No. PCT/US2018/036383; 8 pages.
International Preliminary Report on Patentability issued by the International Bureau of WIPO, dated May 12, 2015, for International Application No. PCT/US2013/068937; 7 pages.
International Preliminary Report on Patentability issued by The International Bureau of WIPO, Dec. 4, 2012, for International Application No. PCT/US2011/039165; 9 pages.
International Preliminary Report on Patentability issued by the International Searching Authority, dated Jun. 3, 2021, or International Patent Application No. PCT/IB2019/060089; 21 pages.
International Preliminary Report on Patentability received for PCT Patent Application No. PCT/US2017/062303, mailed on May 31, 2019, 23 pages.
International Preliminary Report on Patentability received for PCT Patent Application No. PCT/US2021/033199, mailed on Dec. 1, 2022, 11 pages.
International Search Report and Written Opinion of the International Searching Authority for International Application No. PCT/US2011/39165, dated Jan. 3, 2012; 15 pages.
International Search Report and Written Opinion of the International Searching Authority, dated Aug. 31, 2018, for International Patent Application No. PCT/US2018/036383; 12 pages.
International Search Report and Written Opinion received for PCT Patent Application No. PCT/IB2019/060089, mailed on May 29, 2020, 24 pages.
International Search Report and Written Opinion received for PCT Patent Application No. PCT/US2013/068937, mailed on Feb. 26, 2014, 10 pages.
International Search Report and Written Opinion received for PCT Patent Application No. PCT/US2015/054296, mailed on Dec. 18, 2015, 9 pages.
International Search Report and Written Opinion received for PCT Patent Application No. PCT/US2015/057132, mailed on May 13, 2016, 17 pages.
International Search Report and Written Opinion received for PCT Patent Application No. PCT/US2021/033199, mailed on Aug. 23, 2021, 14 pages.
International Search Report and Written Opinion received for PCT Patent Application No. PCT/US2021/042230, mailed on Dec. 17, 2021, 4 pages.
International Search Report issued by the International Searching Authority, dated Jun. 7, 2018, for related International Patent Application No. PCT/US2017/062303; 7 pages.
Machine translation of DE 3705520 A1 from espacenet.com November (Year: 2022).
McKay et al., Delphi Electronic Throttle Control Systems for Model Year 2000; Driver Features, System Security, and OEM Benefits. ETC for the Mass Market, Electronic Engine Controls 2000: Controls (SP-1500), SAE 2000 World Congress, Detroit, MI, Mar. 6-9, 2000, 13 pages.
Office Action issued by the Canadian Intellectual Property Office, dated Apr. 21, 2017, for corresponding Canadian patent application No. 2,801,334; 3 pages.
Office Action issued by the Canadian Intellectual Property Office, dated Jul. 26, 2019, for Canadian Patent Application No. 2,963,790; 3 pages.
Office Action issued by the Canadian Intellectual Property Office, dated Jun. 22, 2021, for Canadian Patent Application No. 3,043,481; 3 pages.
Office Action issued by the Canadian Intellectual Property Office, dated May 10, 2021, for Canadian Patent Application No. 2,890,996; 3 pages.
Office Action issued by the Canadian Intellectual Property Office, dated Oct. 1, 2019, for Canadian Patent Application No. 2,965,309; 8 pages.
Office Action issued by the Mexican Patent Office, dated Jun. 25, 2014, for corresponding Mexican patent application No. MX/a/2012/014069; 2 pages.
Scott Tsuneishi, "2005 Subaru WRX Sti—Blitz Throttle Controller," Oct. 1, 2008, Super Street Online, <http://www.superstreetonline.com/how-to/engine/turp-0810-2005-subam-wrx-sti-blitz-throttle-controller>; see appended screenshot retrived from the Internet Nov. 30, 2015; 11 pages.
Throttle Controller, Blitz Power USA, <http://www.blitzpowerusa.com/products/throcon/throcon.html>.; earliest known archive via Internet Archive Wayback Machine Sep. 14, 2009: <http://web.archive.Org/web/20090914102957/http://www.blitzpowerusa.com/products/throcon/throcon.html>.; see appended screenshot.
International Preliminary Report on Patentability received for PCT Patent Application No. PCT/US2021/042230, mailed on Jan. 26, 2023, 10 pages.

\* cited by examiner

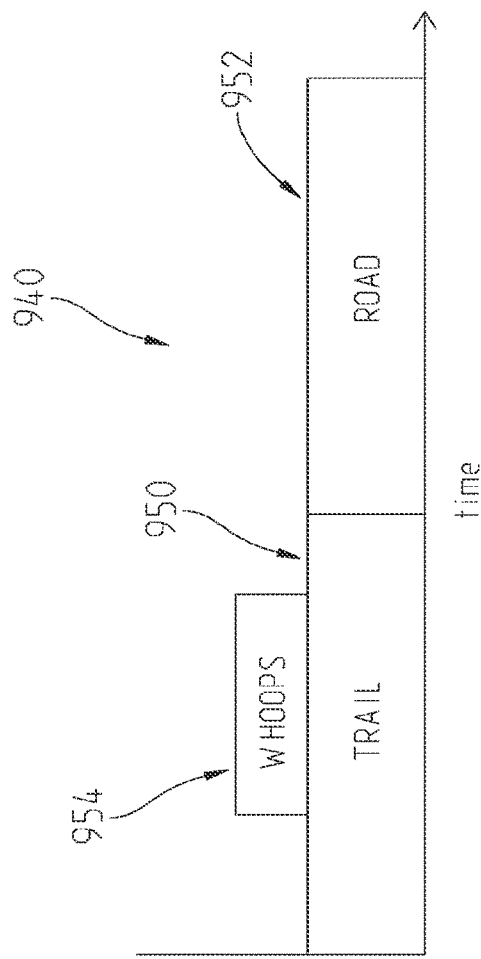
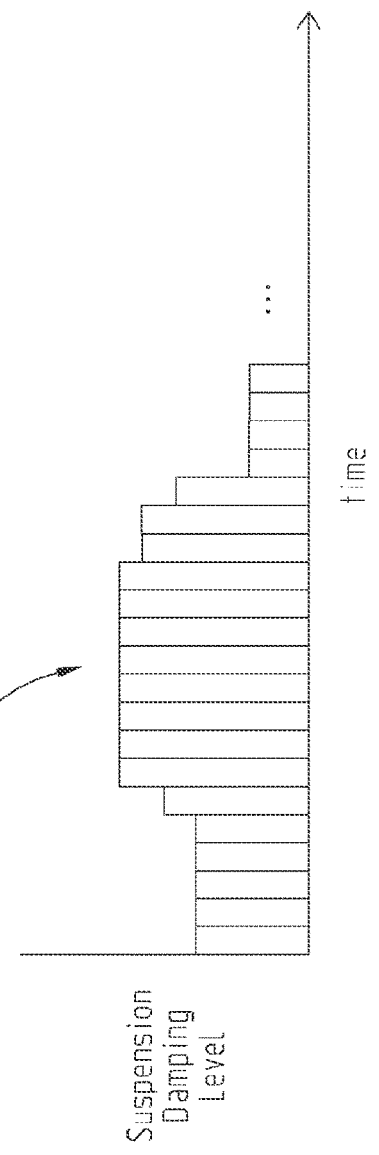

VEHICLE HAVING ADJUSTABLE SUSPENSION

RELATED APPLICATIONS

This application is a continuation of U.S. patent application Ser. No. 17/355,650, filed Jun. 23, 2021, which is a divisional of U.S. patent application Ser. No. 15/816,368, filed Nov. 17, 2017, which claims the benefit of U.S. Provisional Application Ser. No. 62/424,285, filed Nov. 18, 2016, titled VEHICLE HAVING ADJUSTABLE SUSPENSION, and U.S. Provisional Application Ser. No. 62/524,192, filed Jun. 23, 2017, titled VEHICLE HAVING ADJUSTABLE SUSPENSION, the entire disclosures of which are expressly incorporated by reference herein.

BACKGROUND AND SUMMARY OF THE DISCLOSURE

The present disclosure relates to improved suspension for a vehicle and in particular to systems and methods of damping control for shock absorbers.

Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment. Some on-road automobiles also include adjustable electric shocks along with sensors for active ride control systems. The system of the present disclosure allows an operator to make real time "on-the-go" adjustments to the shocks to obtain the most comfortable ride for given terrain and payload scenarios.

Exemplary systems are disclosed in U.S. Pat. No. 9,010,768 and US Published Patent Application No. 2016/0059660, both assigned to the present assignee and the entire disclosures of each expressly incorporated by reference herein.

Vehicles often have springs (coil, leaf, or air) at each wheel, track, or ski to support a majority of the load. The vehicle of the present disclosure also has electronic shocks controlling the dynamic movement of each wheel, ski, or track. The electronic shocks have one or more valves that control the damping force of each shock. This valve may control compression damping only, rebound damping only, or a combination of compression and rebound damping. The valve(s) may be connected to a controller having a user interface that is within the driver's reach for adjustment while operating the vehicle. In one embodiment, the controller increases or decreases the damping characteristics of the shock absorbers based on user inputs received from an operator. In another embodiment, the controller has several preset damping modes for selection by the operator. The controller is also coupled to sensors supported by at least one of the suspension and the chassis to provide an actively controlled damping system.

In an exemplary embodiment of the present disclosure, a recreational vehicle is provided. The recreational vehicle comprising a plurality of ground engaging members; a frame supported by the plurality of ground engaging members; at least one suspension coupling the plurality of ground engaging members to the frame, the at least one suspension including at least one adjustable shock absorber having at least one adjustable damping profile; a driveline torque management system operatively coupled to at least one of the plurality of ground engaging members, the driveline torque management system having at least one adjustable driveline torque management system characteristic; at least one airborne sensor positioned on the recreational vehicle, the at least one airborne sensor monitoring a movement characteristic of the recreational vehicle; and at least one controller operatively coupled to the driveline torque management system, the at least one airborne sensor, and the at least one adjustable shock absorber. The at least one controller determining if the recreational vehicle is in an airborne state and in response to determining the recreational vehicle is in the airborne state altering both the adjustable damping profile of the at least one adjustable shock absorber and altering the at least one adjustable driveline torque management system of the driveline torque management system.

In another exemplary embodiment of the present disclosure, a recreational vehicle is provided. The recreational vehicle comprising a plurality of ground engaging members; a frame supported by the plurality of ground engaging members; at least one suspension coupling the plurality of ground engaging members to the frame, the at least one suspension including at least one adjustable shock absorber configurable in a plurality of ride modes each having an associated damping profile; a plurality of vehicle condition sensors supported by the plurality of ground engaging members; and at least one controller operatively coupled to the at least one adjustable shock absorber and the plurality of vehicle condition sensors. The at least one controller receives a plurality of inputs from the plurality of vehicle condition sensors. The at least one controller determines if the at least one adjustable shock may be reconfigured from a first ride mode of the plurality of ride modes to a second ride mode of the plurality of ride modes by determining if a first condition is satisfied, if the first condition is satisfied then configuring the at least one shock absorber in the second ride mode, if the first condition is not satisfied then determining if a second condition is satisfied, if the second condition is satisfied then configuring the at least one shock absorber in the second ride mode, if both the first condition and the second condition are not satisfied remaining in the first ride mode, wherein only one of the first condition and the second condition is based on at least one of a plurality of inputs from the plurality of vehicle condition sensors.

In still another exemplary embodiment of the present disclosure, a recreational vehicle is provided. The recreational vehicle comprising a plurality of ground engaging members; a frame supported by the plurality of ground engaging members; at least one suspension coupling the plurality of ground engaging members to the frame, the at least one suspension including at least one adjustable shock absorber having at least one adjustable damping profile; a driveline torque management system operatively coupled to at least one of the plurality of ground engaging members, the driveline torque management system having at least one adjustable driveline torque management system characteristic; at least one airborne sensor positioned on the recreational vehicle, the at least one airborne sensor monitoring a movement characteristic of the recreational vehicle; at least one controller operatively coupled to the driveline torque management system, the at least one airborne sensor, and the at least one adjustable shock absorber. The at least one controller determining if the recreational vehicle is in an airborne state and in response to determining the recreational vehicle is in the airborne state altering the adjustable damping profile of the at least one adjustable shock absorber to a first damping profile if the airborne state spans a first time duration and to a second damping profile if the airborne state spans a second time interval, the second time interval being longer than the first time interval.

In a further exemplary embodiment of the present disclosure, a method of controlling a damping characteristic of at least one adjustable shock absorber of a vehicle being operated by a driver is provided. The method comprising determining the vehicle is one of cornering and spinning based on a yaw characteristic of the vehicle; and adjusting the damping characteristic of the at least one adjustable shock absorber of the vehicle based on the yaw characteristic.

In yet a further exemplary embodiment of the present disclosure, a method of controlling a damping characteristic of at least one adjustable shock absorber of a vehicle being operated by a driver is provided. The method comprising (a) receiving a plurality of inputs from a plurality of sensors supported by the vehicle, the plurality of sensors including a first sensor having a first input and a second sensor having a second input; (b) based on at least the first input from the first sensor, reactively determining if the vehicle is cornering; (c) based on at least the second input from the second sensor, predictively determining if the vehicle is cornering; and (d) adjusting the damping characteristic of the at least one adjustable shock absorber of the vehicle when it is determined that the vehicle is cornering in either step (b) or step (c).

In still another exemplary embodiment of the present disclosure, a recreational vehicle is provided. The recreational vehicle comprising a plurality of ground engaging members; a frame supported by the plurality of ground engaging members; at least one suspension coupling the plurality of ground engaging members to the frame, the at least one suspension including at least one adjustable shock absorber configurable in a plurality of ride modes each having an associated damping profile; a plurality of vehicle condition sensors supported by the plurality of ground engaging members, the plurality of vehicle condition sensors including a yaw characteristic sensor; and at least one controller operatively coupled to the at least one adjustable shock absorber and the plurality of vehicle condition sensors. The at least one controller receiving a plurality of inputs from the plurality of vehicle condition sensors and configured to determine when the vehicle is cornering based on an input from the yaw characteristic sensor.

In still yet a further exemplary embodiment of the present disclosure, a recreational vehicle is provided. The recreational vehicle comprising a plurality of ground engaging members; a frame supported by the plurality of ground engaging members; at least one suspension coupling the plurality of ground engaging members to the frame, the at least one suspension including at least one adjustable shock absorber configurable in a plurality of ride modes each having an associated damping profile; a plurality of vehicle condition sensors supported by the plurality of ground engaging members, the plurality of vehicle condition sensors including an ambient weather sensor; and at least one controller operatively coupled to the at least one adjustable shock absorber and the plurality of vehicle condition sensors. The at least one controller receiving a plurality of inputs from the plurality of vehicle condition sensors and adjusting at least one damping characteristic of the at least one adjustable shock based on an input from the ambient weather sensor.

In yet another exemplary embodiment of the present disclosure, a method of controlling a damping characteristic of at least one adjustable shock absorber of a vehicle being operated by a driver is provided. The method comprising receiving an indication of an ambient weather condition of an environment surrounding the vehicle; and adjusting the damping characteristic of the at least one adjustable shock absorber of the vehicle based on the indication of the received ambient weather condition.

In yet still another exemplary embodiment of the present disclosure, a method of controlling a damping characteristic of at least one adjustable shock absorber of a vehicle being operated by a driver is provided. The method comprising sensing a change in a terrain being traversed by the vehicle; and adjusting the damping characteristic of the at least one adjustable shock absorber of the vehicle based on the sensed change in the terrain.

In still another exemplary embodiment of the present disclosure, a method of controlling a damping characteristic of at least one adjustable shock absorber of a vehicle being operated by a driver is provided. The method comprising storing at least one historical suspension damping characteristic and at least one vehicle location corresponding to the at least one historical suspension damping characteristic; and adjusting the damping characteristic of the at least one adjustable shock absorber at a first vehicle location based on the at least one historical suspension damping characteristic corresponding to the first vehicle location.

In yet another exemplary embodiment of the present disclosure, a recreational vehicle for operation by an operator is provided. The recreational vehicle comprising a plurality of ground engaging members; a frame supported by the plurality of ground engaging members; at least one suspension coupling the plurality of ground engaging members to the frame, the at least one suspension including at least one adjustable shock absorber having at least one adjustable damping profile; a plurality of vehicle condition sensors supported by the plurality of ground engaging members; at least one controller operatively coupled to the at least one adjustable shock absorber and the plurality of vehicle condition sensors, the at least one controller receiving a plurality of inputs from the plurality of vehicle condition sensors; and a user interface system supported by the frame. The user interface system including a display. The display being configurable with the at least one controller to display a screen layout, the screen layout including at least one of (i) at least one numerical indication of at least one damping characteristic of the at least one adjustable shock absorber and (ii) at least one graphical representation of the at least one damping characteristic of the at least one adjustable shock absorber, the screen layout further including at least one of (i) a notification of an active vehicle condition modifier which alters the at least one damping characteristic of the at least one adjustable shock absorber and (ii) a vehicle steering angle indicator.

In an example thereof, the at least one damping characteristic relates to a compression damping value of the at least one adjustable shock.

In another example thereof, the at least one damping characteristic relates to a rebound damping value of the at least one adjustable shock.

In yet another example thereof, the screen layout further includes a vehicle g-force indicator, the vehicle g-force indicator provides a first indication of a magnitude of the g-force being experienced by the vehicle and a second indication of a direction of the g-force being experienced by the vehicle.

In still another example thereof, the screen layout further a graphical representation of the vehicle, the at least one adjustable shock absorber includes a first shock absorber associated with a first suspension of the at least one suspension and a second shock absorber associated with a second suspension of the at least one suspension, the first shock absorber being positioned on a first side of a vertical longitudinal vehicle centerline plane and the second shock absorber being positioned on a second side of the vertical longitudinal vehicle centerline plane, the second side being opposite the first side. In a variation thereof, a first numerical indication of the at least one numerical indication is associated with the first shock absorber and is positioned on a first side of the graphical representation of the vehicle and a second numerical indication of the at least one numerical indication is associated with the second shock absorber and is positioned on a second side of the graphical representation of the vehicle, the second side of the graphical representation of the vehicle is opposite the first side of the graphical representation of the vehicle. In another variation thereof, a first graphical indication of the at least one graphical indication is associated with the first shock absorber and is positioned on a first side of the graphical representation of the vehicle and a second graphical indication of the at least one graphical indication is associated with the second shock absorber and is positioned on a second side of the graphical representation of the vehicle, the second side of the graphical representation of the vehicle is opposite the first side of the graphical representation of the vehicle.

In a further example thereof, the screen layout further a graphical representation of the vehicle, the at least one adjustable shock absorber includes a first shock absorber associated with a first suspension of the at least one suspension and a second shock absorber associated with a second suspension of the at least one suspension, the first suspension being a front suspension of the vehicle and the second suspension being a rear suspension of the vehicle. In a variation thereof, a first numerical indication of the at least one numerical indication is associated with the first shock absorber and is positioned proximate a front portion of the graphical representation of the vehicle and a second numerical indication of the at least one numerical indication is associated with the second shock absorber and is positioned proximate a rear portion of the graphical representation of the vehicle. In another variation thereof, a first graphical indication of the at least one graphical indication is associated with the first shock absorber and is positioned proximate a front portion of the graphical representation of the vehicle and a second graphical indication of the at least one graphical indication is associated with the second shock absorber and is positioned proximate a rear portion of the graphical representation of the vehicle.

In still a further example thereof, the notification of the active vehicle condition modifier which alters the at least one damping characteristic of the at least one adjustable shock absorber is associated with one of an anti-dive condition, a cornering condition, a ride condition, a squat condition, a brake condition, a roll/corning condition, and a jump/pitch condition.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

FIG. 27A illustrates an exemplary terrain progression for the vehicle of FIG. 6; and FIG. 27B illustrates an exemplary suspension damping level for the terrain progression of FIG. 27A.

Figure 1:
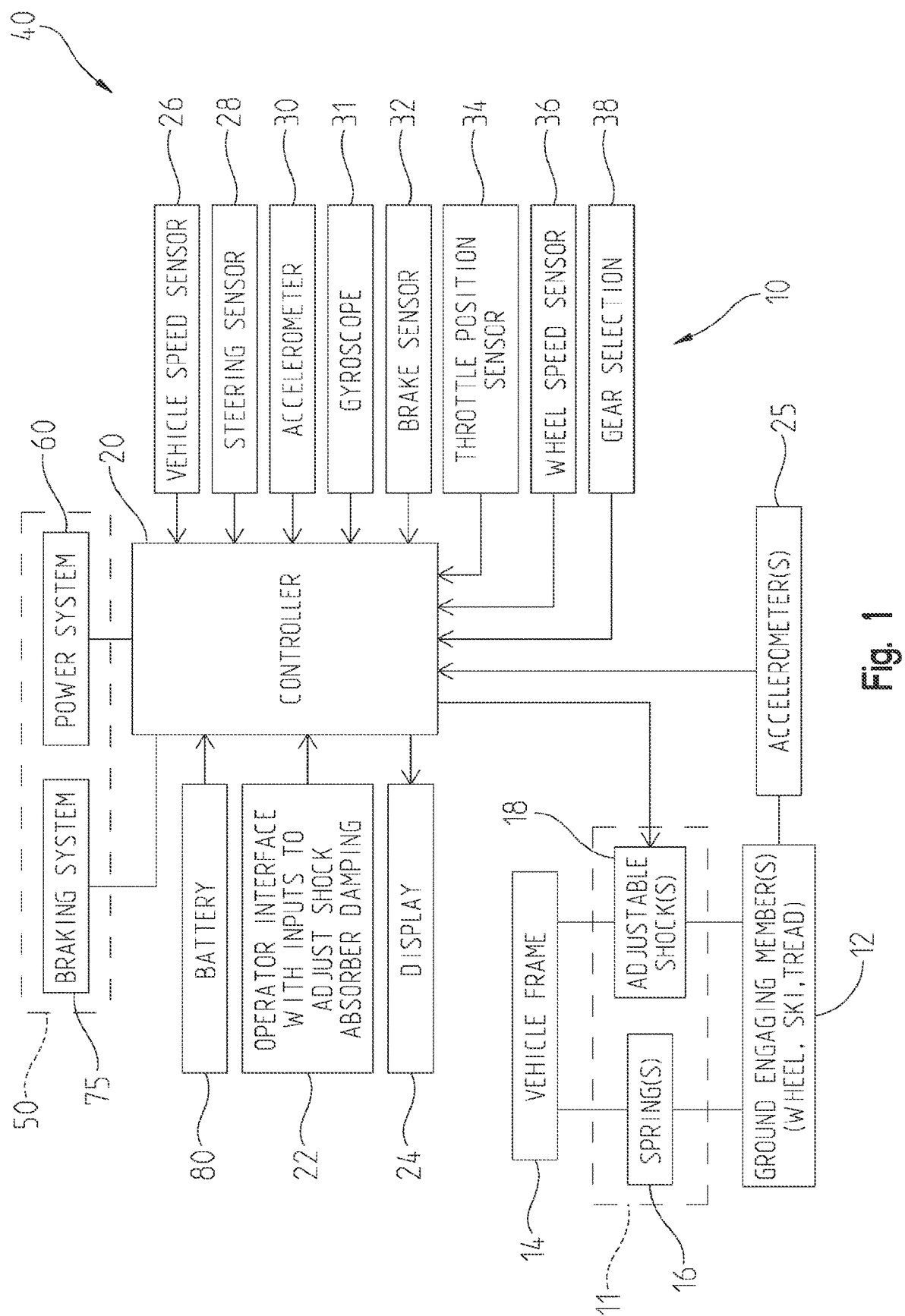
FIG. 1 illustrates a representative view of components of a vehicle of the present disclosure having a suspension with a plurality of continuous damping control shock absorbers and a plurality of sensors integrated with a controller of the vehicle.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limited to the precise form disclosed in the following detailed description. Rather, the embodiments are chosen and described so that others skilled in the art may utilize their teachings.

Referring now to FIG. 1, the present disclosure relates to a vehicle 10 having a suspension system 11 located between a plurality of ground engaging members 12 and a vehicle frame 14. Exemplary ground engaging members 12 include wheels, skis, guide tracks, treads or other suitable devices for supporting the vehicle relative to the ground. The suspension typically includes springs 16 and shock absorbers 18 coupled between the ground engaging members 12 and the frame 14. The springs 16 may include, for example, coil springs, leaf springs, air springs or other gas springs. The air or gas springs 16 may be adjustable. See, for example, U.S. Pat. No. 7,950,486, assigned to the current assignee, the entire disclosure of which is incorporated herein by reference.

Figure 2:
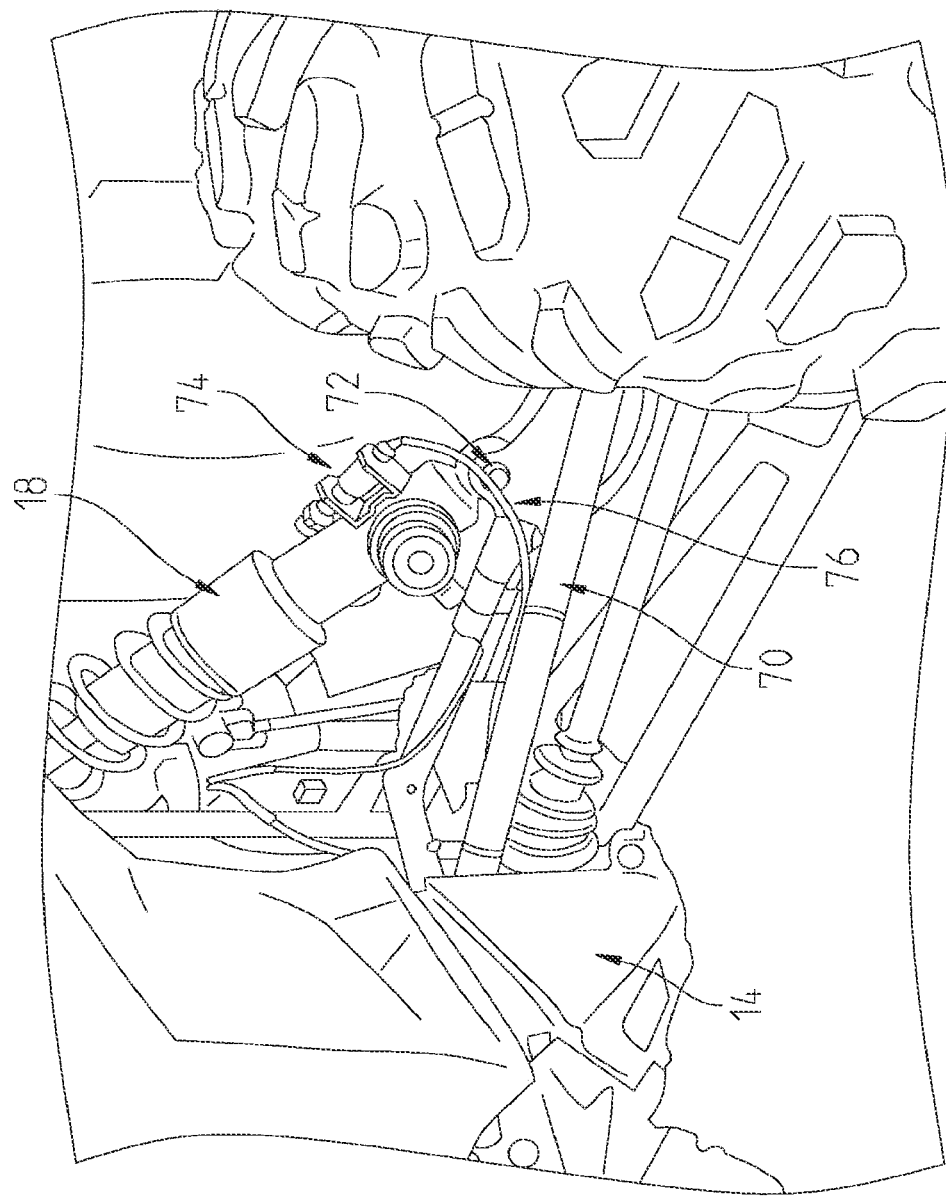
FIG. 2 illustrates an adjustable damping shock absorber coupled to a vehicle suspension.

The adjustable shock absorbers 18 are often coupled between the vehicle frame 14 and the ground engaging members 12 through an A-arm linkage 70 (See FIG. 2) or other type linkage. Springs 16 are also coupled between the ground engaging members 12 and the vehicle frame 14. FIG. 2 illustrates an adjustable shock absorber 18 mounted on an A-arm linkage 70 having a first end pivotably coupled to the vehicle frame 14 and a second end pivotably coupled to A-arm linkage 70 which moves with wheel 12. A damping control activator 74 is coupled to controller 20 by wires 71. An exemplary damping control activator is an electronically controlled valve which is activated to increase or decrease the damping characteristics of adjustable shock absorber 18.

In one embodiment, the adjustable shock absorbers 18 include solenoid valves mounted at the base of the shock body or internal to a damper piston of the shock absorber 18. The stiffness of the shock is increased or decreased by introducing additional fluid to the interior of the shock absorber, removing fluid from the interior of the shock absorber, and/or increasing or decreasing the ease with which fluid can pass from a first side of a damping piston of the shock absorber to a second side of the damping piston of the shock absorber. In another embodiment, the adjustable shock absorbers 18 include a magnetorheological fluid internal to the shock absorber 18. The stiffness of the shock is increased or decreased by altering a magnetic field experienced by the magnetorheological fluid. Additional details on exemplary adjustable shocks are provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein.

In one embodiment, a spring 16 and shock 18 are located adjacent each of the ground engaging members 12. In an ATV, for example, a spring 16 and an adjustable shock 18 are provided adjacent each of the four wheels 12. Some manufacturers offer adjustable springs 16 in the form of either air springs or hydraulic preload rings. These adjustable springs 16 allow the operator to adjust the ride height on the go. However, a majority of ride comfort comes from the damping provided by shock absorbers 18.

In an illustrated embodiment, adjustable shocks 18 are electrically controlled shocks for adjusting damping characteristics of shocks 18. A controller 20 provides signals to adjust damping of the shocks 18 in a continuous or dynamic manner. Adjustable shocks 18 may be adjusted to provide differing compression damping, rebound damping or both. In one embodiment, adjustable shocks 18 include a first controllable valve to adjust compression damping and a second controllable valve to adjust rebound damping. In another embodiment, adjustable shocks include a combination valve which controls both compression damping and rebound damping.

In an illustrated embodiment of the present disclosure, a user interface 22 is provided in a location easily accessible to the driver operating the vehicle. Preferably, the user interface 22 is either a separate user interface mounted adjacent the driver's seat on the dashboard or integrated onto a display within the vehicle. User interface 22 includes user input devices to allow the driver or a passenger to manually adjust shock absorber 18 damping during operation of the vehicle based on road conditions that are encountered or to select a preprogrammed active damping profile for shock absorbers 18 by selecting a ride mode. In one embodiment, a selected ride mode alters characteristics of suspension system 11 alone, such as the damping profile for shock absorbers 18. In one embodiment, a selected ride mode alters characteristics of suspension system 11 and other vehicle systems, such as a driveline torque management system 50.

Exemplary input devices for operator interface 22 include levers, buttons, switches, soft keys, and other suitable input devices. Operator interface 22 may also include output devices to communicate information to the operator. Exemplary output devices include lights, displays, audio devices, tactile devices, and other suitable output devices. In another illustrated embodiment, the user input devices are on a steering wheel, handle bar, or other steering control of the vehicle 10 to facilitate actuation of the damping adjustment. A display 24 is also provided on or next to the user interface 22 or integrated into a dashboard display of vehicle 10 to display information related to the shock absorber damping settings.

Controller 20 receives user inputs from operator interface 22 and adjusts the damping characteristics of the adjustable shocks 18 accordingly. The operator may independently adjust front and rear shock absorbers 18 to adjust the ride characteristics of the vehicle. In certain embodiments, each of the shocks 18 is independently adjustable so that the damping characteristics of the shocks 18 are changed from one side of the vehicle to another. Side-to-side adjustment is desirable during sharp turns or other maneuvers in which different damping profiles for shock absorbers 18 on opposite sides of the vehicle improves the handling characteristics of the vehicle. The damping response of the shock absorbers 18 can be changed in a matter of milliseconds to provide nearly instantaneous changes in damping for potholes, dips in the road, or other driving conditions.

A plurality of vehicle condition sensors 40 are also coupled to the controller 20. For example, a global change accelerometer 25 is coupled adjacent each ground engaging member 12. Each of the accelerometers 25 provides an output signal coupled to controller 20. Accelerometers 25 provide an output signal indicating movement of the ground engaging members and the suspension components 16 and 18 as the vehicle traverses different terrain.

Additional vehicle condition sensors 40 may include a vehicle speed sensor 26, a steering sensor 28, a chassis supported accelerometer 30, a chassis supported gyroscope 31, and other sensors which monitor one or more characteristics of vehicle 10. Each of vehicle speed sensor 26, steering sensor 28, chassis supported accelerometer 30, and chassis supported gyroscope 31 are operatively coupled to controller 20 and controller 20 receives input from each of vehicle speed sensor 26, steering sensor 28, chassis supported accelerometer 30, and chassis supported gyroscope 31.

Figure 3:
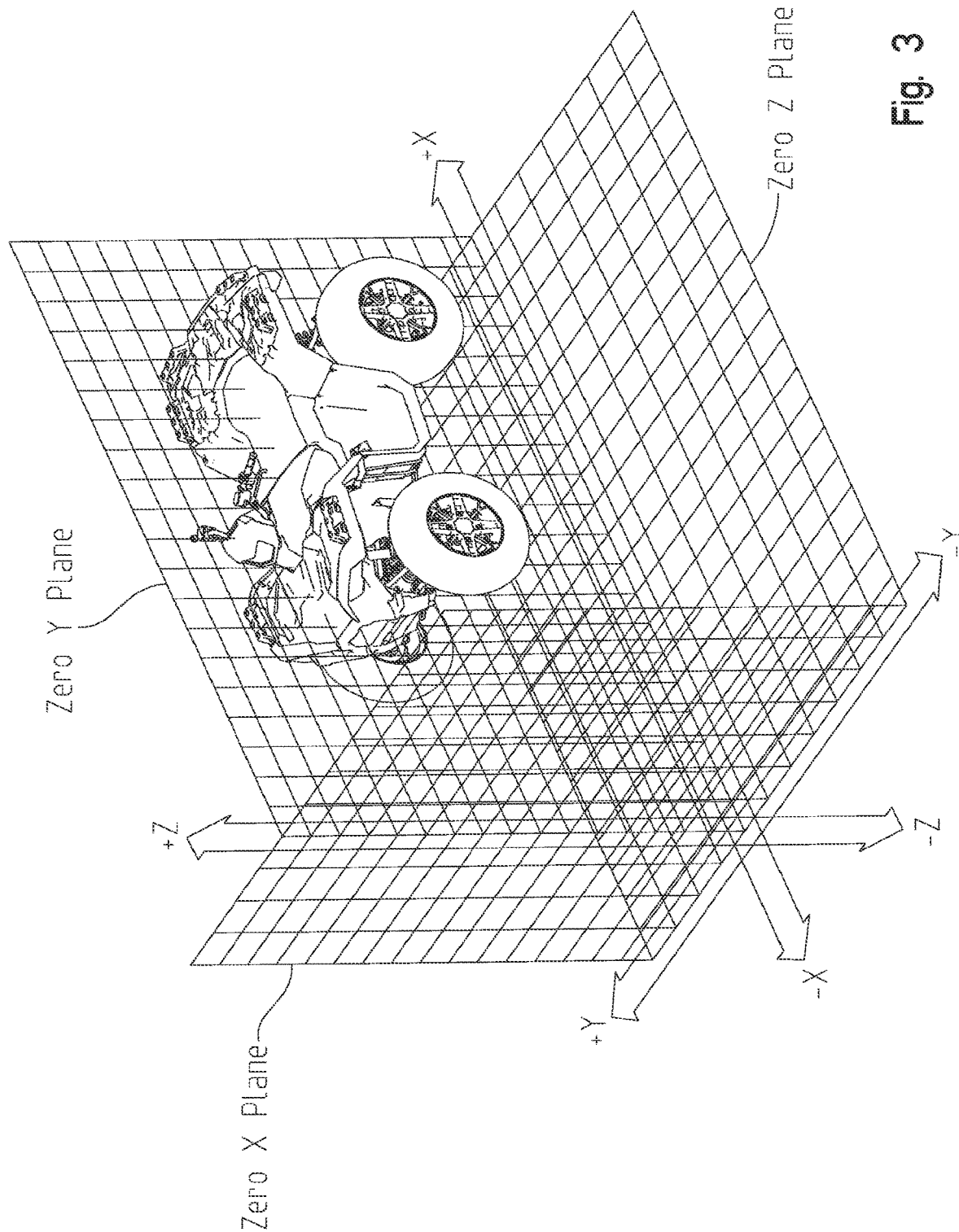
FIG. 3 illustrates an x-axis, a y-axis, and a z-axis for a vehicle such as an ATV.

Accelerometer 30 is illustratively a three-axis accelerometer supported on the chassis to provide an indication of acceleration forces of the vehicle during operation. In one embodiment, accelerometer 30 is located at or close to a center position of vehicle 10. In the exemplary vehicle 200 illustrated in FIGS. 6-9, accelerometer 30 is located along a longitudinal centerline plane 122 of vehicle 100. The x-axis, y-axis, and z-axis for a vehicle 10, illustratively an ATV, are shown in FIG. 3.

Gyroscope 31 is illustratively a three-axis gyroscope supported on the chassis to provide indications of inertial measurements of the vehicle during operation. In one embodiment, accelerometer 30 is not located at a center of gravity of vehicle 10 and the readings of gyroscope 31 are used by controller 20 to determine the acceleration values of vehicle 10 at the center of gravity of vehicle 10. In one embodiment, accelerometer 30 and gyroscope 31 are integrated into suspension controller 86.

Additional vehicle condition sensors 40 are disclosed herein and illustratively include in FIG. 1 a brake sensor 32, a throttle position sensor 34, a wheel speed sensor 36, and a gear selection sensor 38. Each of these vehicle condition sensors 40 are operatively coupled to controller 20 to provide an output signal coupled to controller 20.

Figure 4:
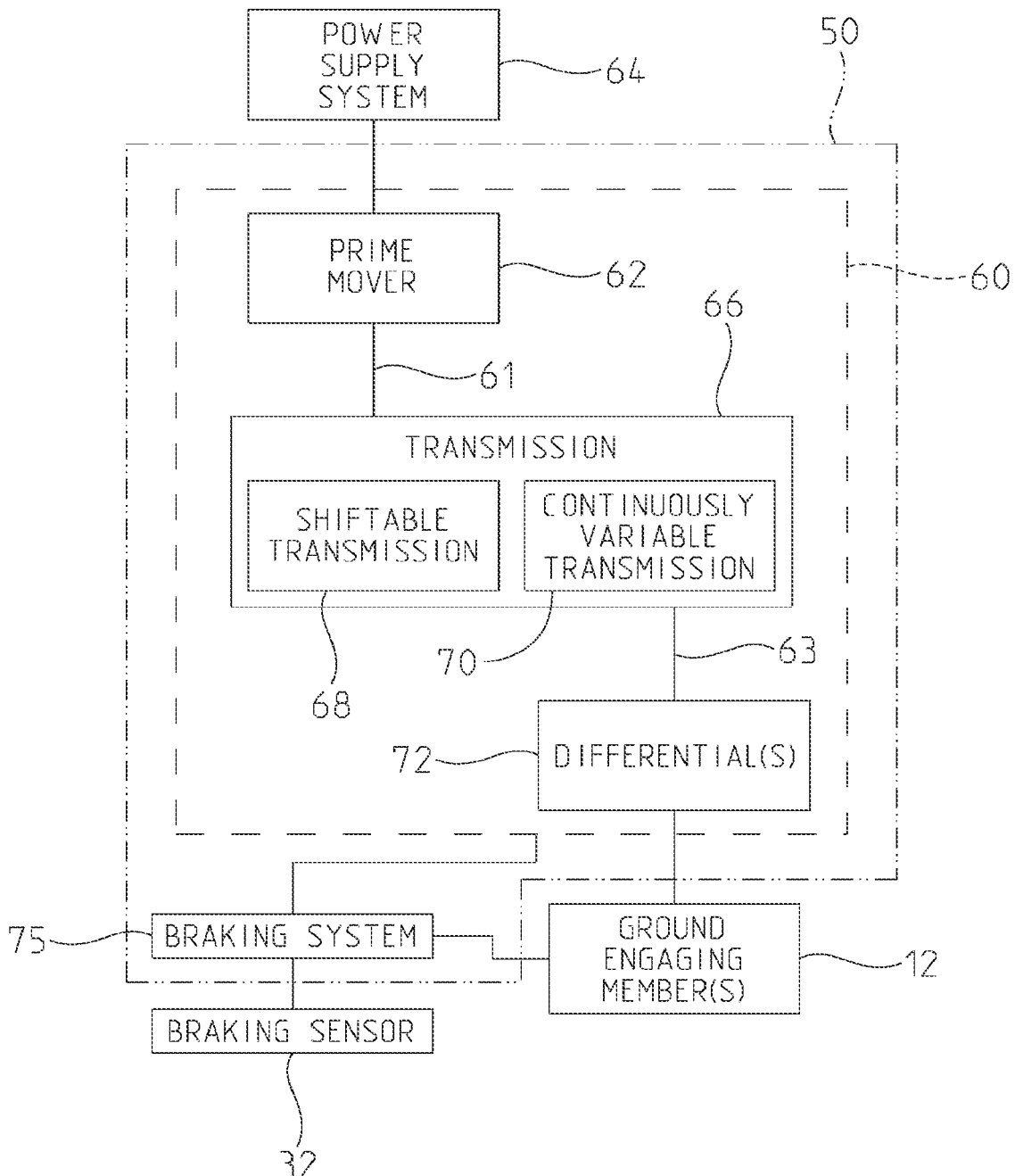
FIG. 4 illustrates a representative view of an exemplary power system for the vehicle of FIG. 1.

Referring to FIG. 4, one embodiment of a driveline torque management system 50 of vehicle 10 is illustrated. Driveline torque management system 50 controls the amount of torque exerted by each of ground engaging members 12. Driveline torque management system 50 provides a positive torque to one or more of ground engaging members 12 to power the movement of vehicle 10 through a power system 60. Driveline torque management system 50 further provides a negative torque to one or more of ground engaging members 12 to slow or stop a movement of vehicle 10 through a braking system 75. In one example, each of ground engaging members 12 has an associated brake of braking system 75.

In the illustrated embodiment of FIG. 4, power system 60 includes a prime mover 62. Exemplary prime movers 62 include internal combustion engines, two stroke internal combustion engines, four stroke internal combustion engines, diesel engines, electric motors, hybrid engines, and other suitable sources of motive force. To start the prime mover 62, a power supply system 64 is provided. The type of power supply system 64 depends on the type of prime mover 62 used. In one embodiment, prime mover 62 is an internal combustion engine and power supply system 64 is one of a pull start system and an electric start system. In one embodiment, prime mover 62 is an electric motor and power supply system 64 is a switch system which electrically couples one or more batteries to the electric motor.

A transmission 66 is coupled to prime mover 62. Transmission 66 converts a rotational speed of an output shaft 61 of prime mover 62 to one of a faster rotational speed or a slower rotational speed of an output shaft 63 of transmission 66. It is contemplated that transmission 66 may additionally rotate output shaft 63 at the same speed as output shaft 61.

In the illustrated embodiment, transmission 66 includes a shiftable transmission 68 and a continuously variable transmission ("CVT") 70. In one example, an input member of CVT 70 is coupled to prime mover 62. An input member of shiftable transmission 68 is in turn coupled to an output member of CVT 70. In one embodiment, shiftable transmission 68 includes a forward high setting, a forward low setting, a neutral setting, a park setting, and a reverse setting. The power communicated from prime mover 62 to CVT 70 is provided to a drive member of CVT 70. The drive member in turn provides power to a driven member through a belt. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 68. Although transmission 66 is illustrated as including both shiftable transmission 68 and CVT 70, transmission 66 may include only one of shiftable transmission 68 and CVT 70. Further, transmission 66 may include one or more additional components.

Transmission 66 is further coupled to at least one differential 72 which is in turn coupled to at least one ground engaging members 12. Differential 72 may communicate the power from transmission 66 to one of ground engaging members 12 or multiple ground engaging members 12. In an ATV embodiment, one or both of a front differential and a rear differential are provided. The front differential powering at least one of two front wheels of the ATV and the rear differential powering at least one of two rear wheels of the ATV. In a side-by-side vehicle embodiment having seating for at least an operator and a passenger in a side-by-side configuration, one or both of a front differential and a rear differential are provided. The front differential powering at least one of two front wheels of the side-by-side vehicle and the rear differential powering at least one of multiple rear wheels of the side-by-side vehicle. In one example, the side-by-side vehicle has three axles and a differential is provided for each axle. An exemplary side-by-side vehicle 200 is illustrated in FIGS. 6-9.

In one embodiment, braking system 75 includes anti-lock brakes. In one embodiment, braking system 75 includes active descent control and/or engine braking. In one embodiment, braking system 75 includes a brake and in some embodiments a separate parking brake. Braking system 75 may be coupled to any of prime mover 62, transmission 66, differential 72, and ground engaging members 12 or the connecting drive members therebetween. Brake sensor 32, in one example, monitors when braking system 75 is applied. In one example, brake sensor 32 monitors when a user actuatable brake input, such as brake pedal 232 (see FIG. 7) in vehicle 100, is applied.

Figure 5:
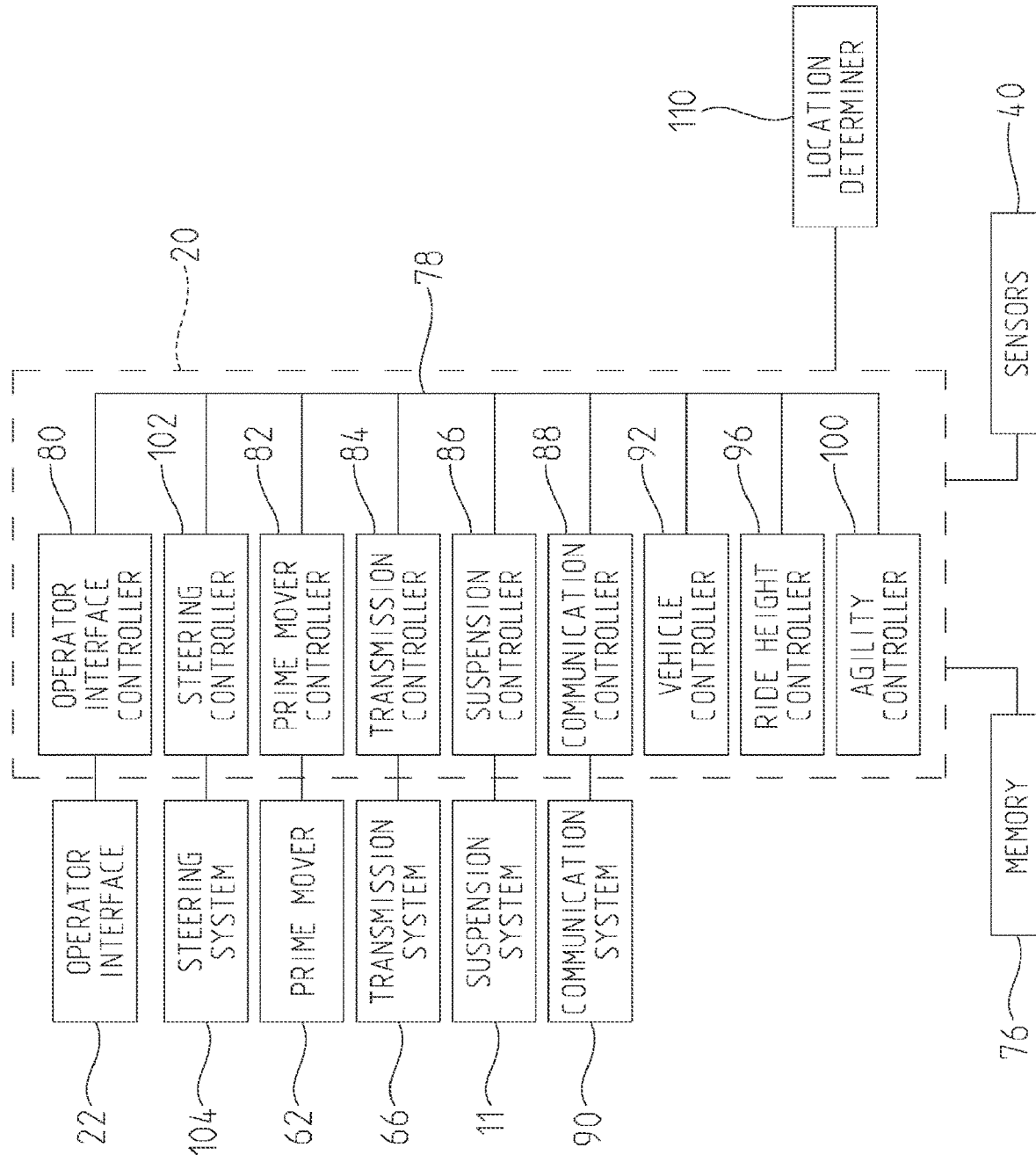
FIG. 5 illustrates a representative view of an exemplary controller of the vehicle of FIG. 1.

Referring to FIG. 5, controller 20 has at least one associated memory 76. Controller 20 provides the electronic control of the various components of vehicle 10. Further, controller 20 is operatively coupled to a plurality of vehicle condition sensors 40 which monitor various parameters of vehicle 10 or the environment surrounding vehicle 10. Controller 20 performs certain operations to control one or more subsystems of other vehicle components. In certain embodiments, the controller 20 forms a portion of a processing subsystem including one or more computing devices having memory, processing, and communication hardware. Controller 20 may be a single device or a distributed device, and the functions of the controller 20 may be performed by hardware and/or as computer instructions on a non-transitory computer readable storage medium, such as memory 76.

As illustrated in the embodiment of FIG. 5, controller 20 is represented as including several controllers. These controllers may each be single devices or distributed devices or one or more of these controllers may together be part of a single device or distributed device. The functions of these controllers may be performed by hardware and/or as computer instructions on a non-transitory computer readable storage medium, such as memory 76.

In one embodiment, controller 20 includes at least two separate controllers which communicate over a network 78. In one embodiment, network 78 is a CAN network. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used for some connections.

Referring to FIG. 5, controller 20 includes an operator interface controller 80 which controls communication with an operator through operator interface 22. A prime mover controller 82 controls the operation of prime mover 62. A transmission controller 84 controls the operation of transmission system 66.

A suspension controller 86 controls adjustable portions of suspension system 11. Exemplary adjustable components include adjustable shocks 18, adjustable springs 16, and/or configurable stabilizer bars. Additional details regarding adjustable shocks, adjustable springs, and configurable stabilizer bars is provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein.

Figure 17:
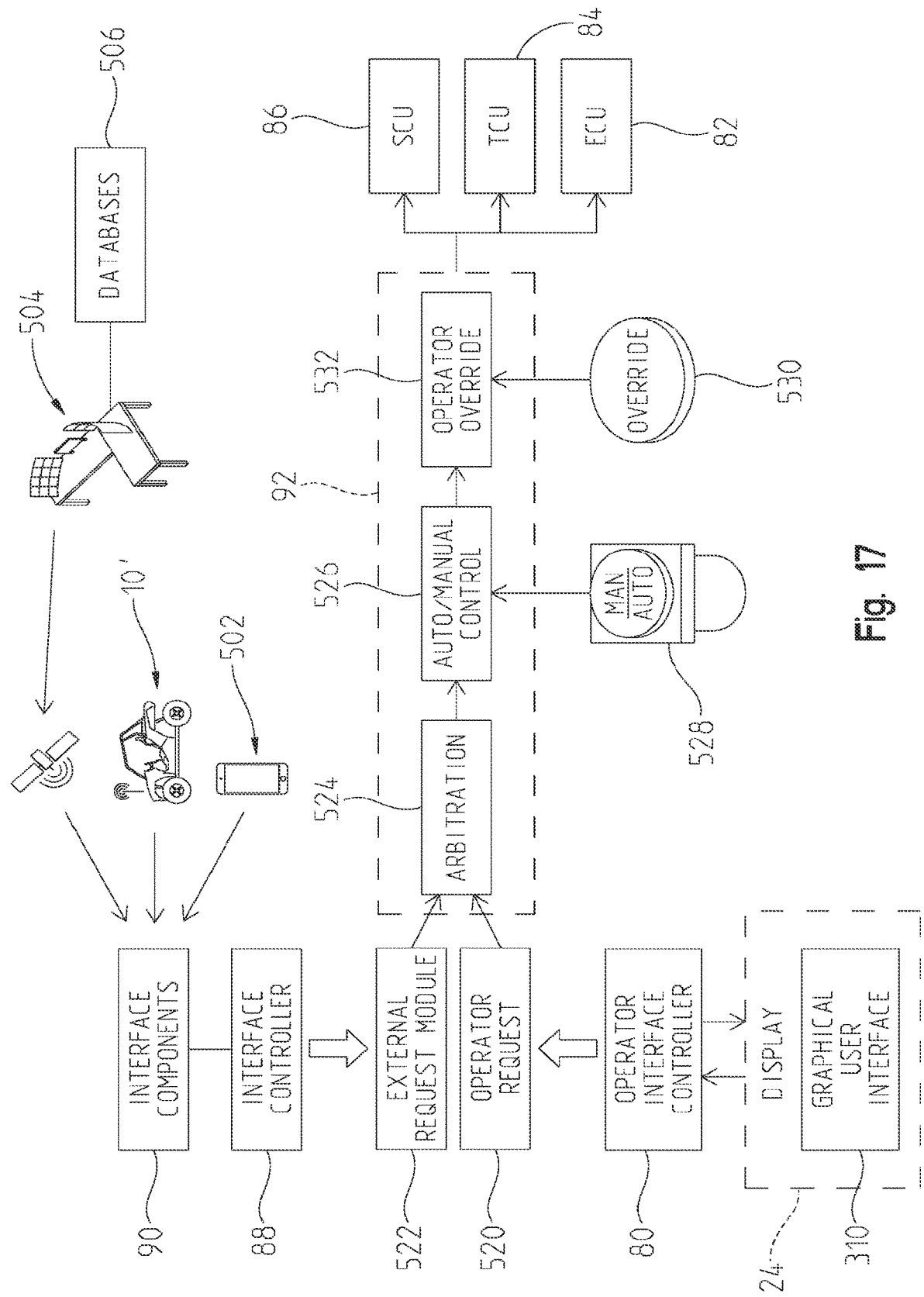
FIG. 17 illustrates an exemplary processing of the controller of FIG. 1 for handling multiple ride mode change requests.

A communication controller 88 controls communications between a communication system 90 of vehicle 10 and remote devices 500 (see FIG. 17). Exemplary remote devices include other vehicles 10', personal computing devices 502, such as cellphones or tablets, a centralized computer system 504 maintaining one or more databases 506, and other types of devices remote from vehicle 10 or carried by riders of vehicle 10. In one embodiment, communication controller 88 of vehicle 10 communicates with paired devices over a wireless network. An exemplary wireless network is a radio frequency network utilizing a BLUETOOTH protocol. In this example, communication system 90 includes a radio frequency antenna. Communication controller 88 controls the pairing of devices to vehicle 10 and the communications between vehicle 10 and the remote device. In one embodiment, communication controller 88 of vehicle 10 communicates with remote devices over a cellular network. In this example, communication system 90 includes a cellular antenna and communication controller 88 receives and sends cellular messages from and to the cellular network. In one embodiment, communication controller 88 of vehicle 10 communicates with remote devices over a satellite network. In this example, communication system 90 includes a satellite antenna and communication controller 88 receives and sends messages from and to the satellite network. In one embodiment, vehicle 10 is able to communicate with other vehicles 10 over a Radio Frequency mesh network and communication controller 88 and communication system 90 are configured to enable communication over the mesh network. An exemplary vehicle communication system is disclosed in U.S. patent application Ser. No. 15/262,113, filed Sep. 12, 2016, titled VEHICLE TO VEHICLE COMMUNICATIONS DEVICE AND METHODS FOR RECREATIONAL VEHICLES, the entire disclosure of which is expressly incorporated by reference herein.

A steering controller 102 controls portions of a steering system 104. In one embodiment, steering system 104 is a power steering system and includes one or more steering sensors 28. Exemplary sensors and electronic power steering units are provided in U.S. patent application Ser. No. 12/135,107, assigned to the assignee of the present application, titled VEHICLE, the disclosure of which is expressly incorporated by reference herein.

A vehicle controller 92 controls lights, loads, accessories, chassis level functions, and other vehicle functions.

A ride height controller 96 controls the preload and operational height of the vehicle. In one embodiment, ride height controller controls springs 16 to adjust a ride height of vehicle 10, either directly or through suspension controller 86. In one example, ride height controller 96 provides more ground clearance in the comfort ride mode compared to the sport ride mode.

An agility controller 100 controls a braking system of vehicle 10 and the stability of vehicle 10. Control methods of agility controller 100 may include integration into braking circuits (ABS) such that a stability control system can improve dynamic response (vehicle handling and stability) by modifying the shock damping in conjunction with electronic braking control.

In one embodiment, controller 20 either includes or is operatively coupled over network 78 to a location determiner 110 which determines a current location of vehicle 10. An exemplary location determiner 110 is a GPS unit which determines the position of vehicle 10 based on interaction with a global satellite system.

Referring to FIGS. 6-9, an exemplary side-by-side vehicle 200 is illustrated. Vehicle 200, as illustrated, includes a plurality of ground engaging members 12. Illustratively, ground engaging members 12 are wheels 204 and associated tires 206. As mentioned herein one or more of ground engaging members 12 are operatively coupled to power system 60 (see FIG. 4) to power the movement of vehicle 200 and braking system 75 to slow movement of vehicle 200.

Figure 6:
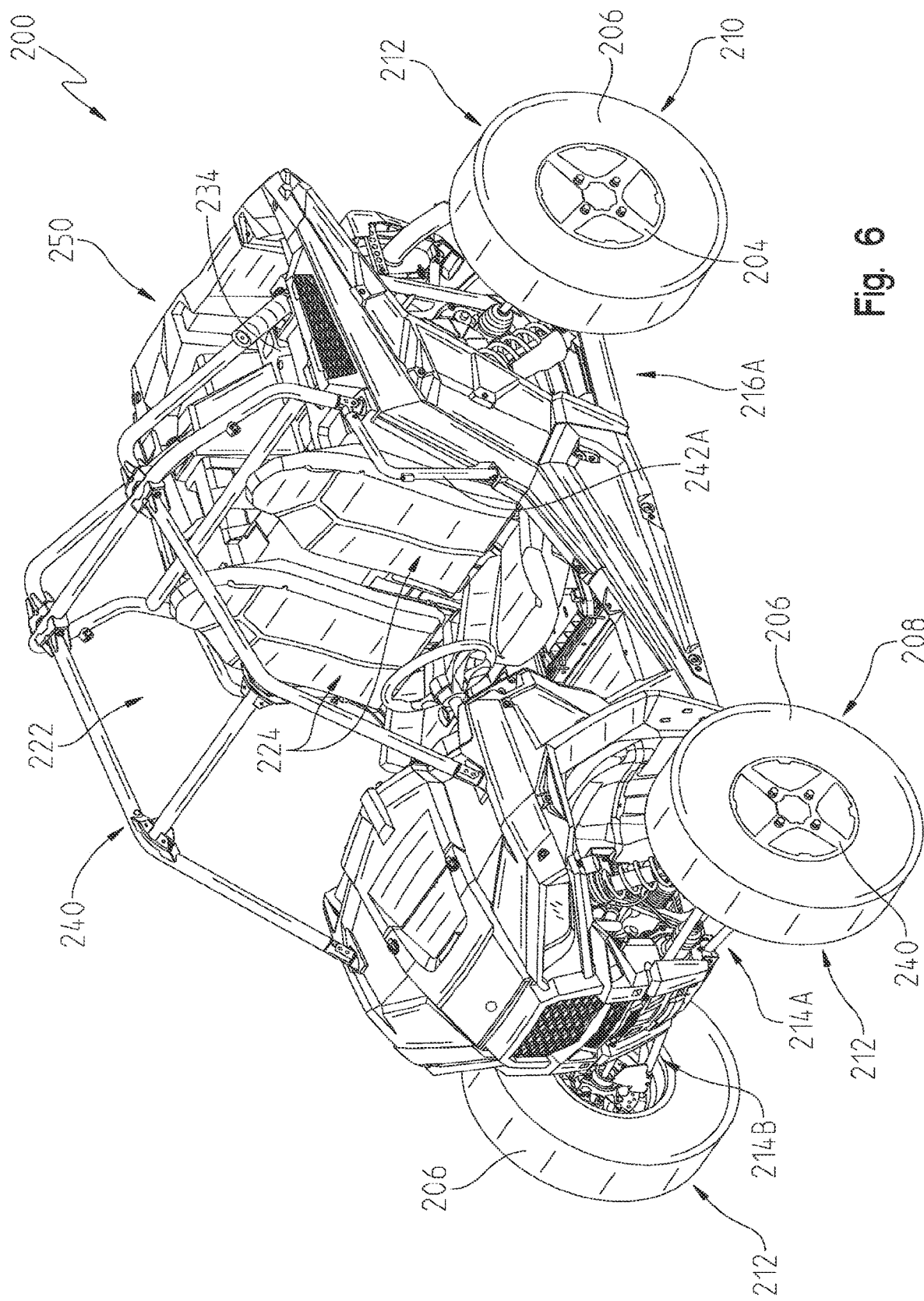
FIG. 6 illustrates a first, perspective view of an exemplary vehicle.
Figure 7:
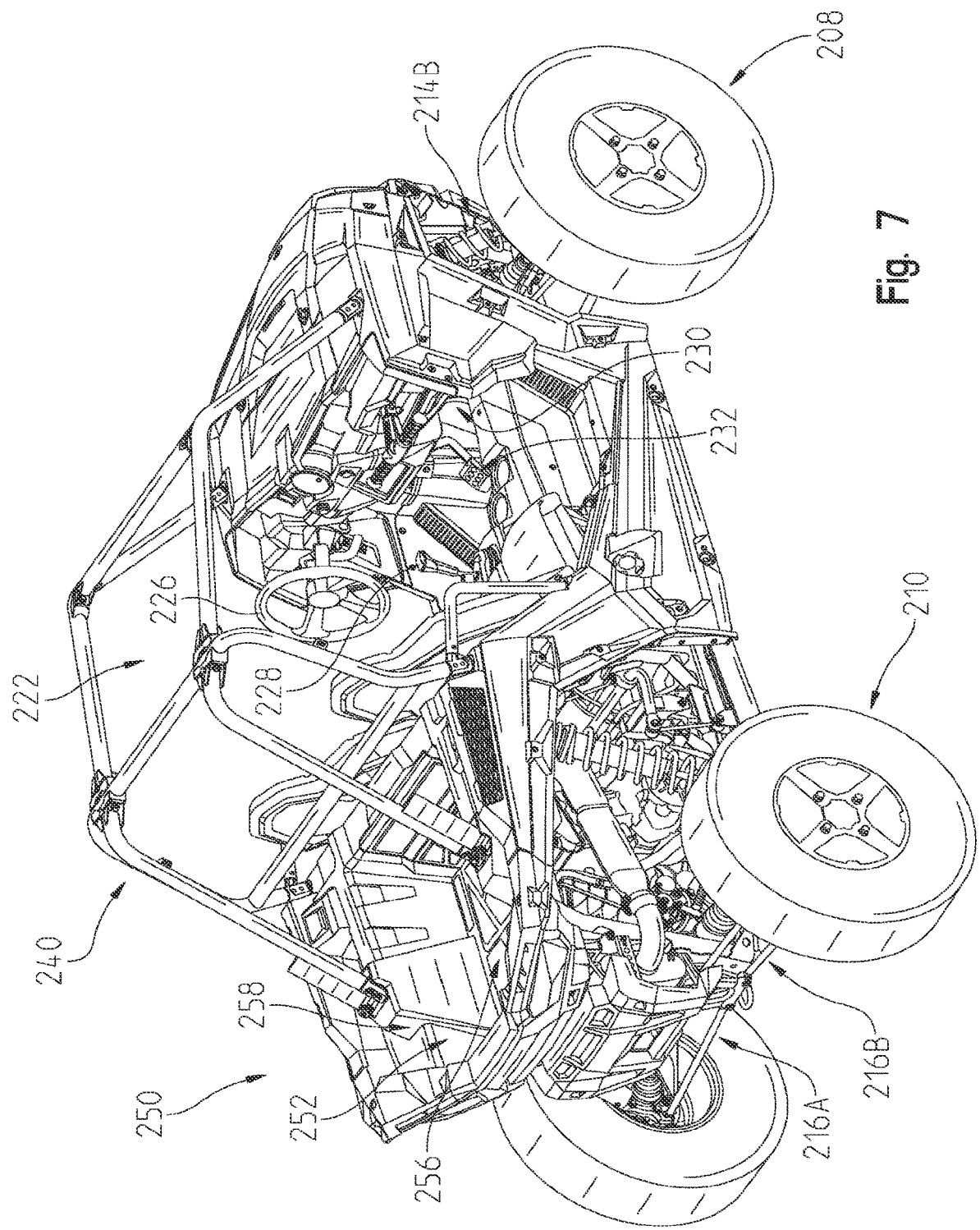
FIG. 7 illustrates a second, perspective view of the exemplary vehicle of FIG. 6.
Figure 8:
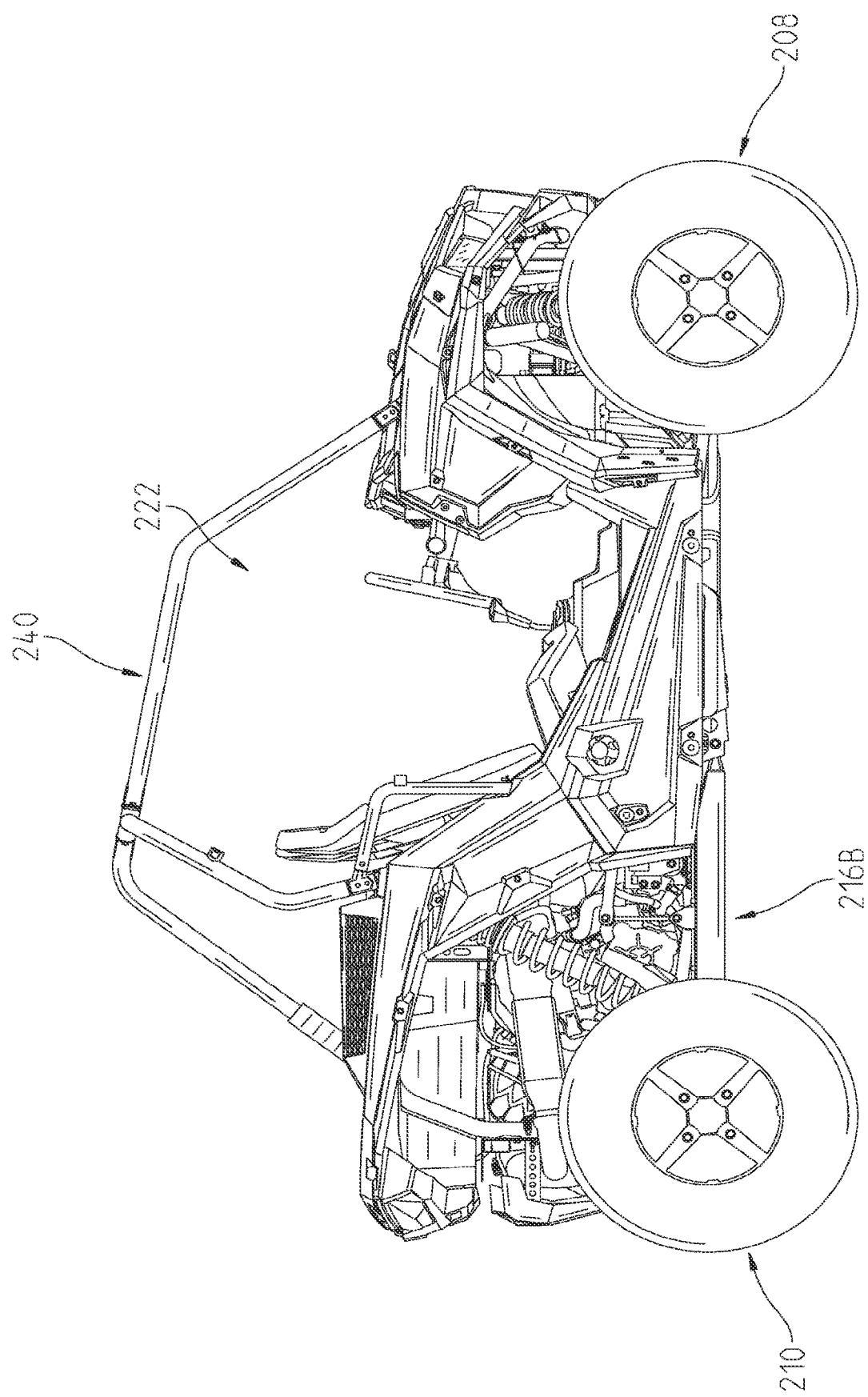
FIG. 8 illustrates a side view of the exemplary vehicle of FIG. 6.

Referring to the illustrated embodiment in FIG. 6, a first set of wheels, one on each side of vehicle 200, generally correspond to a front axle 208. A second set of wheels, one on each side of vehicle 200, generally correspond to a rear axle 210. Although each of front axle 208 and rear axle 210 are shown having a single ground engaging member 12 on each side, multiple ground engaging members 12 may be included on each side of the respective front axle 208 and rear axle 210. As configured in FIG. 6, vehicle 200 is a four wheel, two axle vehicle.

Figure 9:
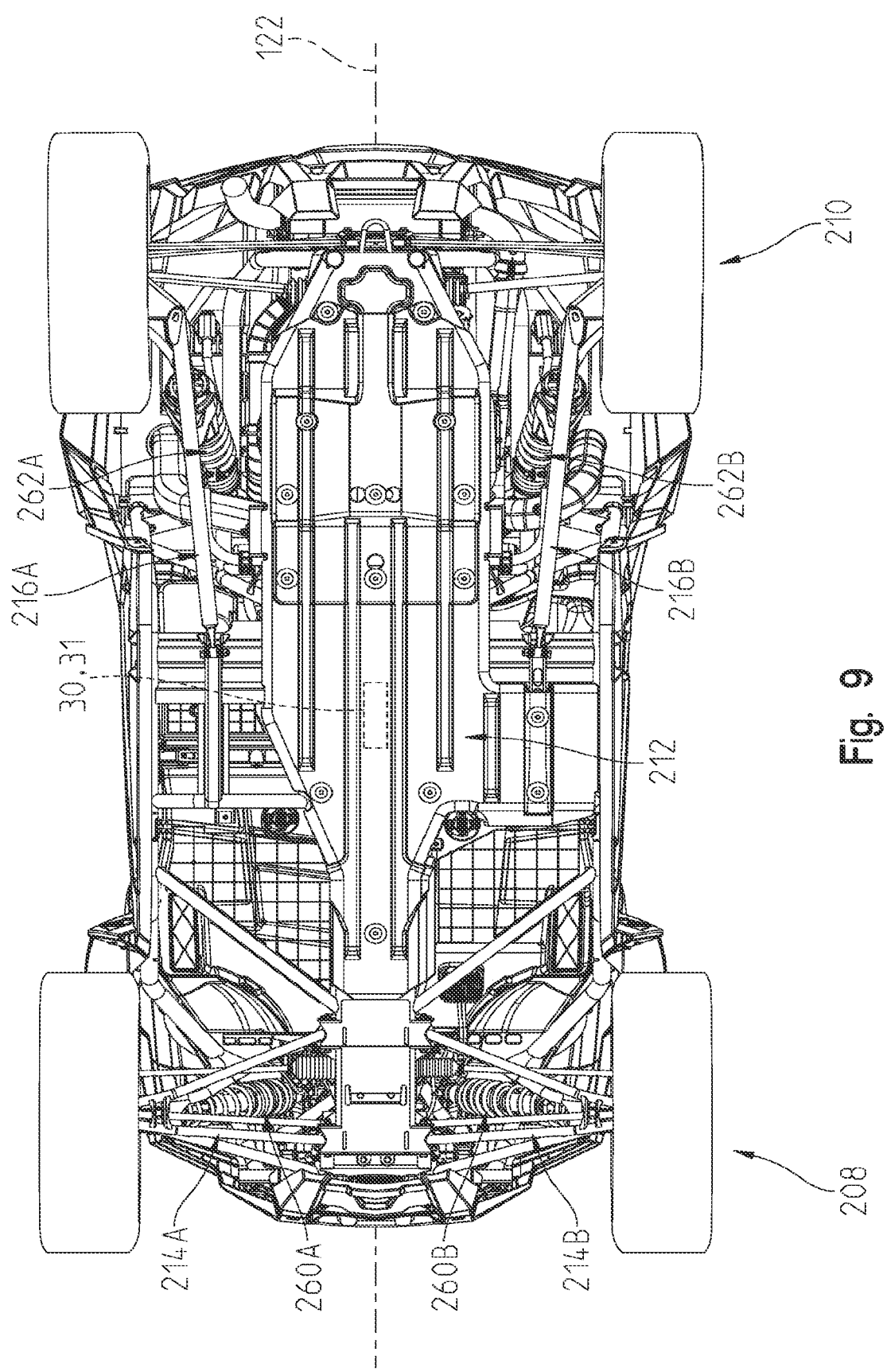
FIG. 9 illustrates a bottom view of the exemplary vehicle of FIG. 6.

Referring to FIG. 9, wheels 204 of front axle 208 are coupled to a frame 212 of vehicle 200 through front independent suspensions 214. Front independent suspensions 214 in the illustrated embodiment are double A-arm suspensions. Other types of suspensions systems may be used for front independent suspensions 214. The wheels 204 of rear axle 210 are coupled to frame 212 of vehicle 200 through rear independent suspensions 216. Other types of suspensions systems may be used for rear independent suspensions 216.

Returning to FIG. 6, vehicle 200 includes a cargo carrying portion 250. Cargo carrying portion 250 is positioned rearward of an operator area 222. Operator area 222 includes seating 224 and a plurality of operator controls. In the illustrated embodiment, seating 224 includes a pair of bucket seats. In one embodiment, seating 224 is a bench seat. In one embodiment, seating 224 includes multiple rows of seats, either bucket seats or bench seats or a combination thereof. Exemplary operator controls include a steering wheel 226, a gear selector 228, an accelerator pedal 230 (see FIG. 7), and a brake pedal 232 (see FIG. 7). Steering wheel 226 is operatively coupled to the wheels of front axle 208 to control the orientation of the wheels relative to frame 212. Gear selector 228 is operatively coupled to the shiftable transmission 68 to select a gear of the shiftable transmission 68. Exemplary gears include one or more forward gears, one or more reverse gears, and a park setting. Accelerator pedal 230 is operatively coupled to prime mover 62 to control the speed of vehicle 200. Brake pedal 232 is operatively coupled to brake units associated with one or more of wheels 204 to slow the speed of vehicle 200.

Operator area 222 is protected with a roll cage 240. Referring to FIG. 6, side protection members 242 are provided on both the operator side of vehicle 200 and the passenger side of vehicle 200. In the illustrated embodiment, side protection members 262 are each a unitary tubular member.

In the illustrated embodiment, cargo carrying portion 250 includes a cargo bed 234 having a floor 256 and a plurality of upstanding walls. Floor 256 may be flat, contoured, and/or comprised of several sections. Portions of cargo carrying portion 250 also include mounts 258 which receive an expansion retainer (not shown). The expansion retainers which may couple various accessories to cargo carrying portion 250. Additional details of such mounts and expansion retainers are provided in U.S. Pat. No. 7,055,454, to Whiting et al., filed Jul. 13, 2004, titled "Vehicle Expansion Retainers," the entire disclosure of which is expressly incorporated by reference herein.

Front suspensions 214A and 214B each include a shock absorber 260, respectively. Similarly, rear suspensions 216A and 216B each include a shock absorber 262. In one embodiment each of shock absorbers 260 and shock absorbers 262 are electronically adjustable shocks 18 which are controlled by a controller 20 of vehicle 200.

Additional details regarding vehicle 200 are provided in U.S. Pat. Nos. 8,827,019 and 9,211,924, assigned to the present assignee, the entire disclosures of which are expressly incorporated by reference herein. Other exemplary recreational vehicles include ATVs, utility vehicles, snowmobiles, other recreational vehicles designed for off-road use, on-road motorcycles, and other suitable vehicles.

Figure 10:
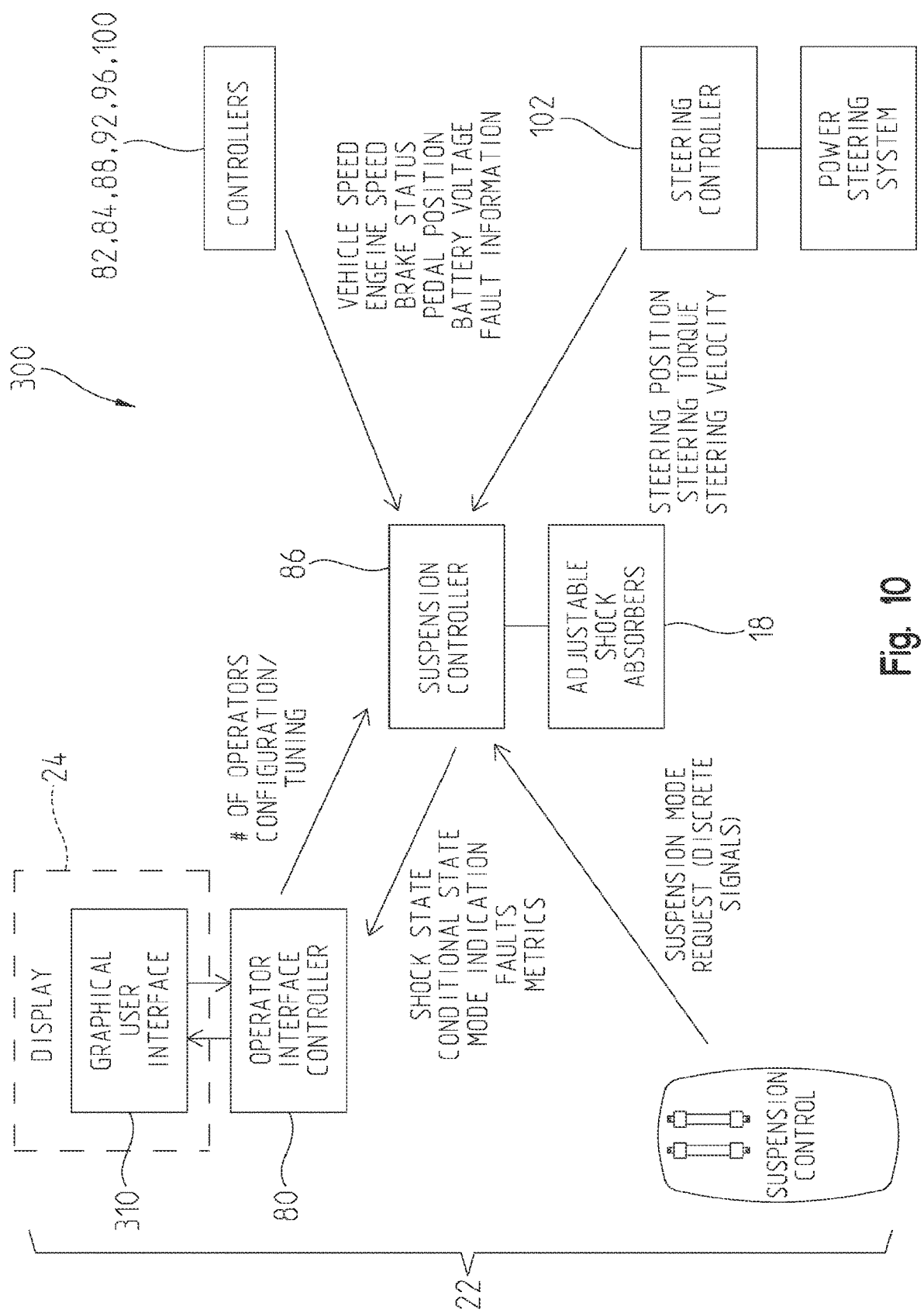
FIG. 10 illustrates an exemplary representation of an operation of the suspension controller of FIG. 5 and interaction with other vehicle systems.

Referring to FIG. 10, an exemplary control system 300 for controlling the damping of shock absorbers 18 is provided. Suspension controller 86 is operatively coupled to shock absorbers 18 and controls the damping of shock absorbers 18 based on a plurality of inputs. Exemplary inputs are provided in FIG. 10 and throughout this disclosure. Further, additional exemplary inputs for suspension controller 86 and control processing sequences for suspension controller 86 are provided in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein.

With reference to FIG. 10, steering controller 102 is operatively coupled to a power steering system 302. Steering controller 102 communicates over network 78 values for one or more monitored parameters to suspension controller 86. Exemplary monitored parameters include a steering position, for example a steering angle of steering wheel 226 for vehicle 200, a steering torque, and a steering velocity.

In some instances, the steering angle of vehicle 100 provided by steering controller 102 may drift over time compared to the actual orientation of the steerable wheels 204 of vehicle 200, illustratively wheels 204 of front axle 208. For example, an operator of vehicle 200 may have to turn a steering device, such as steering wheel 226 for vehicle 200, from its straight line position to maintain vehicle 200 traveling straight along the x-axis (see FIG. 3). As such, steering controller 102 may indicate a slight turn when in reality vehicle 200 is traveling straight. Exemplary reasons for the difference include changes in vehicle 200 as vehicle 200 is broken in and hardware issues, such as a flat or underinflated tire, a bent steering component, or a bent suspension component.

As mentioned herein, suspension controller 86 may determine vehicle 10 is cornering based on the steering position, such as steering angle, received from steering controller 102. In one embodiment, suspension controller 86 receives the steering position from steering controller 102 and based on inputs from other sensors of the plurality of sensors 40 determines a revised steering position to use as the input for determining if vehicle 10 is cornering.

Figure 22:
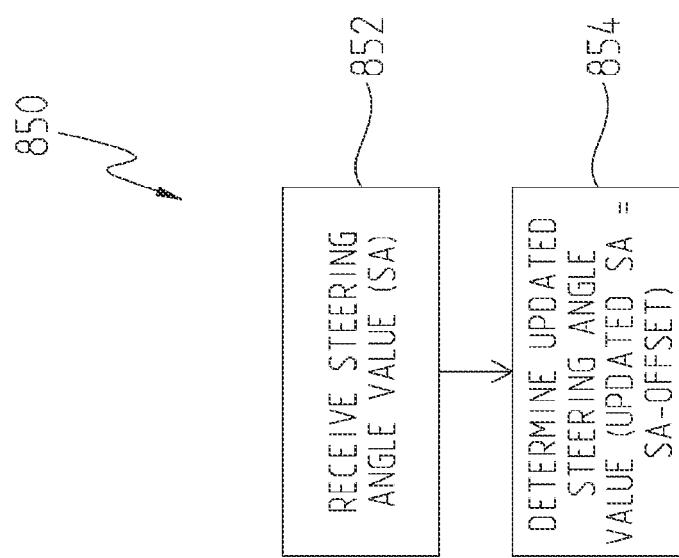
FIG. 22 illustrates an exemplary processing sequence of the controller of FIG. 1 regarding a steering angle of the vehicle.

Referring to FIG. 22, an exemplary processing sequence 850 of the logic of suspension controller 86 for determining a revised steering position is illustrated. A steering angle value is received by suspension controller 86 from steering system 104, as represented by block 852. An updated steering angle value is determined by suspension controller 86, as represented by block 854, by applying an offset to the steering angle value. The offset may be applied to the steering angle value in one example by subtracting the offset value and in another example by adding the offset value. The value of the offset is calibrated and stored in a memory accessible by suspension controller 86. In one embodiment, the offset is not actively adapting when a Steering Angle received over the vehicle network 78 is not valid, an Engine Speed received over the vehicle network 78 is not valid, a Vehicle Speed received over the vehicle network 78 is not valid, and/or a y-axis acceleration is not valid, the y-axis acceleration is not valid when it indicates that vehicle 10 is side hilling. The steering angle adaptation processing sequence 850 is also not active when vehicle 10 is determined to be airborne, braking, or accelerating.

In one example, the offset value is calibrated by the operator of vehicle 10 during operation of vehicle 10. The operator positions the steering wheel 226 of vehicle 10 such that vehicle 10 is traveling straight. The operator selects a steering angle calibrate input of operator input 22. Suspension controller 86 receives the steering angle value from steering system 104 over a period of time and sets the offset equal to the average steering angle value over that period of time. Once set, the operator deselects the calibrate input or suspension controller 86 exits the calibrate routine.

In another example, the offset value is calibrated by suspension controller 86 based on a plurality of inputs from the plurality of sensors 40. Suspension controller 86 determines a direction of travel of vehicle 10 based on the x-axis and y-axis of accelerometer 30 and/or the rotation rate about the z-axis of gyroscope 31. If suspension controller 86 determines vehicle 10 is traveling straight in the x-axis direction, then vehicle 10 adjusts the offset value in block 854 over time.

In one embodiment, suspension controller 86 may determine vehicle 10 is cornering based on a Yaw characteristic of vehicle 10. Referring to FIG. 2, when vehicle 10 is cornering, vehicle 10 experiences a rotation about the z-axis. By using a Yaw characteristic, such as rotation about the z-axis, suspension controller 86 may account for cornering events that are not initiated using steering angle or cornering events that are inconsistent with steering angle. Based on the terrain, cornering events are sometimes initiated through a braking of vehicle 10 or an acceleration of vehicle 10. Further, in some scenarios an operator of vehicle 10 will provide a steering angle input of a cornering event to the right to keep vehicle 10 in a cornering event to the left. The Yaw characteristic based cornering processing sequence is able to more accurately detect cornering events in conditions such as over-steer sliding initiated by low friction surfaces, oversteer sliding initiated by braking, oversteer sliding initiated by acceleration, general maneuvers on ice/snow, and any driving situation with counter steer.

Figure 24A:
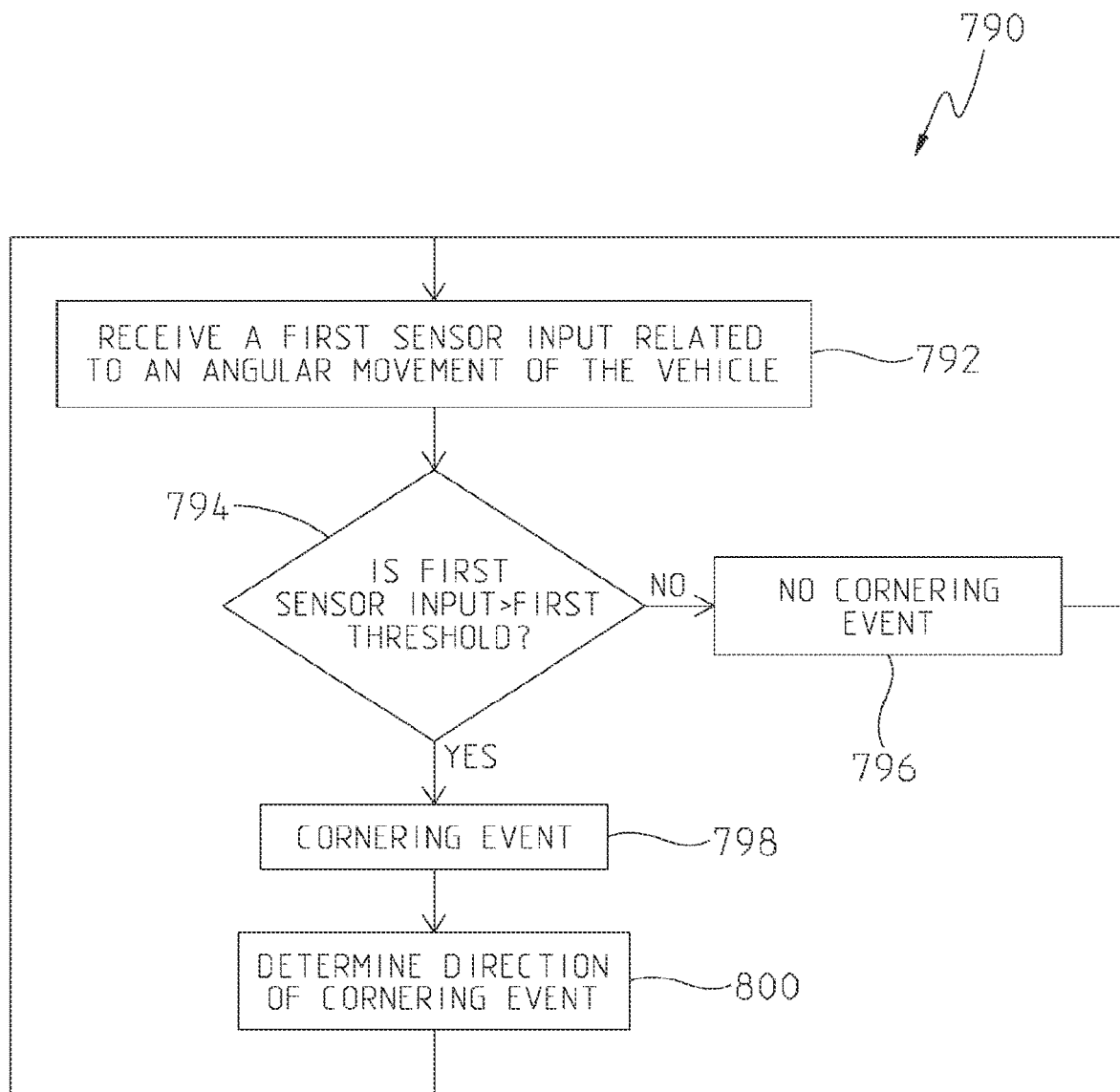
FIG. 24A illustrates an exemplary processing sequence of the controller of FIG. 1 regarding cornering detection of the vehicle.

Referring to FIG. 24A, an exemplary processing sequence 790 of suspension controller 86 is shown. Suspension controller 86 receives a first sensor input related to an angular movement of the vehicle, as represented by block 792. In one example, the angular movement of the vehicle is an overall angular movement of the vehicle about the z-axis (see FIG. 2). In one example, the first sensor is a yaw rate sensor which measures a rotation rate about the z-axis of the vehicle (see FIG. 2).

Suspension controller 86 compares the first sensor input to a first threshold, as represented by block 794. In one example suspension controller 86 compares a magnitude of the first sensor input to the first threshold. In one example, the magnitude of the first sensor value is averaged over a period of time and the averaged value is compared to the first threshold. If the magnitude of the first sensor input exceeds the first threshold, suspension controller 86 determines that a cornering event is occurring, as represented by block 798. Otherwise, suspension controller 86 determines that a cornering event has not occurred, as represented by block 796. If a cornering event has been determined to be occurring, the direction of the cornering event is determined, as represented by block 800. In one example, the sign of the yaw rotation rate indicates the direction of the cornering event.

In one embodiment, suspension controller 86 further determines if vehicle 10 is spinning by comparing an angular characteristic of the vehicle, such as the yaw rotation rate, to a second threshold. If the magnitude of the yaw rotation rate exceeds the second threshold, then suspension controller 86 determines that vehicle 10 is spinning. In one example, the angular characteristic is the yaw rotation rate and the second threshold is about 100 degrees per second. In another example, the angular characteristic is a change in the direction of travel of the vehicle of at least 90 degrees over a period of time.

In one embodiment, when suspension controller 86 determines vehicle 10 is cornering to the left the stiffness of the damping characteristic of the adjustable shocks 18 on the right side of vehicle 10 (passenger side) is increased, when suspension controller 86 determines vehicle 10 is cornering to the right the stiffness of the damping characteristic of the adjustable shocks 10 on the left side of vehicle 10 (driver side) is increased, and when suspension controller 86 determines vehicle 10 is spinning the stiffness of all of the adjustable shocks 18 is increased.

Figure 24B:
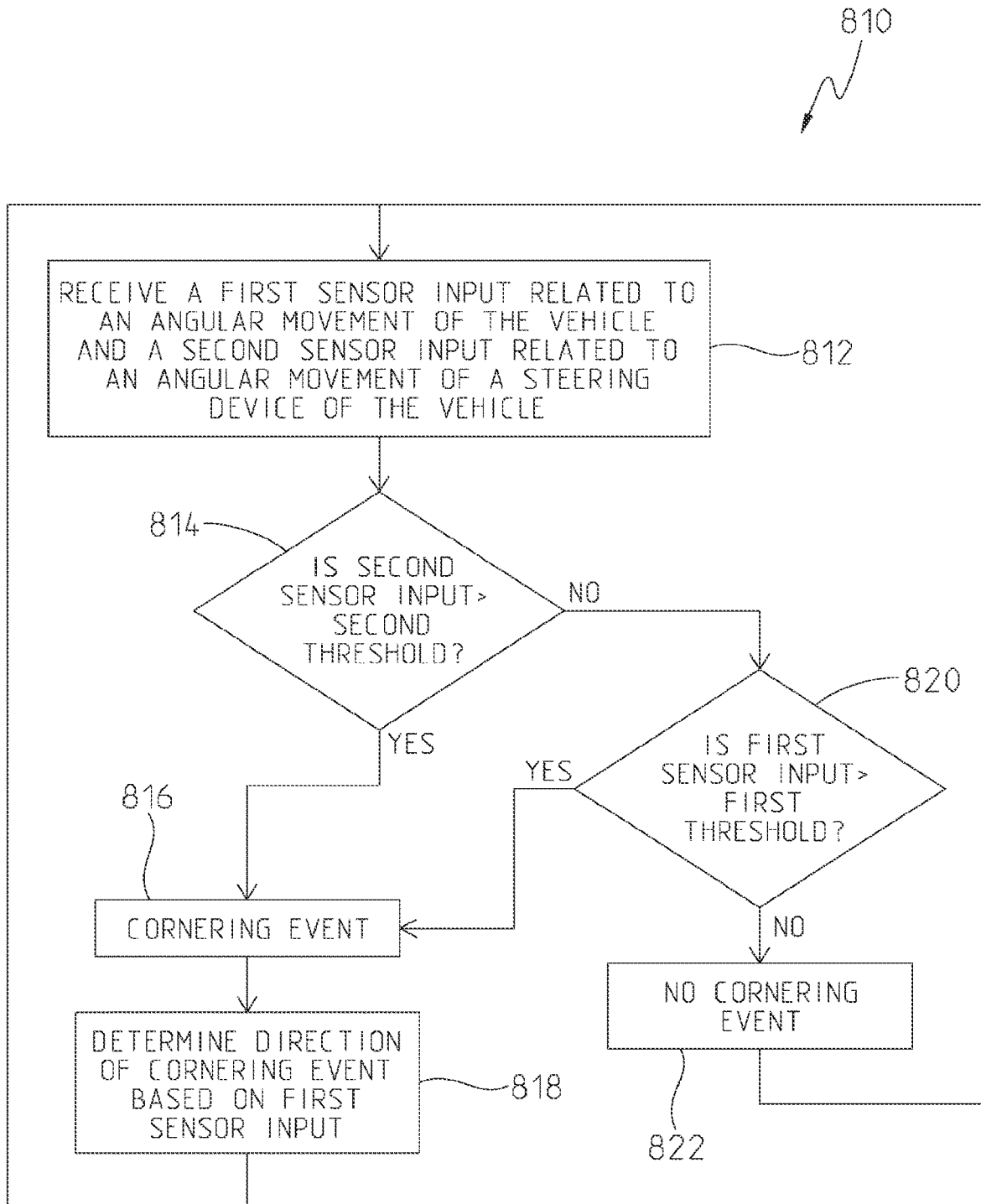
FIG. 24B illustrates an exemplary processing sequence of the controller of FIG. 1 regarding cornering detection of the vehicle.

Referring to FIG. 24B, another exemplary processing sequence 810 of suspension controller 86 is shown. Suspension controller 86 receives a first sensor input related to an angular movement of the vehicle and a second sensor input related to a position of a steering device, such as steering wheel 226, of vehicle 200, as represented by block 812. In one example, the angular movement of the vehicle is an overall angular movement of the vehicle about the z-axis (see FIG. 2). In one example, the first sensor is a yaw rate sensor which measures a rotation rate about the z-axis of the vehicle (see FIG. 2) and the second sensor measures an angle of the steering wheel 226.

Suspension controller 86 compares the second sensor input to a second threshold, as represented by block 814. In one example suspension controller 86 compares a magnitude of the second sensor input to the second threshold. If the magnitude of the second sensor input exceeds the second threshold, suspension controller 86 determines that a cornering event is occurring, as represented by block 816. Otherwise, suspension controller 86 compares the first sensor input to a first threshold, as represented by block 820. In one example suspension controller 86 compares a magnitude of the first sensor input to the first threshold. If the magnitude of the first sensor input exceeds the first threshold, suspension controller 86 determines that a cornering event is occurring, as represented by block 816. Otherwise, suspension controller 86 determines that a cornering event has not occurred, as represented by block 822. If a cornering event has been determined to be occurring, the direction of the cornering event is determined, as represented by block 818. In one example, the sign of the yaw rotation rate indicates the direction of the cornering event. In this manner, the angular characteristic of the overall vehicle, for example the yaw rotation rate, takes priority over the angular characteristic of a steering device of the vehicle, for example the angle of the steering wheel 226. If the steering system indicates the vehicle is turning right and the yaw rate indicates the vehicle is turning left, suspension controller 86 will use the determination of yaw rate sensor to establish the direction of cornering.

In one embodiment, the yaw angular rate threshold changes as a function of vehicle speed.

Suspension controller 86 is further operatively coupled to prime mover controller 82, transmission controller 84, communication controller 88, vehicle controller 92, ride height controller 96, and agility controller 100. One or more of prime mover controller 82, transmission controller 84, communication controller 88, vehicle controller 92, ride height controller 96, and agility controller 100 communicates over network 78 values for one or more monitored parameters to suspension controller 86. Exemplary monitored parameters include a vehicle speed, an engine speed, a brake status (brake pedal 232 applied or not applied), a throttle pedal position (accelerator pedal 230 position), a battery voltage of a battery 80 (powers start-up of vehicle 10), and any fault information.

Suspension controller 86 is further operatively coupled to operator interface controller 80 of user interface 22. Operator interface controller 80, in one embodiment, communicates over network 78 values for parameters selected by an operator of vehicle 10. Exemplary parameters include a number of operators or riders, a ride mode selection for suspension system 11, and other suitable tuning selections for shock absorbers 18 of suspension system 11. In one example, the operator may input a value for the number of riders and a value estimating a cargo weight through display 24. In one embodiment, vehicle 200 includes sensors associated with seating 224 which provide an indication of whether a rider is positioned in the respective seats or not. Further, vehicle 200 may include additional sensors which monitor an amount of cargo being carried by cargo carrying portion 250. Suspension controller 86 also communicates information to operator interface controller 80. Exemplary information includes a current shock absorber state for shock absorbers 18, a conditional shock absorber state for shock absorbers 18 (for example, "Turning", "Airborne", and "Anti-Dive"), a ride mode selection for suspension system 11, fault information, and vehicle metrics. Exemplary vehicle metrics include values of parameters received by suspension controller 86. In the illustrated embodiment, operator interface controller 80 is operatively coupled to display 24. In one embodiment, display 24 is a touch screen display that presents one or more screens of a graphical user interface 310 to an operator of vehicle 10.

As shown in FIG. 10, in one embodiment, suspension controller 86 is further operatively coupled to a suspension control rocker switch 312. Rocker switch 312 is connected through a serial connection to suspension controller 86. Rocker switch 312 has three positions. Suspension controller 86 determines whether rocker switch 312 is in a first position corresponding to the suspension being in a comfort mode (described herein), a second position corresponding to the suspension being in a sport mode (described herein), and a third position corresponding to the suspension being in a firm mode (described herein).

Rocker switch 312 may be used in place of display 24 or in addition to the inputs provided through display 24. In one example, rocker switch 312 selects between multiple rides modes and the inputs of graphical user interface 310 provide operator customization of the vehicle characteristics associated with each of the selectable ride modes as indicated by the configuration/tuning label in FIG. 10. In another example, vehicle 10 does not include rocker switch 312 and the selection of various ride modes and operator customization of the vehicle characteristics associated with each of the selectable ride modes is received by controller 20 through graphical user interface 310 of display 24.

Figure 11:
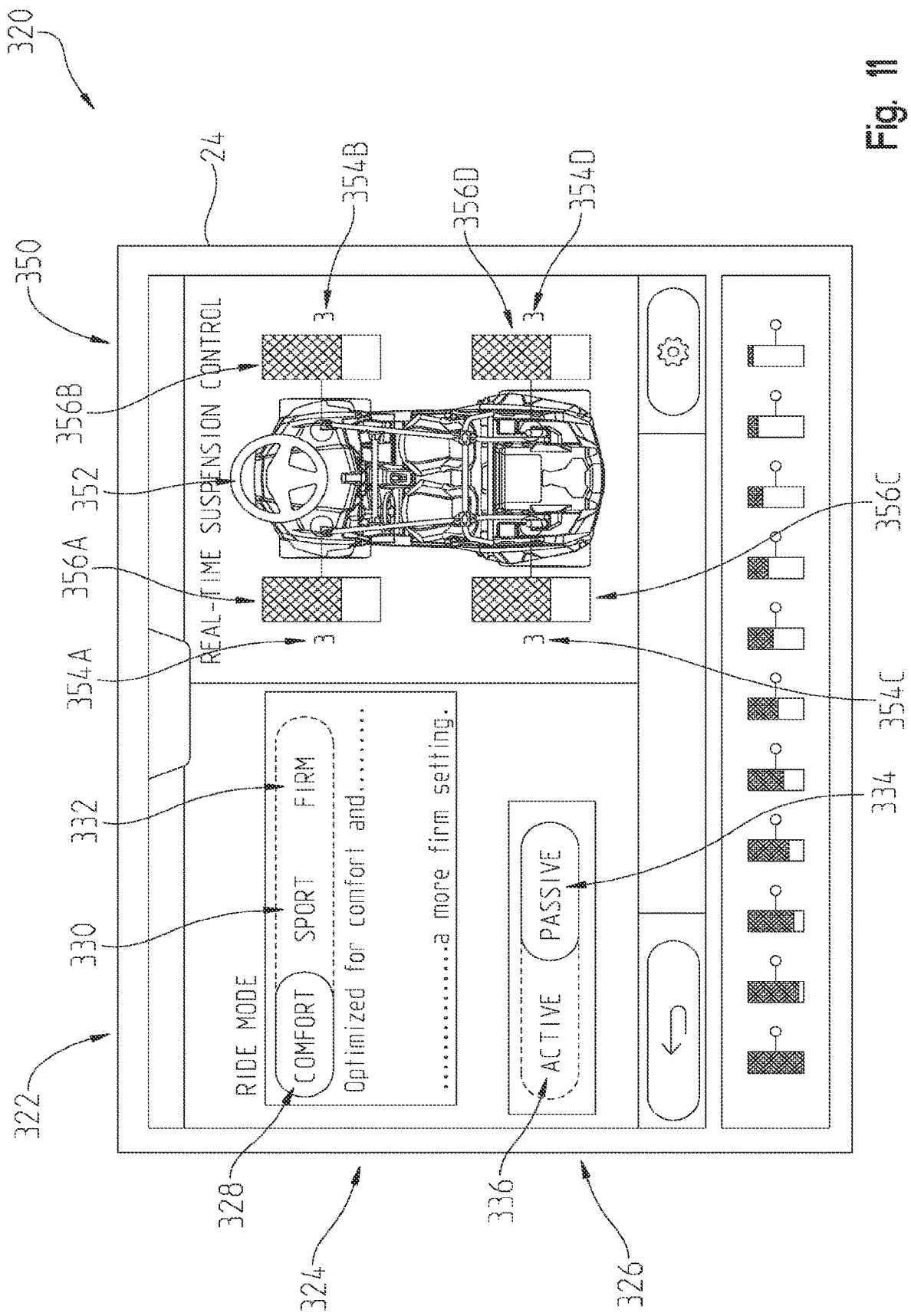
FIG. 11 illustrates an exemplary screen layout for a graphical user interface of an operator interface of the vehicle of FIG. 1.

As mentioned in connection with FIG. 10, in one embodiment, vehicle 10 includes a graphical user interface 310 presented on display 24. Referring to FIG. 11, an exemplary screen 320 of graphical user interface 310 is illustrated. Screen 320 includes a first portion 322 having operator selectable inputs 324 to select a ride mode for suspension system 11 and operator selectable inputs 326 to select the manner in which suspension system 11 is adjusted.

Operator selectable inputs 324 include a plurality of inputs which permit the operator to select from a plurality of predefined ride modes. Illustratively, exemplary inputs 328, 330, and 332 correspond to a comfort ride mode, a sport ride mode, and a firm ride mode, respectively. Suspension controller 86 has stored damping profiles that correspond to each ride mode. In the following description, inputs 328, 330, and 332 are used to select the various ride modes. However, in one embodiment, the portions of display 24 corresponding to inputs 328, 330, and 332 only provide visual feedback to the operator of the current ride mode and are not selectable inputs. Rather, the ride modes are selected through suspension control rocker switch 312.

In one embodiment, a comfort ride mode is selected by touching the portion of display 24 at which the comfort button 328 is displayed. A comfort ride mode is generally optimized for comfort and performance. The suspension remains normally soft unless dynamic vehicle conditions sensed by one or more of vehicle condition sensors 40 demand a more firm setting. In one embodiment, a comfort ride mode is selected by actuation of suspension control rocker switch 312 and the portion of display 24 at which the comfort button 328 is displayed is highlighted or otherwise changed in appearance to provide visual feedback to the operator of the selection of the comfort ride mode. In one embodiment, in the comfort mode, suspension controller 86 controls both a compression damping of the adjustable shocks 18 and a rebound damping of the adjustable shocks. Adjustable shocks 18 are set to have a lower compression damping and a lower rebound damping compared to a sport mode. By having a lower rebound damping the suspension will allow the ground engaging members 12 to drop out faster to the terrain. This will create a more comfortable ride for vehicle 10. In one example, the amount of compression damping, rebound damping, or both is dependent on a ground speed of vehicle 10.

A sport ride mode is selected by touching the portion of display 24 at which the sport button 330 is displayed. The sport ride mode, like other ride modes, may be selected through other inputs of operator interface 22, such as buttons, toggle switches, and other suitable input devices. A sport ride mode increases the baseline damping of shock absorbers 18 compared to the comfort ride mode, more aggressively controls body roll for vehicle conditions such as turning or airborne, and has different speed sensitivity characteristics for increasing the damping of shock absorbers 18. In one embodiment, a sport ride mode is selected by actuation of suspension control rocker switch 312 and the portion of display 24 at which the sport button 330 is displayed is highlighted or otherwise changed in appearance to provide visual feedback to the operator of the selection of the sport ride mode. In one embodiment, in the sport mode, suspension controller 86 controls both a compression damping of the adjustable shocks 18 and a rebound damping of the adjustable shocks. Adjustable shocks 18 are set to have a higher compression damping and a higher rebound damping compared to a comfort mode. In one example, the amount of compression damping, rebound damping, or both is dependent on a ground speed of vehicle 10.

A firm ride mode is selected by touching the portion of display 24 at which the firm button 332 is displayed. A firm ride mode increases the baseline damping of shock absorbers 18 compared to sports mode. In one example, the firm ride mode provides a maximum damping characteristic of shock absorbers 18. In one embodiment, a firm ride mode is selected by actuation of suspension control rocker switch 312 and the portion of display 24 at which the comfort button 332 is displayed is highlighted or otherwise changed in appearance to provide visual feedback to the operator of the selection of the firm ride mode.

Below operator selectable inputs 324 is an information panel that provides a textual description of the ride mode selected. Additional ride modes are disclosed in US Published Patent Application No. 2016/0059660 as drive modes, the entire disclosure of which is expressly incorporated by reference herein.

Operator selectable inputs 326 include a plurality of inputs which permit the operator to select an active suspension management and a passive suspension management. A passive suspension management is selected by touching the portion of display 24 at which a passive button 334 is displayed. In the passive suspension management, suspension controller 86 adjusts the damping profiles of shock absorbers 18 based on the position of suspension control rocker switch 312. An active suspension management is selected by touching the portion of display 24 at which an active button 336 is displayed. In the active suspension management, suspension controller 86 adjusts the damping profiles of shock absorbers 18 based on logic contained in controller 20 and based on inputs provided through graphical user interface 310 and suspension control rocker switch 312.

Operator selectable inputs 326 further includes a second portion 350 which provides a graphical feedback to the operator of a steering angle of steering wheel 226 through a rotation orientation of icon 352 and of the firmness of each of shock absorbers 18 through a numerical indicator 354A-D and a graphical indicator 356A-D. A firmness scale is provided below first portion 322 and second portion 350 which provides a graphical representation of a shock firmness from soft on the left to hard on the right. In one embodiment, the graphical representation changes color from green to yellow to red as the firmness increases. In one example, numerical indicators 354A-D and graphical indicators 356A-D provide actual damping values. In another example, numerical indicators 354A-D and graphical indicators 356A-D provide smoothed damping values, such as an average damping value over a time window. In one example, an operator input permits the operator to select whether to display actual damping values or smoothed damping values.

In one embodiment, each of shock absorbers 18 may have individually set damping profiles which may be set by an operator through graphical user interface 310 of 24 or other suitable operator inputs of user interface 22. In one embodiment, operator inputs of operator interface 22 include at least one input which provides the operator the ability to add a preset damping amount to each of the adjustable shocks 18 (compression, rebound, or both) or to subtract a preset damping amount to each of the adjustable shocks 18 (compression, rebound, or both). In one example, the added or subtracted offset is applied to vehicle speed based damping profiles only. In another example, the added or subtracted offset is applied to one or more selected semi-active modes, such as Cornering, Anti-dive, Anti-squat, Airborne, and other suitable modes.

In one embodiment, controller 20 may limit power system 60 to maintain vehicle 10 below a set speed, based on the damping parameters of adjustable shocks 10, to ensure suitable vehicle handling and stability. In one embodiment, controller 20 may store damping profiles for each of a plurality of operators which are selectable through graphical user interface 310 of display 24.

Figure 12:
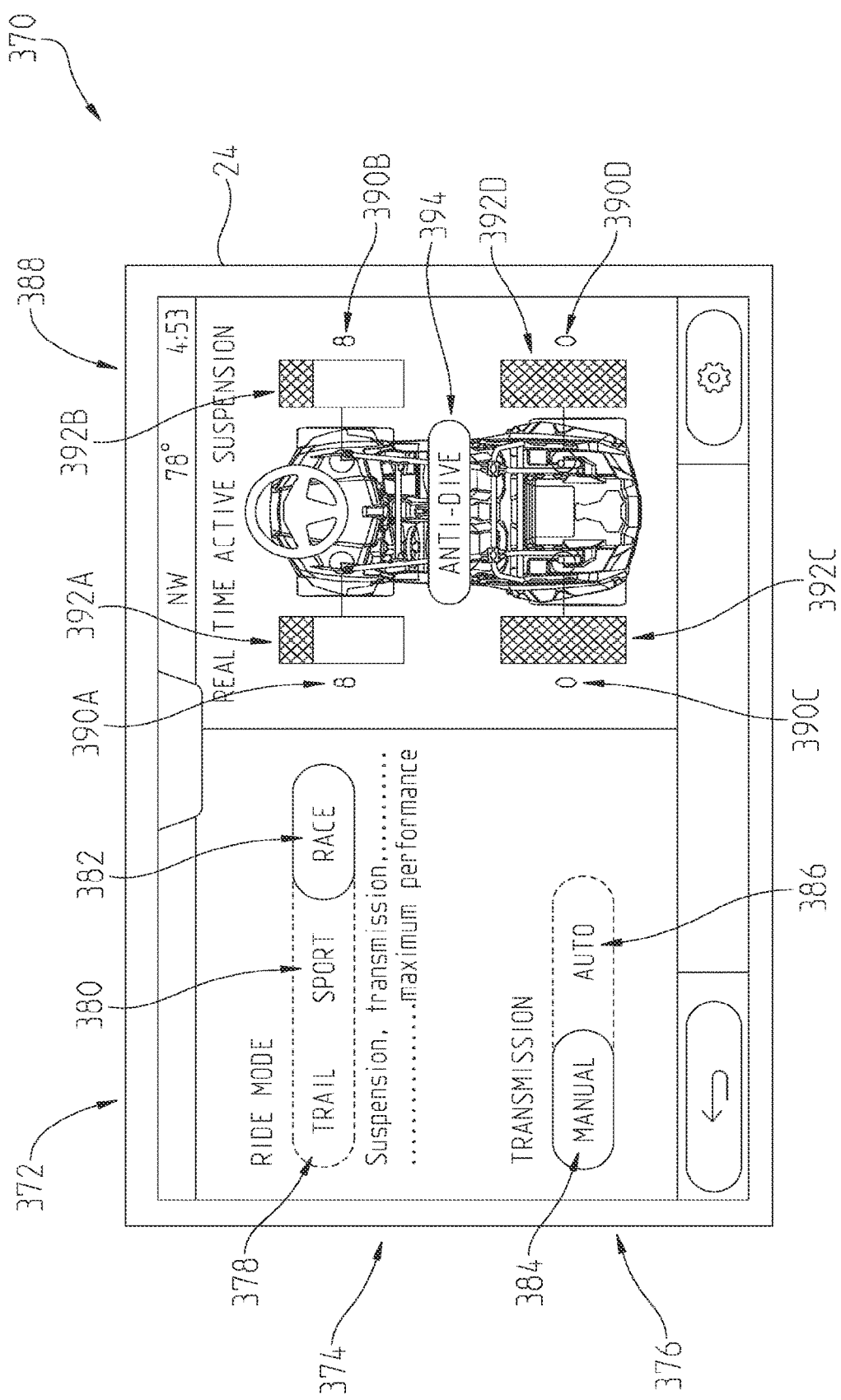
FIG. 12 illustrates another exemplary screen layout for the graphical user interface of the operator interface of the vehicle of FIG. 1.

Referring to FIG. 12, an exemplary screen 370 of graphical user interface 310 is illustrated. Screen 370 includes a first portion 372 having operator selectable inputs 374 to select a ride mode for suspension system 11 and operator selectable inputs 376 to select a setting for transmission 66.

Operator selectable inputs 374 includes a plurality of inputs which permit the operator to select from a plurality of predefined ride modes. Illustratively, exemplary inputs 378, 380, and 382 correspond to a trail ride mode, a sport ride mode, and a race ride mode, respectively. Below operator selectable inputs 324 is an information panel that provides a textual description of the ride mode selected. Suspension controller 86 has stored damping profiles that correspond to each ride mode. In the following description, inputs 378, 380, and 382 are used to select the various ride modes. However, in one embodiment, the portions of display 24 corresponding to inputs 378, 380, and 382 only provide visual feedback to the operator of the current ride mode and are not selectable inputs. Rather, the ride modes are selected through suspension control rocker switch 312.

A trail ride mode is selected by touching the portion of display 24 at which the trail button 378 is displayed. A trail ride mode is generally an aggressive setup of the suspension, transmission, and throttle responses tuned for high performance. In one embodiment, a trail ride mode is selected by actuation of suspension control rocker switch 312 and the portion of display 24 at which the comfort button 378 is displayed is highlighted or otherwise changed in appearance to provide visual feedback to the operator of the selection of the trail ride mode.

A sport ride mode is selected by touching the portion of display 24 at which the sport button 380 is displayed. A sport ride mode increases the baseline damping of shock absorbers 18 compared to the trail ride mode, more aggressively controls body roll for vehicle conditions such as turning or airborne, and has different speed sensitivity characteristics for increasing the damping of shock absorbers 18. In one embodiment, a sport ride mode is selected by actuation of suspension control rocker switch 312 and the portion of display 24 at which the sport button 380 is displayed is highlighted or otherwise changed in appearance to provide visual feedback to the operator of the selection of the sport ride mode.

A race ride mode is selected by touching the portion of display 24 at which the race button 382 is displayed. A race ride mode increases the baseline damping of shock absorbers 18 compared to sports mode. In one example, the race ride mode provides a maximum damping characteristic of shock absorbers 18. In one embodiment, a race ride mode is selected by actuation of suspension control rocker switch 312 and the portion of display 24 at which the race button 328 is displayed is highlighted or otherwise changed in appearance to provide visual feedback to the operator of the selection of the race ride mode.

Operator selectable inputs 376 include a plurality of inputs which permit the operator to select a setting for transmission 66. A manual setting is selected by touching the portion of display 24 at which a manual button 384 is displayed. An automatic setting is selected by touching the portion of display 24 at which an auto button 386 is displayed. In one embodiment, the manual setting for transmission 66 means the operator has control over the operation of CVT 70 and the auto setting for transmission 66 means CVT 70 functions without operator intervention. Exemplary CVTs 70 which are configurable in both a manual setting and an auto setting are provided in U.S. Pat. No. 9,429,235, the entire disclosure of which is expressly incorporated by reference herein.

Screen 370 further includes a second portion 388 which provides a graphical feedback to the operator of the firmness of each of shock absorbers 18 through a numerical indicator 390A-D and a graphical indicator 392A-D. In one example, a height of the solid portion of the graphical indicator represents a level of a damping characteristic, either a compression damping or a rebound damping. In one example, the height is not linearly related to the damping characteristic to provide a visual emphasis. Additionally color variation may be used for visual emphasis (green, yellow, orange, red). Further, second portion 388 provides a graphical feedback of any vehicle condition modifiers which are currently active, as represented by icon 394. In one example, an operator input permits the operator to select whether to display a active vehicle condition modifier icon 394 or not. In the illustrated example, an anti-dive icon is displayed. In an anti-dive condition, suspension controller 86 in response to an indication of heavy braking from brake sensor 32 adjusts the damping levels of adjustable shocks 18 adjacent the front axle to be firmer to reduce "dive" of the vehicle. In one embodiment, in the anti-dive condition, suspension controller 86 in response to an indication of heavy braking from brake sensor 32 adjusts the compression damping levels of adjustable shocks 18 adjacent the front axle to be firmer to reduce "dive" of the vehicle, increase the rebound damping of the rear adjustable shocks 18 of vehicle 10 to decrease the rebound speed of the adjustable shocks 18 and provide improved pitch control of vehicle 10, and decrease the rebound damping of the front adjustable shocks 18 of vehicle 10 to allow the ground engaging members 12 to get back to the terrain while braking in chatter (e.g. experiencing a high speed harsh trail). In one example, the amount of compression damping, rebound damping, or both is dependent on a ground speed of vehicle 10.

Other exemplary vehicle condition modifiers include the Cornering Condition, the Ride Condition, the Squat Condition, the Brake Condition, the Roll/Cornering Condition, the Jump/Pitch Condition, and other factors or combination of factors that cause changes in the damping level of the adjustable shocks in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein. In one embodiment, operator interface 22 includes operator inputs whereby an operator may select one or more of the vehicle condition modifiers to deactivate or activate. Deactivated vehicle condition modifiers will not be used by suspension controller 86 in adjusting the damping characteristics of adjustable shocks 18.

In one embodiment, in the Cornering Condition, suspension controller 86 in addition to changes to the compression damping will increase the rebound damping on adjustable shocks 18 which are inside on the turn, such as the left side adjustable shocks for a left turn of vehicle 10, thereby decreasing the rebound speed of the adjustable shocks 18 and provide improved roll control. In one example, the amount of compression damping, rebound damping, or both is dependent on a ground speed of vehicle 10. In one embodiment, in the Squat Condition, in response to an indication of an acceleration event of vehicle 10, suspension controller 86 will increase the rebound damping of the front adjustable shocks of vehicle 10 resulting in a decrease of the rebound speed of the adjustable shock 18 and an improved pitch control of vehicle 10. In one example, the amount of compression damping, rebound damping, or both is dependent on a ground speed of vehicle 10.

Figure 12A:
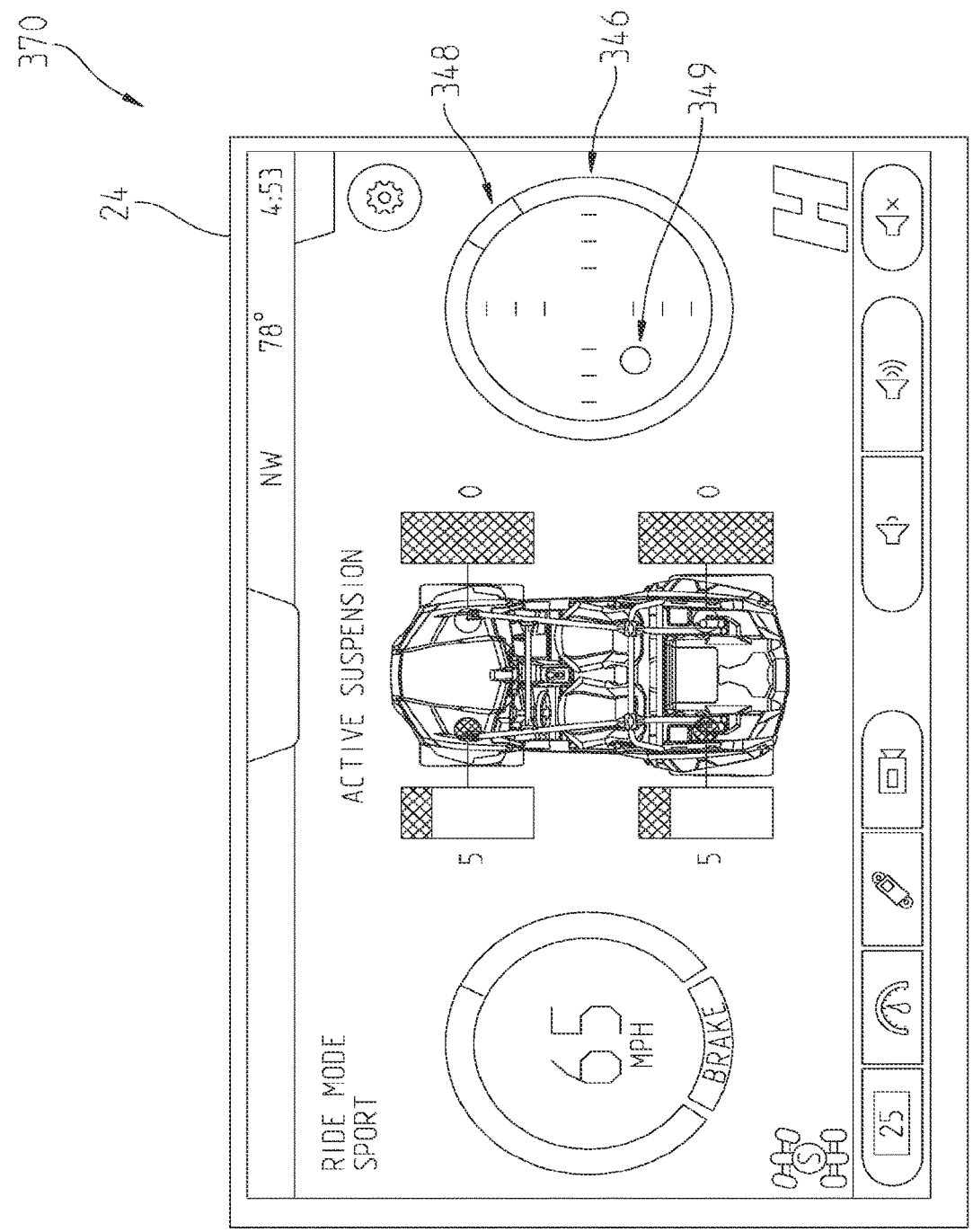
FIG. 12A illustrates a further exemplary screen layout for the graphical user interface of the operator interface of the vehicle of FIG. 1.
Figure 12B:
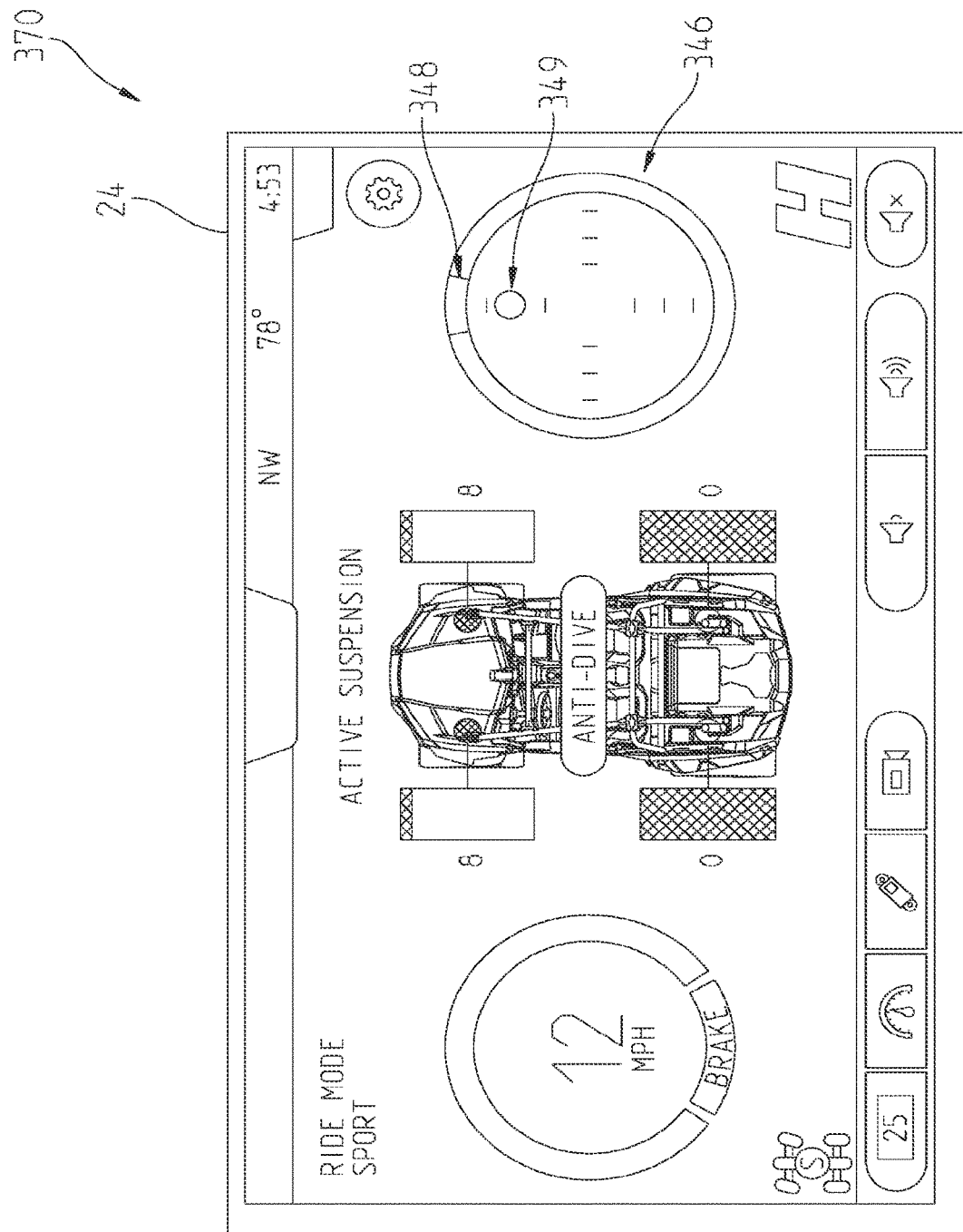
FIG. 12B illustrates a further exemplary screen layout for the graphical user interface of the operator interface of the vehicle of FIG. 1.
Figure 12C:
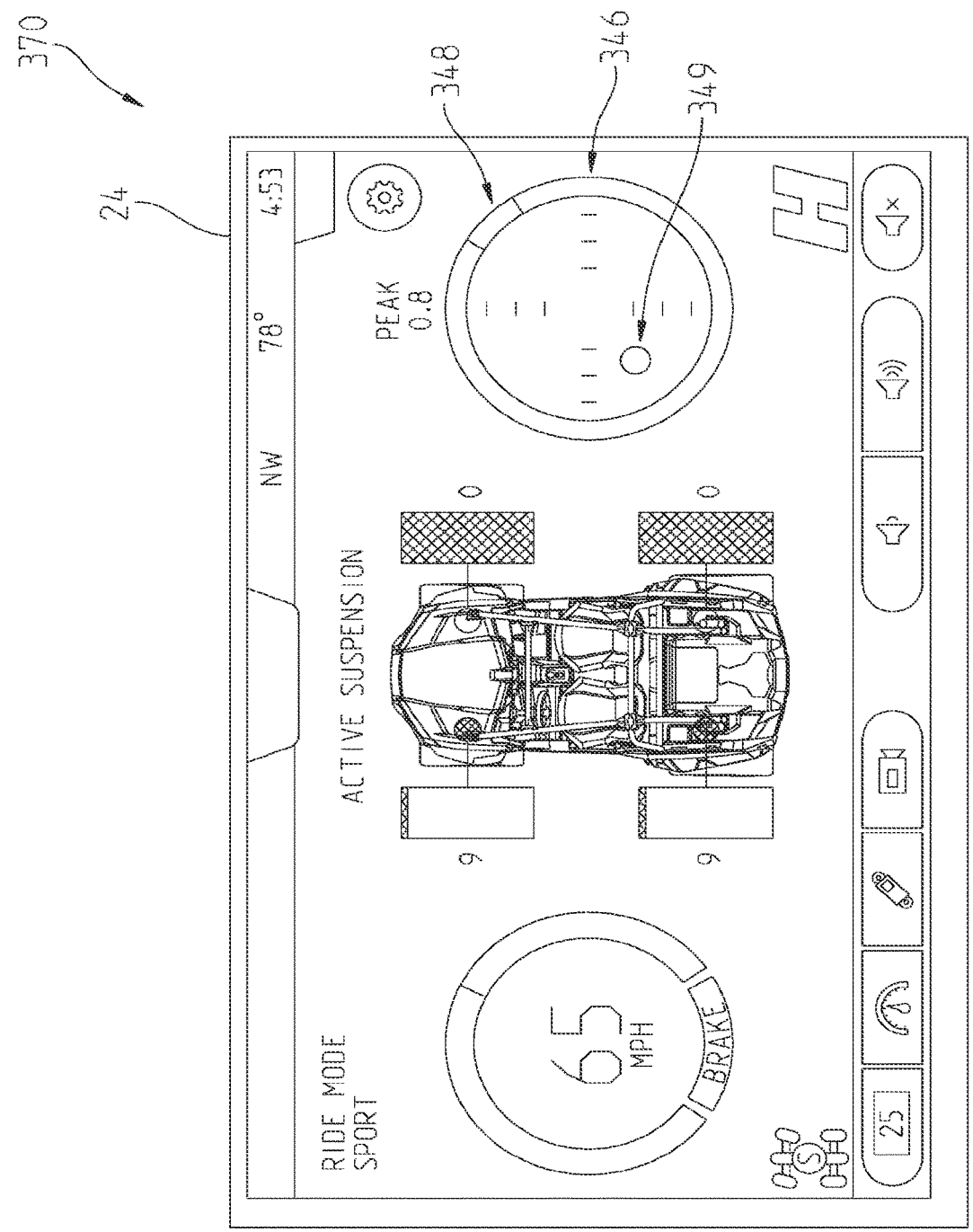
FIG. 12C illustrates a further exemplary screen layout for the graphical user interface of the operator interface of the vehicle of FIG. 1.

Referring to FIGS. 12A-C, additional exemplary screens 340, 342, and 344 of graphical user interface 310 are illustrated. Each of screens 340, 342, and 344 includes a visual feedback representation 346 of a g-force experienced by vehicle 10. G-force representation 346 includes an indication 348 of a steering angle of steering wheel 226 and an indication 349 of the magnitude (distance from a center of visual feedback representation 346) and the direction (angular position of indication 349 relative to the center of visual feedback representation 346) of the g-force experienced. In FIG. 12A, the g-force is towards the driver rear portion of the vehicle. In one embodiment, the screen layouts disclosed herein may be used as part of a demonstration mode wherein the screen functionality is shown while the vehicle is stationary.

Figure 13:
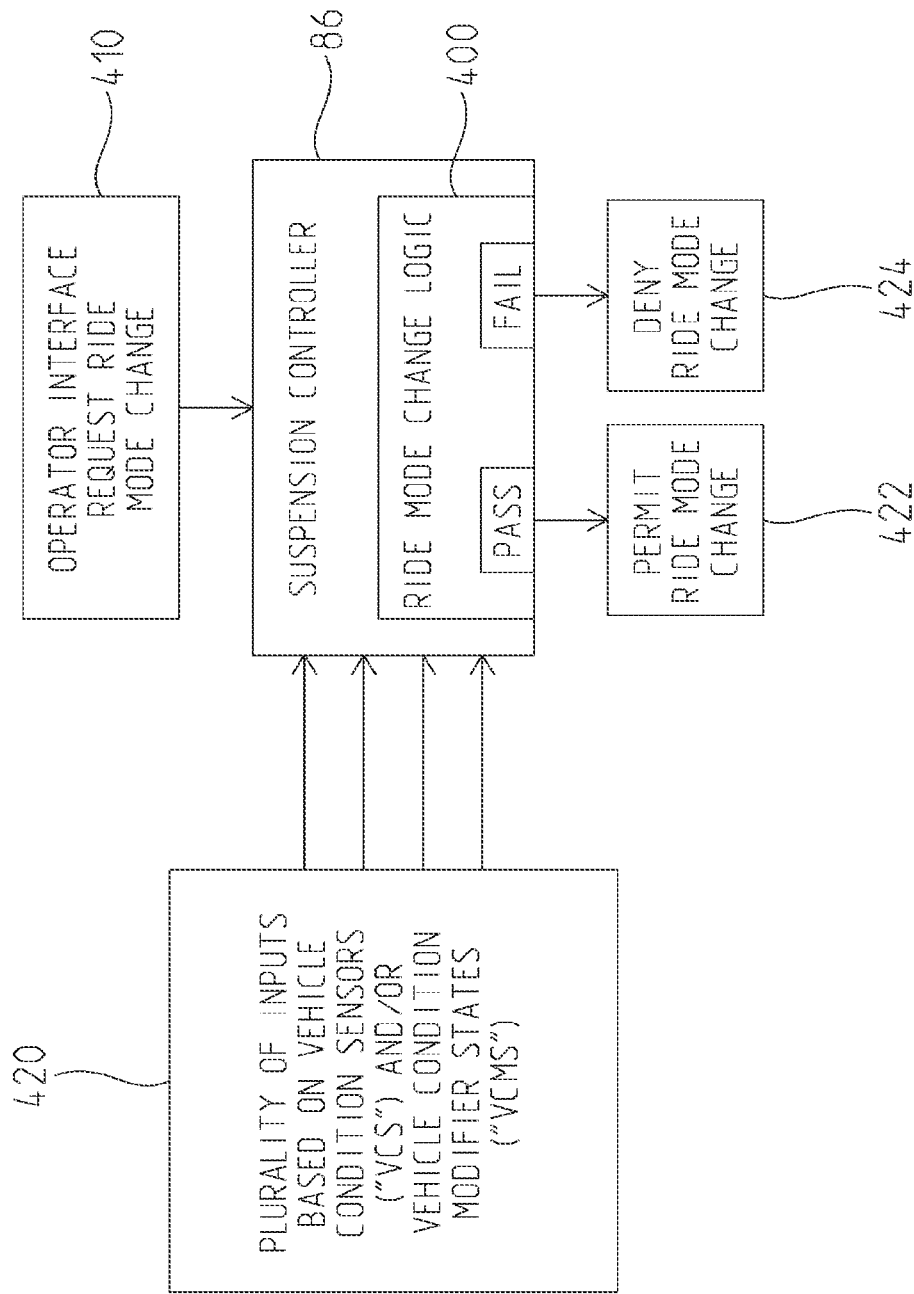
FIG. 13 illustrates a representative view of an operation of a suspension controller of FIG. 5 wherein a requested ride mode change is permitted or denied based on a plurality of inputs based on vehicle condition sensors and/or vehicle condition modifier states.

In one embodiment, suspension controller 86 is microprocessor-based and includes processing instructions stored on a non-transitory computer readable medium, such as memory 76, which are executable by the microprocessor of suspension controller 86 to control operation of suspension system 11. Referring to FIG. 13, suspension controller 86 may execute a ride mode change logic 400 which provides control signals to suspension system 11, such as the electronically controlled valves of shock absorbers 18, to achieve various configurations of suspension system 11, such as race, trail, sport, and other suitable configurations. In the case of multi-operator selectable ride modes, ride mode change logic 400 may permit or deny a change from a current, first ride mode to a requested, second ride mode. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which suspension controller 86 is not microprocessor-based, but rather is configured to control operation of suspension system 11 based on one or more sets of hardwired instructions and/or software instructions stored in memory 76. Further, suspension controller 86 may be contained within a single device or be a plurality of devices networked together to provide the functionality described herein.

Suspension controller 86 receives multiple inputs that may be used by ride mode logic 400 to determine whether to permit a change from a current, first ride mode to a requested, second ride mode. Suspension controller 86 receives a request 410 to change to a requested, second ride mode. The request 410 is provided by an operator through user interface 22. In one embodiment, graphical user interface 310 displayed on display 24 is used to select a requested, second ride mode. For example, any one of comfort button 328, sport button 330, or firm button 332 of second portion 350 or any one of trail button 378, sport button 380, and race button 382 of second portion 388 may be used to select a requested, second ride mode. In one embodiment, a requested, second ride mode is selected by actuation of rocker switch 312.

Additionally, suspension controller 86 receives a plurality of inputs 420 based on the operational characteristics of vehicle 10. Suspension controller 86 receives inputs from a plurality of vehicle condition sensors 40. The vehicle condition sensors 40 may either actively provide an indication by sending a sensor signal or passively provide an indication by making available a monitored characteristic, such as a voltage, a temperature, a pressure or other suitable characteristics. Suspension controller 86 further, either receives or initiates based on received inputs from the plurality of vehicle condition sensors 40, one or more vehicle condition modifier states. Exemplary vehicle condition modifier states are mentioned herein.

Ride mode change logic 400 determines whether request 410 passes a ride mode change criteria based on the plurality of operational characteristics 420. If the ride mode change criteria are passed, suspension controller 86 permits the requested ride mode change to occur, as represented by block 422. For instance, if the current ride mode was a comfort ride mode (selection input 328 in FIG. 11) and the operator selects a firm ride mode (selection input 332 in FIG. 11), suspension controller 86 would alter suspension 11 to have characteristics based on the firm ride mode. For example, suspension controller 86 would alter a damping profile of shock absorbers 18 to the default damping profile stored in memory 76 for the firm ride mode. If the ride mode criteria fails, suspension controller 86 denies the requested ride mode change, as represented by block 424, and suspension system 11 remains in the current selected ride mode until the operating conditions are resolved and/or there has been another switch state change.

Figure 14:
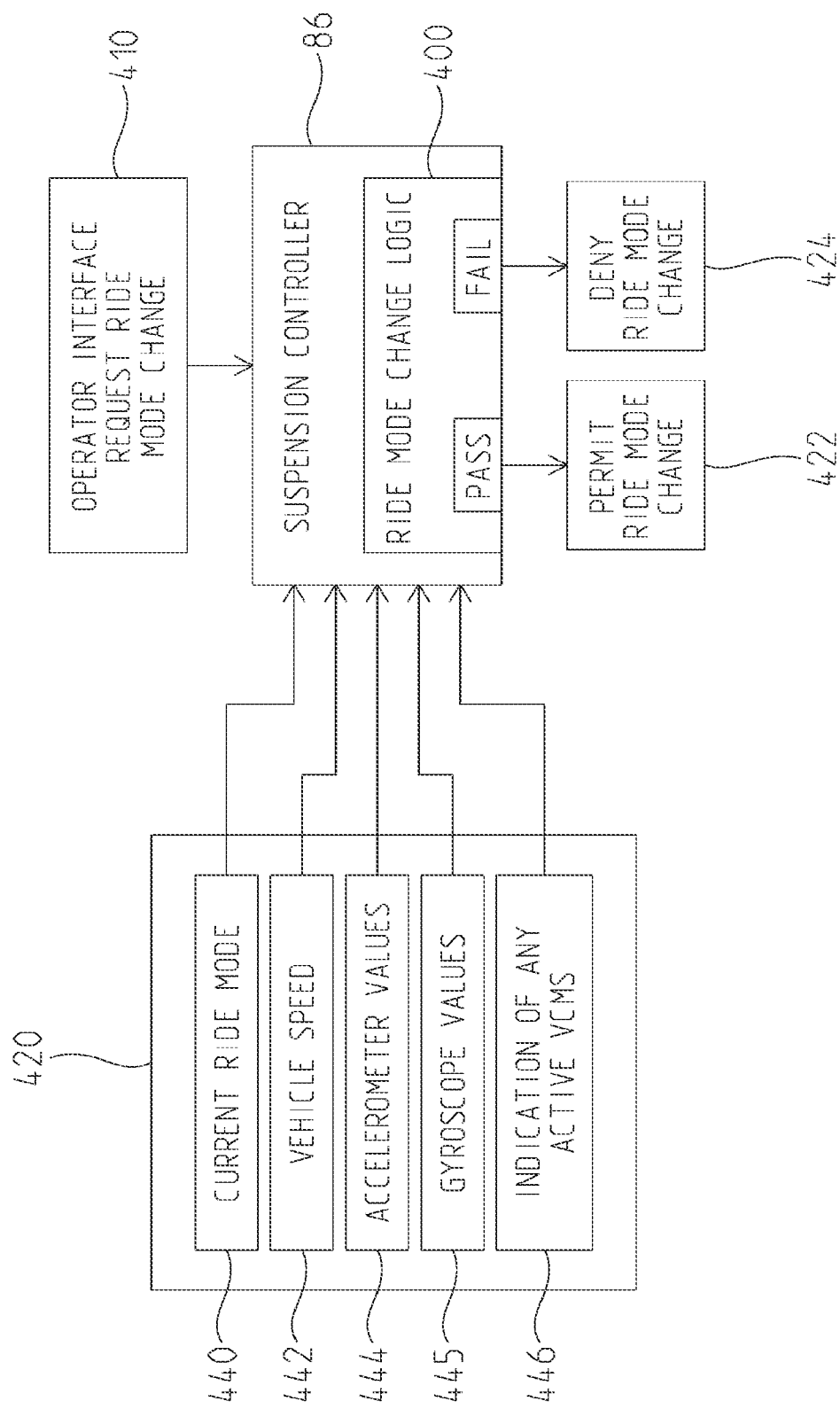
FIG. 14 illustrates a representative view of an operation of a suspension controller of FIG. 5 wherein a requested ride mode change is permitted or denied based on a plurality of inputs based on vehicle condition sensors and/or vehicle condition modifier states including a current ride mode, a vehicle speed, vehicle acceleration values, and vehicle inertial values.

Referring to FIG. 14, a first exemplary set of operational characteristics 420 includes a current ride mode characteristic 440, a vehicle speed 442, one or more acceleration values 444, and an indication of any active vehicle condition modifier states 446. In one embodiment, vehicle speed 442 is based on an input from vehicle speed sensor 26. In one embodiment, the one or more acceleration values 444 include a z-plane acceleration from chassis supported accelerometer 30, a y-plane acceleration from chassis supported accelerometer 30, and an x-plane acceleration from chassis supported accelerometer 30.

Figure 15:
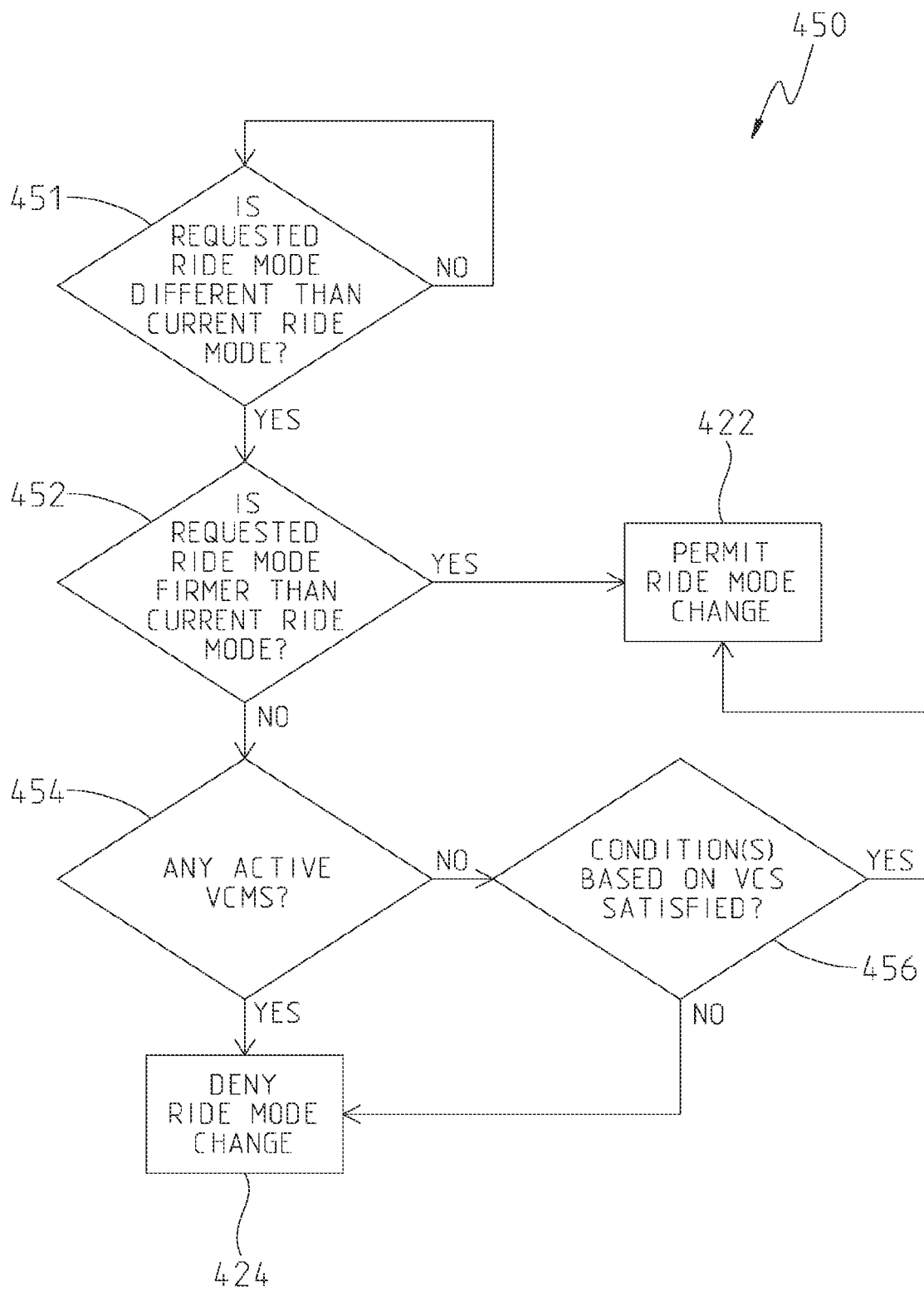
FIG. 15 illustrates an exemplary processing sequence of a ride mode change logic of the suspension controller.

An exemplary processing sequence 450 of ride mode change logic 400 of suspension controller 86 is illustrated in FIG. 15. Ride mode change logic 400 determines if the requested ride mode is different than the current ride mode, as represented by block 451. Ride mode change logic 400 determines if the requested ride mode has a firmer damping profile than the current ride mode, as represented by block 452. The current ride mode is the active damping profile and may either be a previously selected pre-set ride mode or a custom operator specified damping profile. If the requested ride mode is firmer than the current ride mode, ride mode change logic 400 permits the ride mode change, as represented by block 422. If the requested ride mode is not firmer than the current ride mode, ride mode change logic 400 checks to see if there are any active vehicle condition modifier states, as represented by block 454. If there are active vehicle condition modifier states, ride mode change logic 400 denies the requested ride mode change, as represented by block 424. For example, if vehicle 10 is currently cornering as determined based on a steering angle of the steering wheel, ride mode change logic 400 would not permit a change from a firmer damping profile to a softer damping profile.

If there are not any active vehicle condition modifier states, ride mode change logic 400 reviews the inputs from vehicle condition sensors 40 to determine whether to permit the ride mode change, as represented by block 456. For example, ride mode change logic 400 may not allow a change to a softer damping profile when a vehicle speed exceeds a vehicle speed threshold. Further, ride mode change logic 400 may not allow a change to a softer damping profile if a x-plane acceleration is greater that a x-plane acceleration threshold or if an absolute value of a y-plane acceleration is greater than a y-plane acceleration threshold. If the inputs from the vehicle sensors are acceptable, ride mode change logic 400 permits the ride mode change as represented by block 422. Otherwise, ride mode change logic 400 denies the ride mode change, as represented by block 424. Referring to Table 1, an exemplary set of conditions based on vehicle sensor values that ride mode change logic 400 uses in deciding whether to permit or deny a ride mode change request. In the examples provided in Table 1,

TABLE 1

| Current Ride Mode | Requested Ride Mode | Conditions |
| --- | --- | --- |
| Trail | Sport | No conditions - Sport has a firmer damping profile that Trail |
| Sport | Trail | X-plane acceleration value less than X-plane threshold value Absolute value of Y-plane acceleration less than Y-plane threshold value |
| Sport | Race | No conditions - Race has a firmer damping profile that Sport |
| Race | Sport | X-plane acceleration value less than X-plane threshold value Absolute value of Y-plane acceleration less than Y-plane threshold value | the Sport ride mode has a firmer damping profile than the Trail ride mode and the Race ride mode has a firmer damping profile than both of the Sport ride mode and the Trail ride mode.

A first exemplary damping profile may be a constant value for a ride mode. A second damping profile may be a function or a look-up table that provides a damping value based on one or more static or dynamic inputs. For example, a Sport ride mode may have different damping values for shock absorbers 18 based on a first static input, cargo weight, and/or a second static input, number of riders. In one example, the Sport ride mode has a first damping value for vehicle 10 when vehicle 10 has a single rider and no cargo and a second damping value for vehicle 10 when vehicle 10 has two riders and no cargo, the second damping value being firmer than the first damping value. Further, a Sport ride mode may have multiple different damping values for shock absorbers 18 based on a first dynamic input, a detected vehicle speed. In one example, the Sport ride mode has a first damping value for a first vehicle speed and a second, firmer damping value for a second vehicle speed, the second vehicle speed being greater than the first vehicle speed.

Ride modes are described herein in connection with the settings of suspension system 11. In one embodiment, a selected ride mode influences other systems of vehicle 10, such as prime mover 62, transmission 66, and other systems of vehicle 10.

Damping profiles may be altered during the operation of vehicle 10 beyond the values associated with the current ride mode. For example, if the operation of vehicle 10 results in vehicle 10 being placed in a vehicle condition modifier state, suspension controller 86 will alter the current damping profile based on the vehicle condition modifier state until the vehicle condition modifier state is concluded. In one example, in response to an Anti-Dive modifier state, suspension controller 86 increases the firmness of shock absorbers 18 associated with front axle 208 of vehicle 100.

Figure 16:
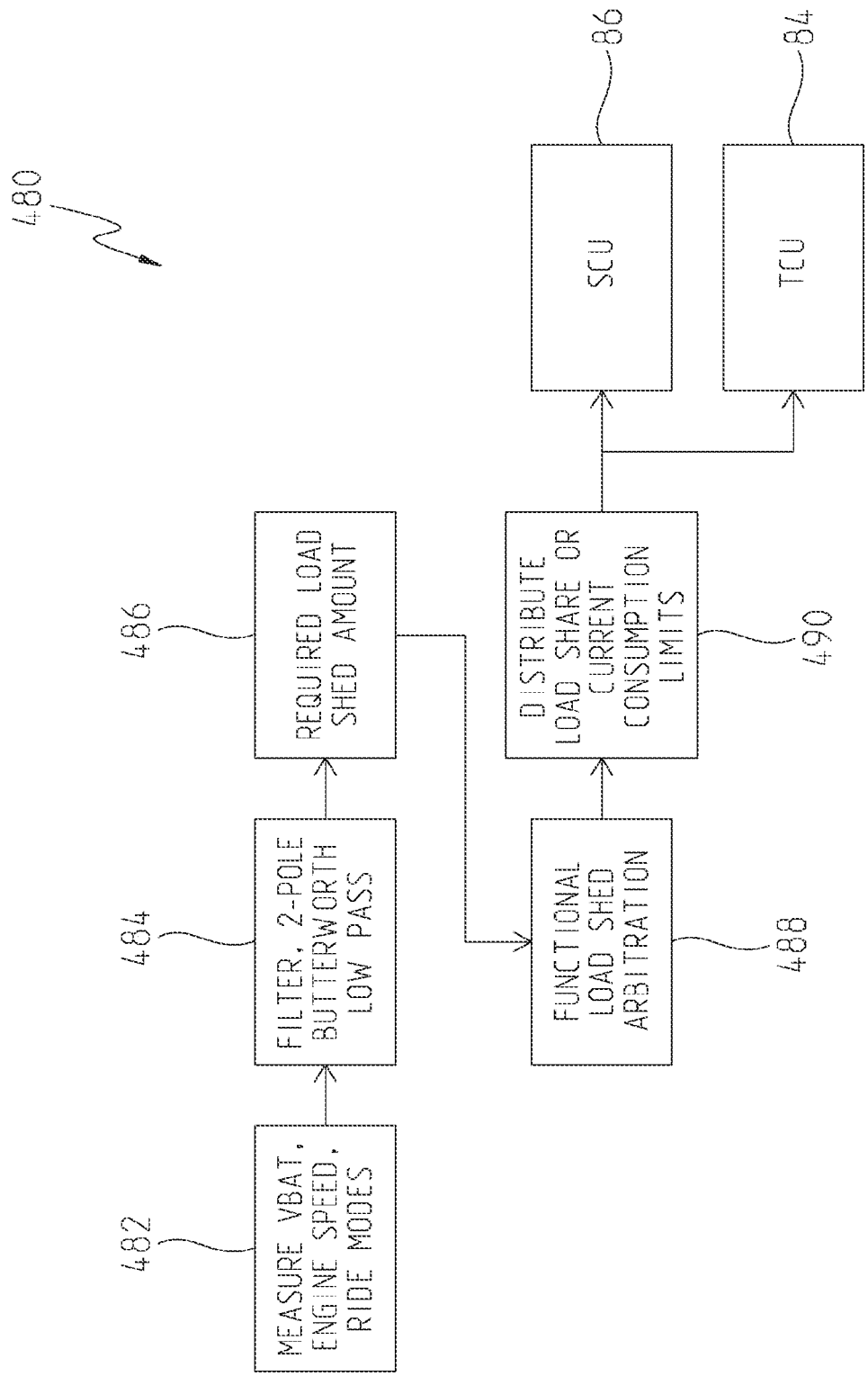
FIG. 16 illustrates an exemplary processing of the controller of FIG. 1 for a power save condition.

As another example, if based on one or more of vehicle condition sensors 40, a power save condition is detected, suspension controller 86 may alter the damping profile of shock absorbers 18. Referring to FIG. 16, controller 20 executes a processing sequence 480 to monitor for a power save condition. In one example, processing sequence 480 is executed by vehicle controller 92, but may be executed by any one or more of the controllers of controller 20 or if controller 20 is a single controller handling the functionality of the controllers listed in FIG. 5 then by controller 20.

Prime mover controller 82 receives an indication of the voltage of a battery 80 of vehicle 10 from one or more of vehicle condition sensors 40, an indication of an engine speed from one or more of vehicle condition sensors 40, and a current ride mode, as represented by block 482. The measured voltage of the battery is passed through a low pass filter to provide an average measured voltage, as represented by block 484. Based on the measured voltage value, engine speed, and ride mode, prime mover controller 82 determines if a power load shed is required, as represented by block 486. Prime mover controller 82 reduces the power consumption of various vehicle systems to reduce the power drain on battery 80.

Prime mover controller 82 determines an amount of load shed to be borne by various vehicle systems, as represented by block 488. In one embodiment, the amount of load shed required by each vehicle system depends on the current ride mode of vehicle 10. For example, in a first ride mode suspension controller 86 may have constant damping specified for shock absorbers 18 while in a second ride mode suspension controller 86 may have variable damping for shock absorbers 18. A determined load shed amount or consumption limit is distributed to affected controllers, as represented by block 490. Each controller, in response to the determined load shed or consumption limit, alters its operation. For example, suspension controller 86 may adjust the damping of shock absorbers 18 to be firmer and not permit softer settings to reduce the number of adjustments made to shock absorbers 18. If the consumption limit is below a threshold, suspension controller 86, in one embodiment, defaults the damping profile of adjustable shocks 18 to be 100% firm. As another example, transmission controller 84 may reduce the number of permitted shifts of transmission 66 in response to the determined load shed or consumption limit.

Referring to FIG. 17, vehicle controller 92 may receive multiple ride mode requests from various sources. Vehicle controller 92 may receive a first request 520 from user interface 22 and a second request 522 from communication controller 88. Communication controller 88 receives second request 522 from one of remote devices 500. Exemplary remote devices 500 include personal computing devices 502 which may be carried by a rider of vehicle 10 or be spaced apart from vehicle 10. Further, a second vehicle 10' may send second request 522 to vehicle 10. In one embodiment, vehicle 10 and second vehicle 10' are part of a mesh network and second vehicle 10' has altered its ride mode and broadcasts that to vehicle 10 or based on the terrain and/or performance of second vehicle 10' suggestions for preferred ride modes or damping profile adjustments are broadcast to vehicle 10. Further, a centralized computer system 504 may send second request 522 to vehicle 10. In one example, any one of personal computing devices 502, second vehicle 10', or centralized computer system 504 broadcasts second request 522 to any vehicle 10 capable of receiving second request 522. The second request 522 may include location information, such as GPS coordinates, that vehicle controller 92 may use to determine whether second request 522 is pertinent or not based on the current location of vehicle 10 as determined by location determiner 110.

Vehicle controller 92 receives both first request 520 and second request 522. Vehicle controller 92 determines which one of first request 520 and second request 522 to implement, if either, as represented by block 524. In making this determination, vehicle controller 92 determines whether an auto/manual input 528 of user interface 22 has been set to auto or manual, as represented by block 526. In manual mode, the operator is controlling the damping profile of shock absorbers 18. In the auto mode, the operator is permitting other inputs to control the damping profile of shock absorbers 18. In one embodiment, vehicle controller 92 provides on display 24 an indication of an incoming request from remote devices 500. The operator may actuate an override input 530 of user interface 22 to override the incoming request from remote devices 500, as represented by block 532. In one example, the override input 530 is displayed as part of graphical user interface 310. Once vehicle controller 92 has determined which of the multiple requests 520, 522 to implement, vehicle controller 92 communicates the request to the system controllers to implement, illustratively prime mover controller 82, transmission controller 84, and suspension controller 86.

Figure 18:
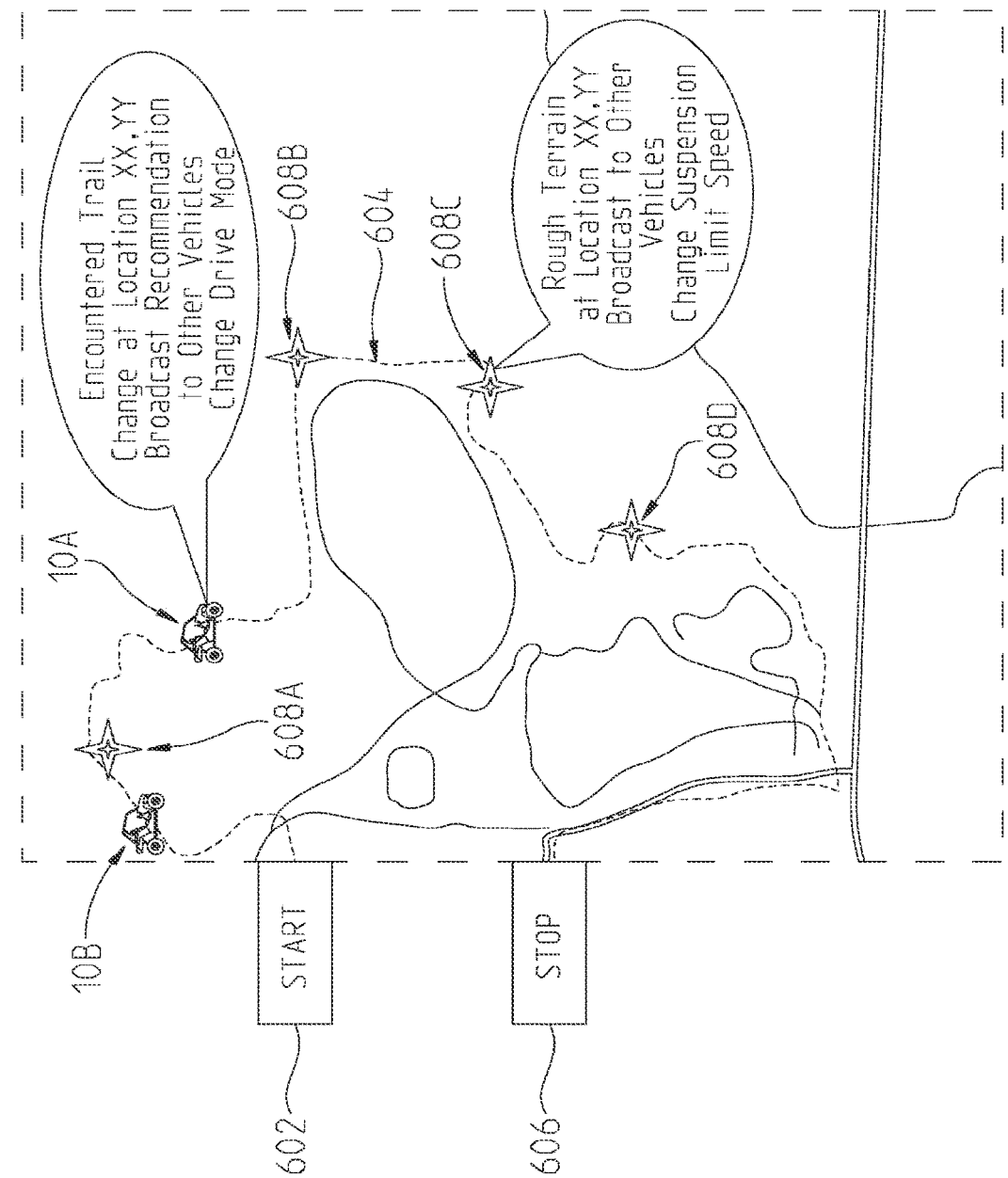
FIG. 18 illustrates an exemplary aerial view of a terrain, multiple vehicles on a trail of the terrain, and potential ride mode changes based on the terrain or vehicles.

Referring to FIG. 18, an aerial view 600 of a representative trail for vehicles 10 is shown. In one embodiment, aerial view 600 is shown on display 24. The trail starts at location 602, follows a trail path 604 (dashed line), to a trail end 606. A lead vehicle 10A is illustrated along with a follower vehicle 10B. Lead vehicle 10A is traversing the trail first and broadcasts recommendations to vehicle 10B to alter the ride mode, such as altering the damping profile of shock absorbers 18. The trail may also include discrete locations, illustratively locations 608A-608D, at which either lead vehicle 10B or databases 506 accessible by centralized computer system 504, indicates a desired ride mode, such as a damping profile of shock absorbers 18. In one embodiment, controller 20 of vehicle 10A provides visual feedback to the operator of vehicle 10A of an upcoming ride mode change.

Figure 19B:
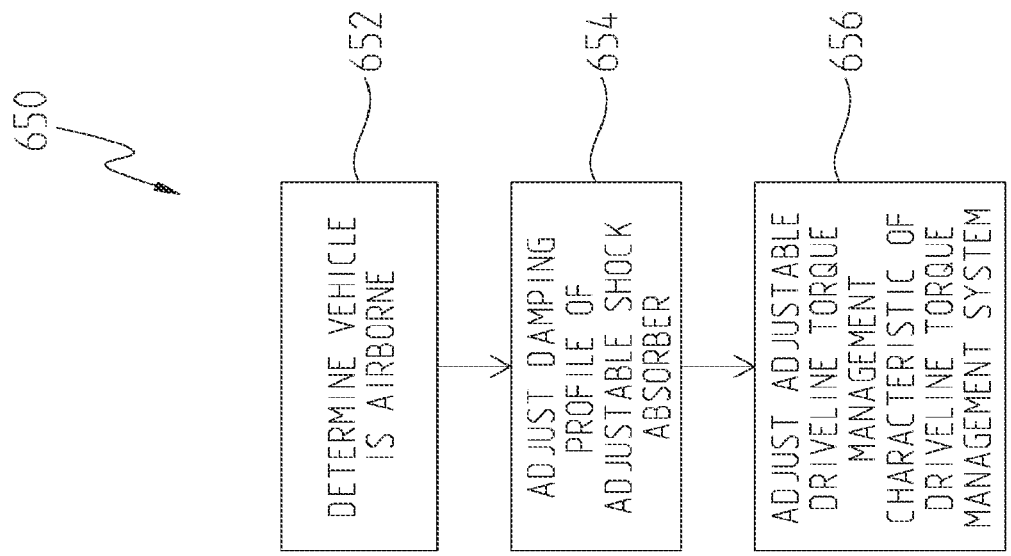
FIG. 19B illustrates an exemplary processing sequence of the controller of FIG. 1 related to an airborne detection of the vehicle.
Figure 19A:
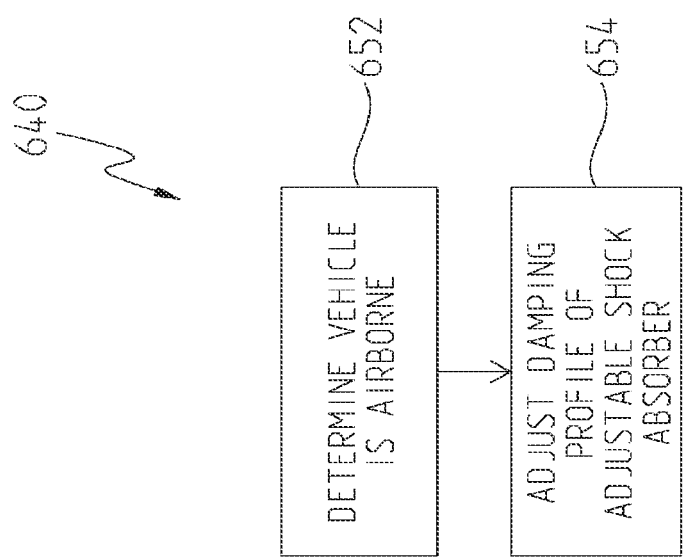
FIG. 19A illustrates an exemplary processing sequence of the controller of FIG. 1 related to an airborne detection of the vehicle.

Referring to FIG. 19A, a processing sequence 640 related to vehicle alterations to make in light of vehicle 10 being airborne is provided. Controller 20 determines if vehicle 10 is airborne, as represented by block 652. In one embodiment, controller 20 monitors the output of accelerometer 30 to determine when vehicle 10 is in a freefall. In this manner, accelerometer 30 is a type of airborne sensor in that it is able to provide an indication of when vehicle 10 is airborne.

In one embodiment, the output of each of the three axes of accelerometer 30 is monitored by controller 20. Controller 20 determines that vehicle 10 is airborne in response to a magnitude of a resultant acceleration vector (based on the x-axis component vector, the y-axis component vector, and the z-axis component vector) being below a first threshold value and, optionally in one example, the magnitude of each of the x-axis acceleration and the magnitude of the y-axis acceleration being below a second threshold.

Figure 23A:
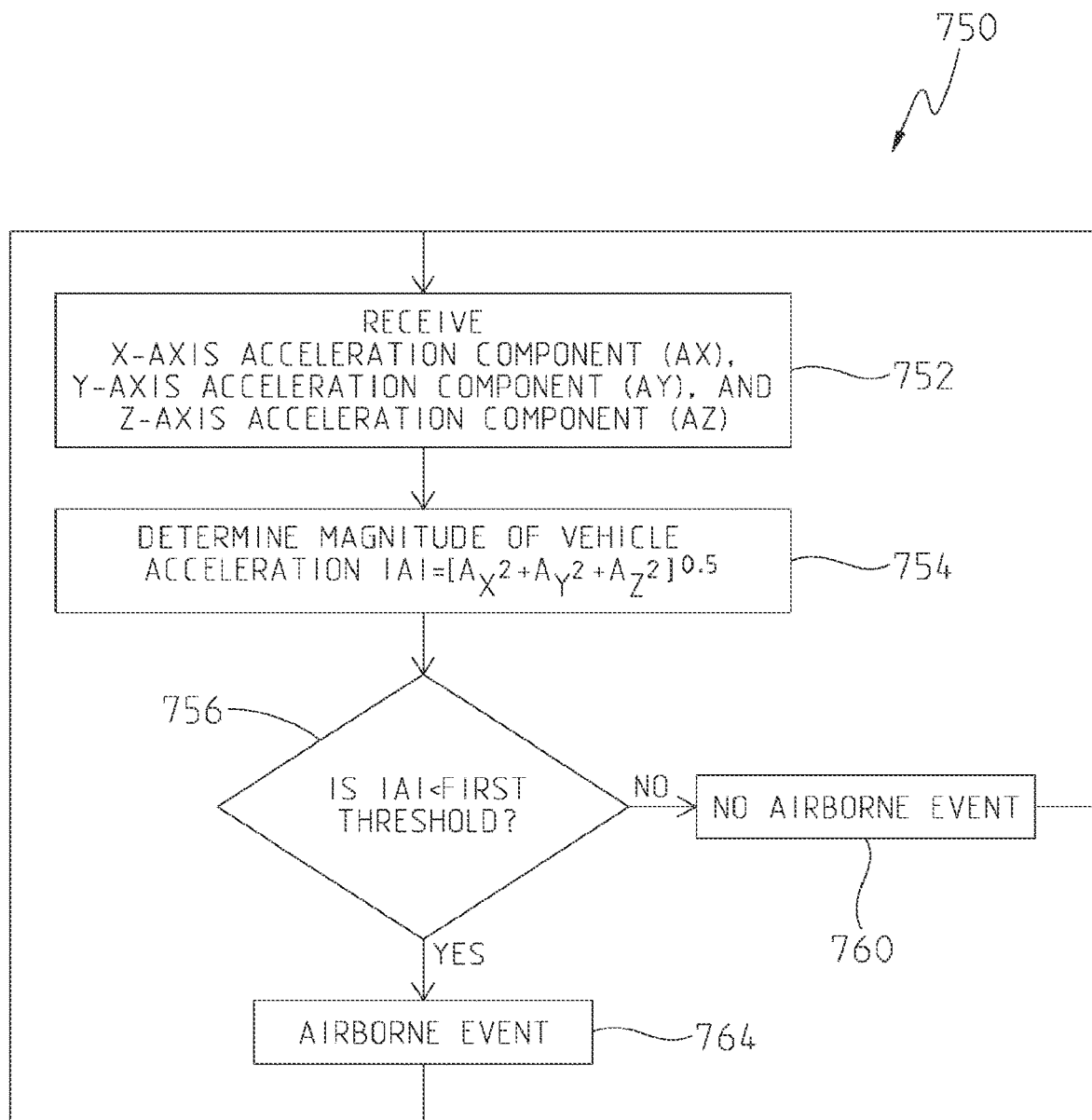
FIG. 23A illustrates an exemplary processing sequence of the controller of FIG. 1 regarding airborne detection of the vehicle.
Figure 23B:
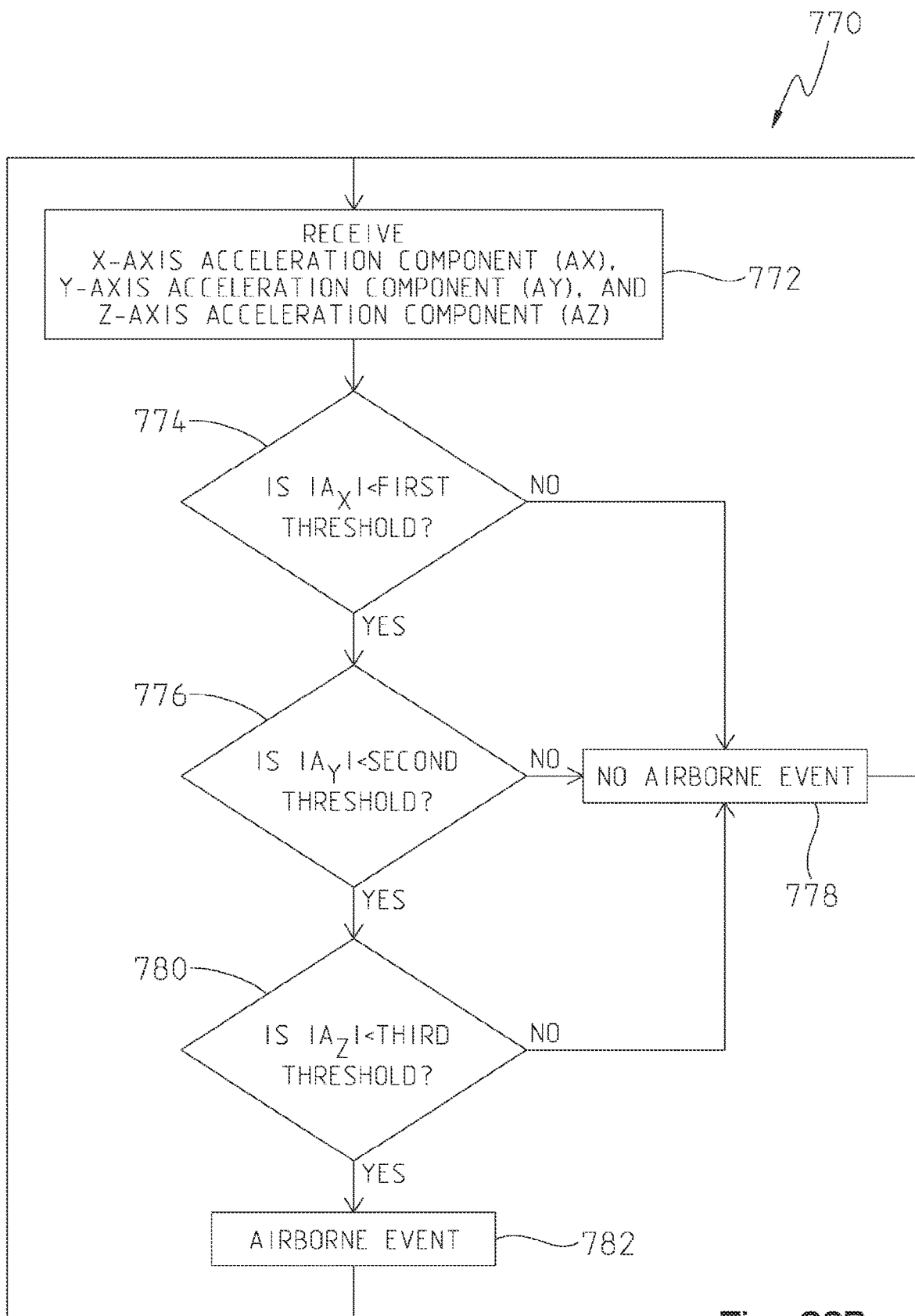
FIG. 23B illustrates an exemplary processing sequence of the controller of FIG. 1 regarding airborne detection of the vehicle.

Referring to FIG. 23A, an exemplary processing sequence 750 of the logic of controller 20, such as suspension controller 86, is shown. Controller 20 receives the acceleration values for the x-axis, the y-axis, and the z-axis from accelerometers 30, as represented by block 752. Controller 20 determines the magnitude of the resultant acceleration vector, as represented by block 754. Controller 20 compares the magnitude of the resultant acceleration vector to a first threshold, as represented by block 756. If the magnitude of the resultant acceleration vector is less than the first threshold, controller 20 determines vehicle 10 is experiencing an airborne event, as represented by block 764. Otherwise, controller 20 determines that vehicle 10 is not experiencing an airborne event, as represented by block 760, and the next acceleration values are reviewed, as represented by block 752. In one example, the first threshold value is about 0.3 times the gravitational acceleration on planet Earth (G). As mentioned herein, if accelerometer 30 is not located at the center of gravity of vehicle 10, the inertial values of gyroscope 31 are used in combination with the raw measurement of acceleration values to determine the equivalent acceleration values at the center of gravity of vehicle 10.

In another embodiment, a magnitude of each of the x-axis acceleration component vector, the y-axis acceleration component vector, and the z-axis acceleration component vector is compared to a respective threshold value. Controller 20 determines that vehicle 10 is airborne in response to each of the magnitude of the x-axis acceleration component vector, the magnitude of the y-axis acceleration component vector, and the magnitude of the z-axis acceleration component vector being less than their respective threshold values. By monitoring each acceleration component magnitude individually instead of a composite acceleration magnitude, controller 20 may provide improved airborne detection in high speed jumping maneuvers and better account for wind resistance.

Referring to FIG. 22B, an exemplary processing sequence 770 of the logic of controller 20, such as suspension controller 86, is shown. Controller 20 receives the acceleration values for the x-axis, the y-axis, and the z-axis from accelerometers 30, as represented by block 772. Controller 20 compares the x-axis acceleration value to a first threshold, as represented by block 774; the y-axis acceleration value to a second threshold, as represented by block 776; and the z-axis acceleration value to a third threshold, as represented by block 780. In FIG. 22B, blocks 774, 776, and 780 are illustrated as being executed sequentially. In one embodiment, controller 20 performs the functions of blocks 774, 776, and 780 in parallel. Returning to FIG. 22B, if the x-axis acceleration value is less than the first threshold, controller 20 moves on to block 776. Otherwise, controller 20 determines that vehicle 10 is not experiencing an airborne event, as represented by block 778, and the next acceleration values are reviewed, as represented by block 772. At block 776, controller 20 compares the y-axis acceleration value to a second threshold. If the magnitude of the y-axis acceleration value is less than the second threshold, controller 20 moves on to block 780. Otherwise, controller 20 determines that vehicle 10 is not experiencing an airborne event, as represented by block 778, and the next acceleration values are reviewed, as represented by block 772. At block 780, controller 20 compares the z-axis acceleration value to a third threshold. If the magnitude of the z-axis acceleration value is less than the third threshold, controller 20 determines that vehicle 10 is experiencing an airborne event, as represented by block 782. Otherwise, controller 20 determines that vehicle 10 is not experiencing an airborne event, as represented by block 778, and the next acceleration values are reviewed, as represented by block 772. In one example, the respective threshold values are about 0.3 times the gravitational acceleration on planet Earth (G). In one example, at least two of the first threshold, the second threshold, and the third threshold have the same value. In another example, each of the first threshold, the second threshold, and the third threshold have different values. As mentioned herein, if accelerometer 30 is not located at the center of gravity of vehicle 10, the inertial values of gyroscope 31 are used in combination with the raw measurement of acceleration values to determine the equivalent acceleration values at the center of gravity of vehicle 10.

Exemplary detection of an airborne event is described in US Published Patent Application No. 2016/0059660, filed Nov. 6, 2015, titled VEHICLE HAVING SUSPENSION WITH CONTINUOUS DAMPING CONTROL, assigned to the present assignee, the entire disclosure of which is expressly incorporated by reference herein. Exemplary detection of an airborne event is described in U.S. Pat. No. 9,381,810, filed Jun. 3, 2011, titled ELECTRONIC THROTTLE CONTROL, assigned to the present assignee, the entire disclosure of which is expressly incorporated by reference herein.

Figure 20:
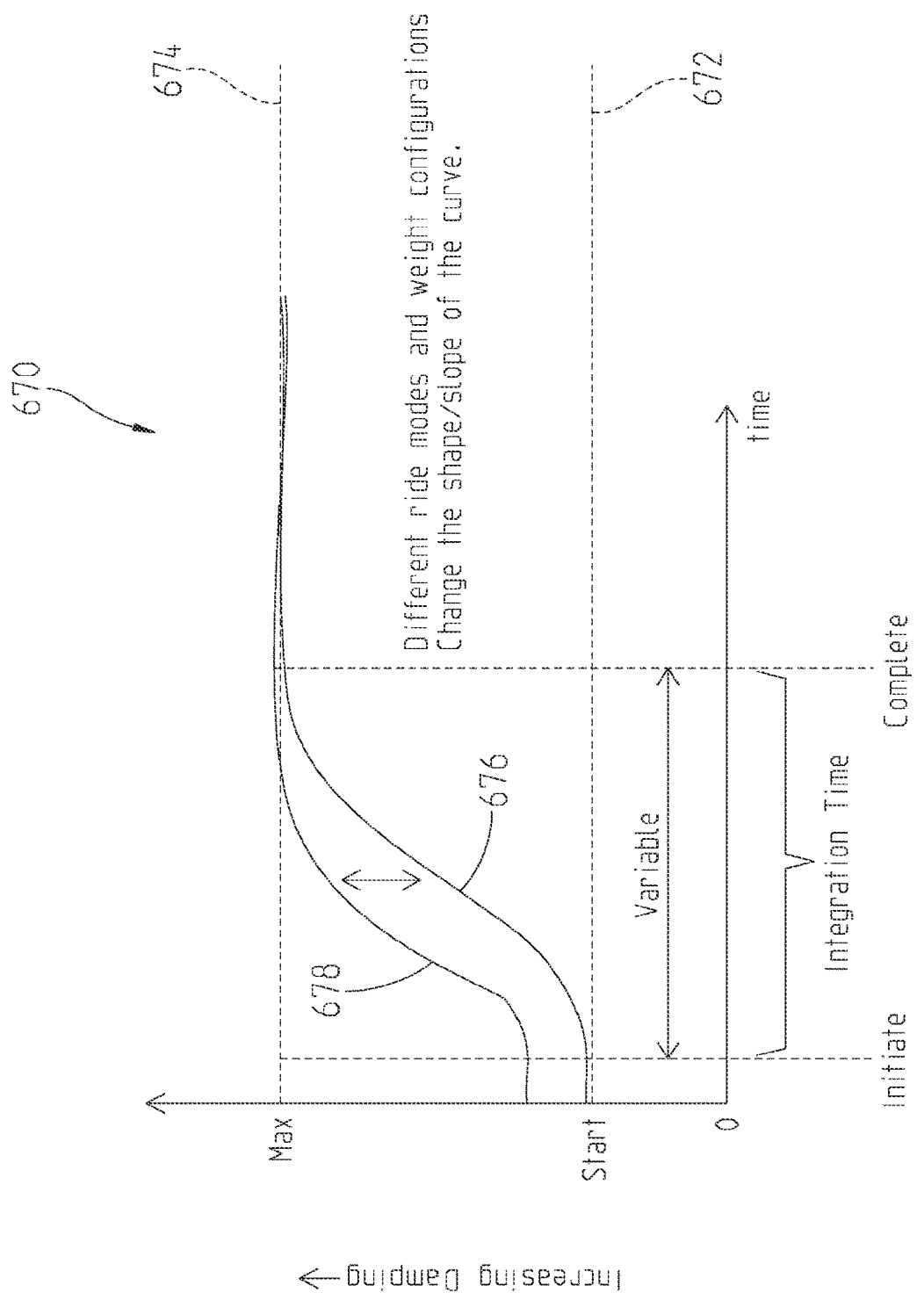
FIG. 20 illustrates exemplary damping control curves for the adjustable shocks of FIG. 1 in response to an airborne detection of the vehicle.

In response to determining that vehicle 10 is airborne, controller 20 adjusts the damping profile of shock absorbers 18, as represented by block 654. In one embodiment, controller 20 increases a pre-load firmness of shock absorbers 18. In one example, controller 20 increases the firmness of the damping profile of shock absorbers 18 at different rates depending on vehicle characteristics, such as vehicle speed, number of riders, cargo weight, amount of time in the air, and current ride mode. Referring to FIG. 20, an illustrative example 670 is provided. Once it has been detected that vehicle 10 is airborne, controller 20 increases the damping of shock absorbers 18 over time from a current damping value 672 to a maximum damping value 674 in accordance with the vehicle characteristics. Curve 676 represents a first set of vehicle characteristics, such as a single rider and no cargo, and curve 678 represents a second set of vehicle characteristics, such as multiple riders and cargo. In one example, the damping value is increased in a linear fashion from current damping value 672 over time. In one embodiment, in response to the detection of an Airborne condition, suspension controller 86 increases the compression damping of all of adjustable shocks 18 and decreases the rebound damping of all of the adjustable shocks 18. This setup will increase the rebound speed of the adjustable shocks 18 and permit the suspensions of vehicle 10 to drop out faster for the next compression hit to the adjustable shocks 18.

Referring to FIG. 19B, a processing sequence 650 related to vehicle alterations to make in light of vehicle 10 being airborne is provided. Controller 20 determines if vehicle 10 is airborne, as represented by block 652. In response to determining that vehicle 10 is airborne, controller 20 adjusts the damping profile of shock absorbers 18, as represented by block 654. Further, in response to determining that vehicle 10 is airborne, controller 20 adjusts the adjustable driveline torque management characteristic of the driveline torque management system 50, as represented by block 656.

Figure 21:
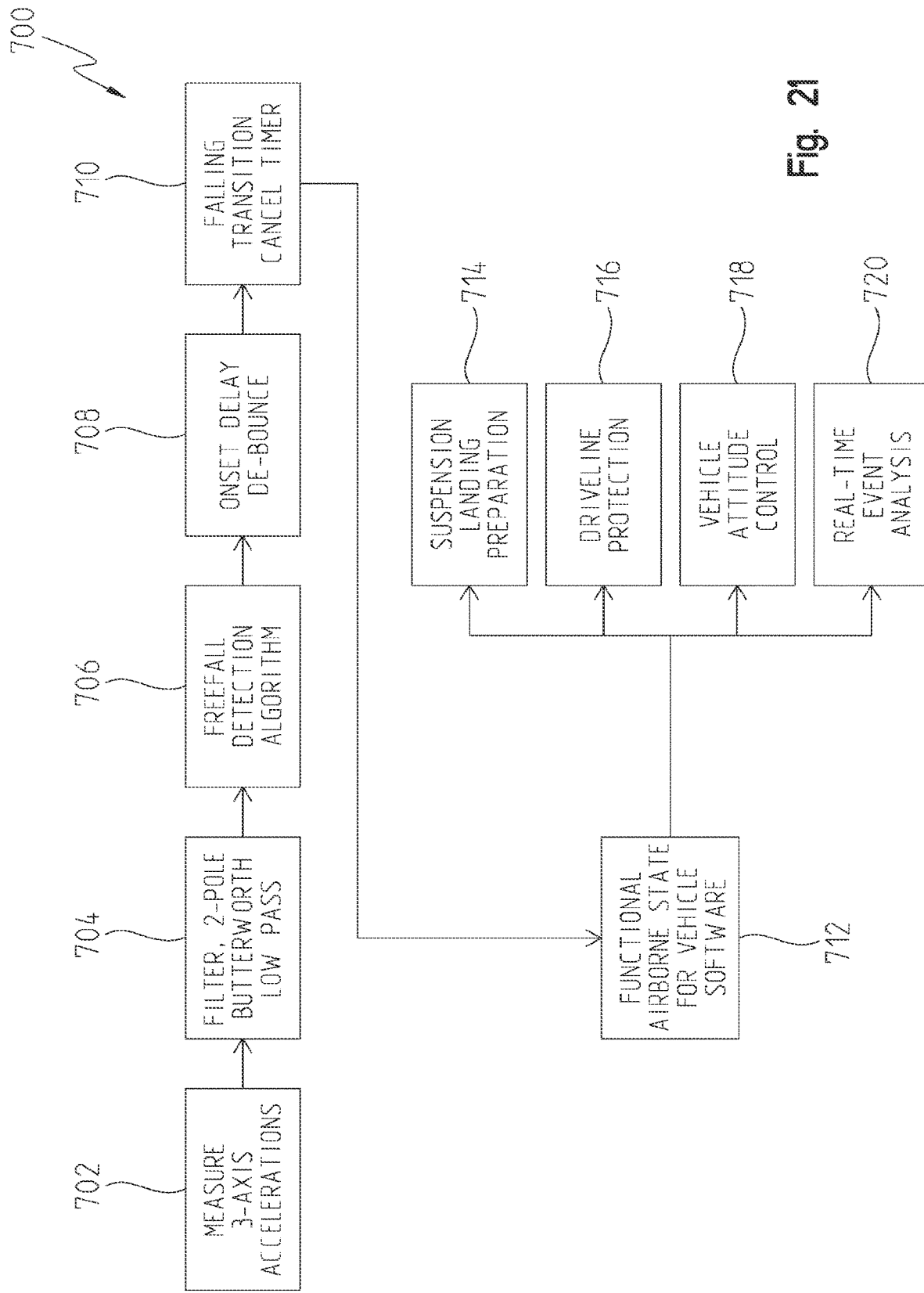
FIG. 21 illustrates an exemplary processing sequence of the controller of FIG. 1 regarding airborne detection of the vehicle.

Referring to FIG. 21, a processing sequence 700 related to vehicle alterations made by vehicle controller 92 in light of vehicle 10 being airborne is provided. Vehicle controller 92 receives output from accelerometer 30, as represented by block 702, and monitors the acceleration of vehicle 10. The output is sent through a low pass filter to average the data, as represented by block 704. Vehicle controller 92 executes a freefall algorithm to determine if vehicle 10 is falling, as represented by block 704. In one example, vehicle controller 92 determines if the z-plane acceleration is a negative value indicating a downward movement of vehicle 10. The received data is de-bounced by a delay amount, as represented by block 708. After the de-bounce delay the data is checked again to determine if the z-plane acceleration is a negative value. The data is continued to be checked until a timer expires, as represented by block 710. If the timer expires and the z-plane acceleration continues to be negative, vehicle controller 92 determines that vehicle 10 is airborne, as represented by block 712. In response thereto, vehicle controller 92 or the individual system controllers make adjustments to the vehicle characteristics. If the timer has not expired but a threshold amount of time has passed, controller 92 in response to a positive z-plane acceleration or the detection of gravity determines the vehicle 10 was airborne. The increase in firmness is controlled by the appropriate curve in FIG. 20. In one embodiment, airborne detection is determined by monitoring the output of each of the three axes of accelerometer 30 with controller 20. Controller 20 determines that vehicle 10 is airborne in response to a magnitude of a resultant acceleration vector (based on the x-axis component vector, the y-axis component vector, and the z-axis component vector) being above a first threshold value and the magnitude of each of the x-axis acceleration and the magnitude of the y-axis acceleration being below a second threshold.

Once the vehicle has been determined to be airborne, suspension controller 86 may increase the suspension damping to provide a firmer suspension for landing, as represented by block 714. Prime mover controller 82 and transmission controller 84 may take steps to protect the driveline of vehicle 10, as represented by block 716. Prime mover controller 82 may limit the torque output of prime mover 62. Transmission controller 84 may prevent shifting transmission 66 to a higher gear.

Further, the output of power system 60 may be increased or decreased to change the rotational speed of one or more of ground engaging members 12 and change the attitude of vehicle 10 while vehicle 10 is in the air, as represented by block 718. In one example, this is accomplished by adjusting an output of prime mover 62, altering a speed ratio of transmission 66, or both. Further, braking system 75 may be activated to slow the rotational speed of one or more of ground engaging members 12 to change the attitude of vehicle 10. Controller 20 through changes to driveline torque management system 50 may automatically change the pitch of vehicle 10 while vehicle 10 is airborne.

Controller 20 may further record information regarding airborne events, as represented by block 720. Exemplary information includes a time duration of each jump, the peak gravitational value experienced by vehicle 10 upon landing, number of jumps in a given period of time, and other information.

In one embodiment, a position of shock absorbers 18 is used to detect if vehicle 10 is airborne. In one example, if shocks 18 relaxed beyond a calibrated extension value, the vehicle 10 was determined to be airborne. In one variation, a majority of the shocks had to demonstrate a relaxation beyond a calibrated extension value for the vehicle to be considered airborne. Once the shocks compressed beyond a threshold, the dampening profile was adjusted firmer.

Figure 25:
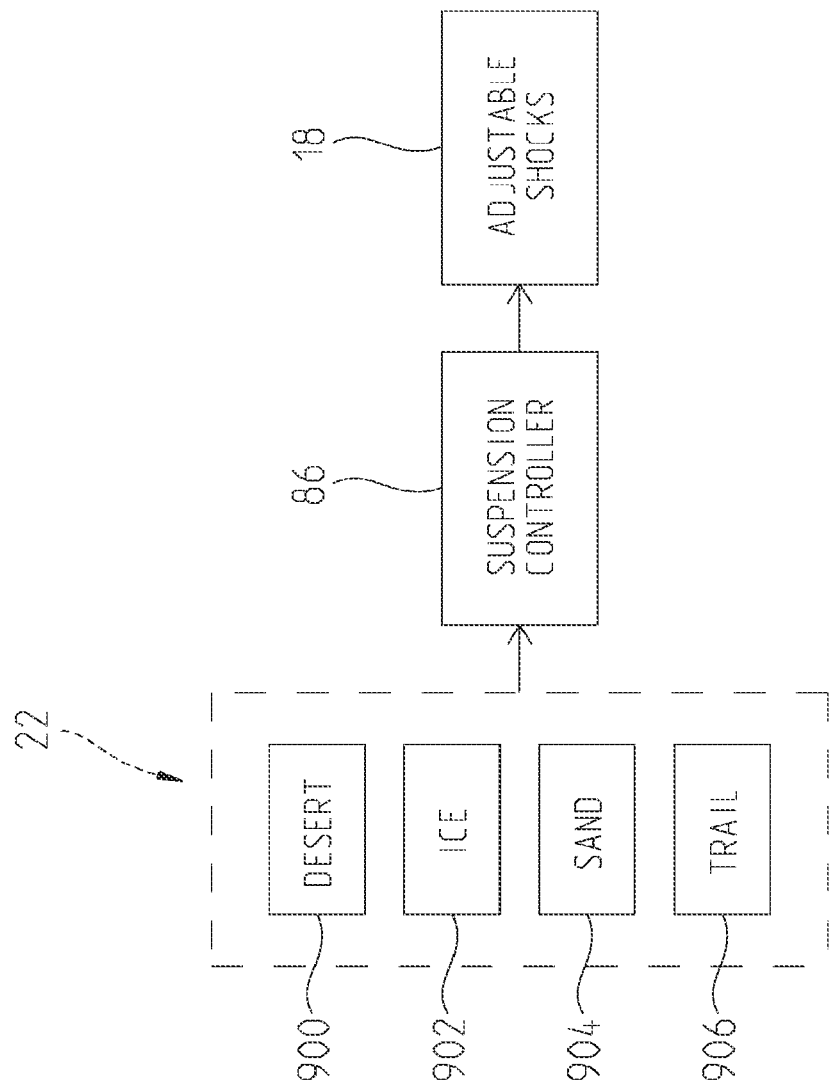
FIG. 25 illustrates exemplary operator inputs of the operator interface of FIG. 1.

Referring to FIG. 25, in one embodiment, suspension controller 86 is further operatively coupled to a plurality of operable selectable inputs of user interface 22 through which an operator of vehicle 10 may select a terrain ride mode setting for adjustable shocks 18 and/or adjustable springs 16. The selectable inputs may be switches, buttons, touch regions on display 24, dials, and other suitable user inputs. In the illustrated embodiment of FIG. 25, a desert ride mode input 900, an ice ride mode input 902, a sand ride mode input 904, and a trail ride mode input 906 are provided. Other suitable terrain ride mode inputs may be provided.

In one embodiment, selection of desert ride mode input 900 results in suspension controller 86 adjusting adjustable shocks 18 to a desert setup for desert conditions. In one example, the desert setup may be user defined based on prior vehicle performance in desert conditions.

In one embodiment, selection of ice ride mode input 902 results in suspension controller 86 adjusting adjustable shocks 18 to an ice setup for ice conditions. In one example, the ice setup may be user defined based on prior vehicle performance in ice conditions. For instance, an ice setup may alter cornering detection algorithms to provide different operational thresholds for low friction surfaces.

In one embodiment, selection of sand ride mode input 904 results in suspension controller 86 adjusting adjustable shocks 18 to a sand setup for sand conditions. In one example, the sand setup may be user defined based on prior vehicle performance in sand conditions.

In one embodiment, selection of trail ride mode input 906 results in suspension controller 86 adjusting adjustable shocks 18 to a trail setup for trail conditions. In one example, the trail setup may be user defined based on prior vehicle performance in trail conditions.

Figure 26:
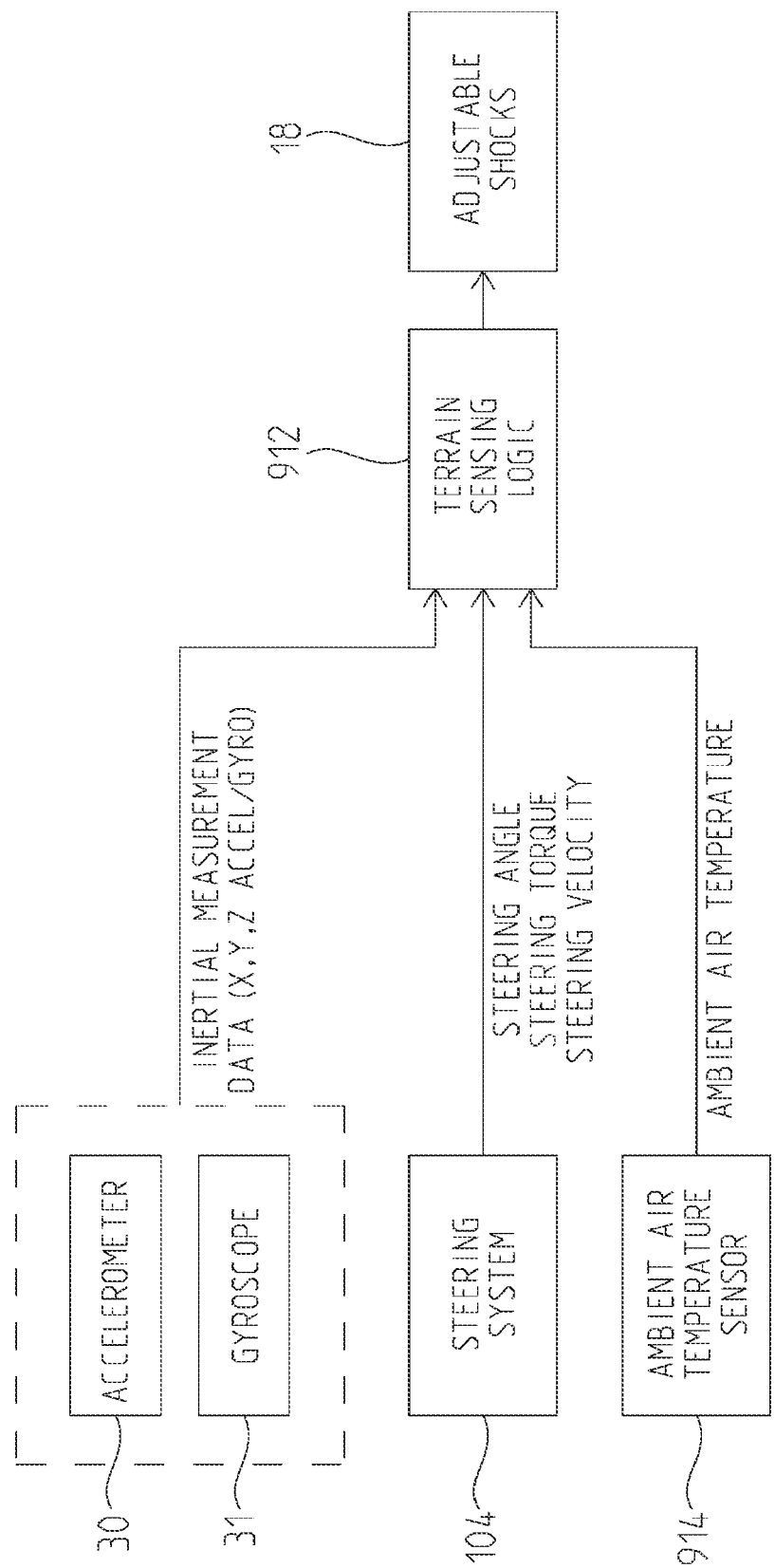
FIG. 26. Illustrates an exemplary terrain sensing embodiment of the controller of FIG. 1.

Referring to FIG. 26, in one embodiment, suspension controller 86 includes terrain sensing logic 912 which based on a plurality of inputs from vehicle condition sensors 40 determines a terrain being experienced by vehicle 10 and adjusts the damping characteristics of one or more of adjustable shocks 18 based thereon. Suspension controller 86 may adjust the compression damping characteristic of one or more of adjustable shocks 18, the rebound damping characteristics of one or more adjustable shocks 18, and/or both the compression and rebound damping of one or more adjustable shocks 18.

As shown in FIG. 26, terrain sensing logic 912 receives a plurality of inputs from the plurality of sensors 40 including x, y, and z axis acceleration and angular rate information from accelerometer 30 and gyroscope 31, respectively. Additional exemplary sensors include wheel acceleration and displacement sensors. Further, terrain sensing logic 912 receives an indication of a steering angle of the steering device 226, an indication of a steering torque, and an indication of a steering velocity from steering system 104. Additionally, terrain sensing logic 912 receives an indication of an ambient weather event. In the illustrated embodiment, the ambient weather event is an ambient air temperature and the indication is received from a temperature sensor 194. The temperature sensor 194 is supported by vehicle 10. Alternatively, the ambient air temperature may be received from a sensor remote from vehicle 10 and communicated to vehicle 10 over one or more wireless networks, such as over a network from a smartphone, a satellite network, or a cellular network. Terrain sensing logic may further receive engine speed, accelerator pedal position, and vehicle speed values from one or more of the controllers of vehicle 10. By sensing terrain changes, an operator of vehicle 10 will feel more comfortable driving vehicle 10 in changing terrains without needing to make a ride mode change selection.

In one embodiment, terrain sensing logic 912 determines vehicle 10 is traversing a harsh trail terrain (chatter) by performing a frequency analysis of incoming inertial measurement information and weighing magnitudes of acceleration at certain frequencies against a calibrated profile. In response thereto, terrain sensing logic 912, adjusts adjustable shocks 18 to optimize either ride or handling based on the weighted observations.

In one embodiment, terrain sensing logic 912 determines vehicle 10 is traversing a terrain with small hills (whoops) by measuring repeated bottom out events. In response thereto, terrain sensing logic 912, adjusts adjustable shocks 18 to increase compression damping.

In one embodiment, terrain sensing logic 912 determines vehicle 10 is traversing a terrain with ice by measuring high levels of yaw rate in absence of lateral accelerations. In response thereto, terrain sensing logic 912, adjusts adjustable shocks 18 to increase the damping characteristics, either compression, rebound, or compression and rebound, over current levels.

In one embodiment, terrain sensing logic 912 determines vehicle 10 is traversing a terrain which causes the vehicle to bottom out by receiving repeated high g-force events in the z-axis (see FIG. 2) from accelerometer 30. In response thereto, terrain sensing logic 912, adjusts adjustable shocks 18 to increase the compression damping of each of the adjustable shocks 18 to reduce the G forces in the z-axis. As the terrain smooths out (i.e. lower G forces in the z-axis), terrain sensing logic 912 decreases the compression damping of each of the adjustable shocks 18 back to a level, such as the current ride mode level.

In one embodiment, terrain sensing logic 912 adjusts the damping characteristics of adjustable shocks 18 over time based on sensed terrain changes. Referring to FIGS. 27A and 27B, in one example, vehicle 200 is traversing a terrain 940 including a trail terrain 950 followed by a road terrain 952. Exemplary trail terrains include dirt, off-road trails having uneven surfaces. Exemplary road terrains include asphalt surfaces having a generally smooth surface. In the illustrated example, trail terrain 950 includes a whoops portion 954 which includes a plurality of hills that vehicle 200 must traverse.

Referring to FIG. 27B, a suspension damping level 960 of at least one of the adjustable shocks 18 is shown over time. At the beginning of the illustrated time period, the suspension damping level remains generally constant as vehicle 200 traverses the trail terrain. Of course, the damping level may be altered by controller 20 if vehicle 200 is cornering, braking, accelerating, or experiencing other conditions. When vehicle 200 enters the whoops region, the terrain sensing logic 912 of controller 20 increases the damping level of the adjustable shock 18. In one example, terrain sensing logic 912 increases the damping level due to an increase in the adjustable shock 18 bottoming out. Once 200 exits the whoops portion, terrain sensing logic 912 of controller 20 begins to reduce the damping level. In one example, terrain sensing logic 912 reduces the damping level due to a decrease in the vertical acceleration measured by accelerometer 30. As shown in FIG. 27B, terrain sensing logic 912 further reduces the damping level when vehicle 200 is traversing road terrain 952.

In one embodiment, terrain sensing logic 912 stores the suspension damping levels for later recall to proactively adjust the damping level of adjustable shocks 18. As discussed herein, vehicle 200 may include a location determiner 110. In one example, terrain suspension logic 912 stores the suspension damping levels based on vehicle location as determined by location determiner 110. Thus, when vehicle 200 is approaching the stored location, terrain sensing logic 912 will adjust the suspension damping level based on the stored suspension damping level. In a further example, terrain suspension logic 912 will take into account the current vehicle speed when adjusting the suspension damping levels.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A recreational vehicle for operation by an operator, comprising:
   a plurality of ground engaging members;
   a frame supported by the plurality of ground engaging members;
   a plurality of adjustable suspension members, the plurality of adjustable suspension members including a first suspension, a second suspension, and a configurable stabilizer bar, the first suspension including a first adjustable shock absorber coupled between the frame and a first ground engaging member of the plurality of ground engaging members, the second suspension including a second adjustable shock absorber coupled between the frame and a second ground engaging member of the plurality of ground engaging members;
   a plurality of vehicle condition sensors supported by the plurality of ground engaging members;
   at least one controller operatively coupled to at least one of the plurality of adjustable suspension members, the at least one controller receiving a plurality of inputs from the plurality of vehicle condition sensors; and a user interface system supported by the frame, the user interface system including a display, the user interface providing a plurality of inputs to control at least one of the plurality of adjustable suspension members, and wherein the display is configurable with the at least one controller to display a screen layout, the screen layout including at least one reactive graphical representation of a suspension characteristic of the at least one of the plurality of adjustable suspension members.

2. The recreational vehicle for operation by an operator of claim 1, wherein the display of the user interface is further configured to display information related to the at least one of the plurality of adjustable suspension members.

3. The recreational vehicle for operation by an operator of claim 1, wherein the plurality of condition sensors includes at least one of an accelerometer, a gyroscope, a steering sensor, and a speed sensor.

4. The recreational vehicle for operation by an operator of claim 1, wherein the display is configurable with at least one controller to display a screen layout, the screen layout including a graphical representation of at least one of the plurality of adjustable suspension members.

5. The recreational vehicle for operation by an operator of claim 4, wherein the at least one screen layout includes a numerical representation of the at least one of the plurality of adjustable suspension members.

6. The recreational vehicle for operation by an operator of claim 1, wherein the at least one input of the plurality of inputs includes a selectable terrain mode.

7. The recreational vehicle for operation by an operator of claim 1, wherein the plurality of inputs includes at least one user selectable input, and in response to the at least one user selectable input receiving a first input, operating a first one of the plurality of adjustable suspension members according to a first mode and in response to the at least one user selectable input receiving a second input, operating the first one of the plurality of adjustable suspension members according to a second mode, the second mode being different than the first mode.

8. The recreational vehicle for operation by an operator of claim 7, wherein the first mode is a passive mode.

9. The recreational vehicle for operation by an operator of claim 8, wherein the screen layout further includes a graphical representation of the first one of the plurality of adjustable suspension members operating in the passive mode.

10. The recreational vehicle for operation by an operator of claim 7, wherein the second mode is an active mode.

11. The recreational vehicle of claim 10, wherein the screen layout further includes a graphical representation of the at least one of the plurality of adjustable suspension members operating in the active mode.

12. The recreational vehicle for operation by an operator of claim 1, wherein the screen layout further includes a graphical representation of the vehicle, the first adjustable shock absorber being positioned on a first side of a vertical longitudinal vehicle centerline plane and the second adjustable shock absorber being positioned on a second side of the vertical longitudinal vehicle centerline plane, the second side being opposite the first side, and a third adjustable shock absorber being positioned on one of the first side and the second side of the vertical longitudinal vehicle centerline plane.

13. The recreational vehicle for operation by an operator of claim 12, further comprising a third adjustable shock absorber, and wherein the first adjustable shock absorber and the third adjustable shock absorber are on a first side of the vertical longitudinal vehicle centerline plane.

14. The recreational vehicle of claim 12, wherein the reactive graphical representation is a first graphical representation, and further comprising a second graphical representation associated with the at least one of the plurality of adjustable suspension members and is positioned adjacent the graphical representation of the vehicle.

15. The recreational vehicle for operation by an operator of claim 1, further comprising a third adjustable shock absorber longitudinally offset from the first adjustable shock absorber.

16. The recreational vehicle for operation by an operator of claim 1, further comprising a third adjustable shock absorber laterally offset from the first adjustable shock absorber.

17. The recreational vehicle of claim 1, the screen layout further including at least one numerical indication of at least one suspension characteristic of the at least one of the plurality of adjustable suspension members and at least one graphical representation of a vehicle, wherein a first numerical indication of the at least one of the plurality of adjustable suspension members is positioned adjacent the graphical representation of the vehicle.

18. A recreational vehicle for operation by an operator, comprising:
a plurality of ground engaging members;
a frame supported by the plurality of ground engaging members;
a plurality of adjustable suspension members, the plurality of adjustable suspension members including a first suspension, a second suspension, and a configurable stabilizer bar, the first suspension including a first adjustable shock absorber coupled between the frame and a first ground engaging member of the plurality of ground engaging members, the second suspension including a second adjustable shock absorber coupled between the frame and a second ground engaging member of the plurality of ground engaging members;
a plurality of vehicle condition sensors supported by the plurality of ground engaging members;
at least one controller operatively coupled to at least one of the plurality of adjustable suspension members, the at least one controller receiving a plurality of inputs from the plurality of vehicle condition sensors; and
a user interface system supported by the frame, the user interface system including a display, the user interface providing a plurality of inputs to control at least one of the plurality of adjustable suspension members, the plurality of inputs includes at least one user selectable input, and in response to the at least one user selectable input receiving a first input, operating a first one of the plurality of adjustable suspension members according to a first mode and in response to the at least one user selectable input receiving a second input, operating the first one of the plurality of adjustable suspension members according to a second mode, the second mode being an active mode different than the first mode, and
wherein the display is configurable with the at least one controller to display a screen layout, the screen layout including a graphical representation of the at least one of the plurality of adjustable suspension members operating in the active mode, a graphical representation of the vehicle, the first adjustable shock absorber being positioned on a first side of a vertical longitudinal vehicle centerline plane and the second adjustable shock absorber being positioned on a second side of the vertical longitudinal vehicle centerline plane, the second side being opposite the first side, and a third adjustable shock absorber being positioned on one of the first side and the second side of the vertical longitudinal vehicle centerline plane, and the screen layout further including at least one numerical indication of at least one suspension characteristic of the at least one of the plurality of adjustable suspension members, wherein a first numerical indication of the at least one of the plurality of adjustable suspension members is positioned adjacent the graphical representation of the vehicle.

19. The recreational vehicle of claim 18, wherein the screen layout includes at least one reactive graphical representation of a suspension characteristic of the at least one of the plurality of adjustable suspension members.

* * * * *